United States Patent
Alfano et al.

(10) Patent No.: US 12,554,306 B2
(45) Date of Patent: Feb. 17, 2026

(54) SYSTEM AND METHODS FOR MANAGING DISTRIBUTED USER PRESENCE NOTIFICATIONS

(71) Applicant: Dell Products L.P., Round Rock, TX (US)

(72) Inventors: Keith M. Alfano, Manor, TX (US); Karun P. Reddy, Austin, TX (US); Daniel L. Hamlin, Round Rock, TX (US); Banu Alpay Waldman, Austin, TX (US); Mandy C. Phelps, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 494 days.

(21) Appl. No.: 18/098,203

(22) Filed: Jan. 18, 2023

(65) Prior Publication Data
US 2024/0241564 A1 Jul. 18, 2024

(51) Int. Cl.
*G06F 1/3231* (2019.01)
*G06V 20/52* (2022.01)
*G06V 40/16* (2022.01)

(52) U.S. Cl.
CPC ............ *G06F 1/3231* (2013.01); *G06V 20/52* (2022.01); *G06V 40/172* (2022.01)

(58) Field of Classification Search
None
See application file for complete search history.

(56) References Cited

U.S. PATENT DOCUMENTS

| 8,261,090 B1 | 9/2012 | Matsuoka |
| 9,392,460 B1 | 7/2016 | Blake |
| 9,678,559 B1 | 6/2017 | Devries |
| 9,807,104 B1 | 10/2017 | Sarra |

(Continued)

FOREIGN PATENT DOCUMENTS

WO 2014186628 A1 11/2014

OTHER PUBLICATIONS

Intel Real Sense, "Intel RealSense ID Solution F450, F455", Datasheet, May 2021, 38 pgs.

(Continued)

*Primary Examiner* — Helen Zong
(74) *Attorney, Agent, or Firm* — Zagorin Cave LLP; Robert W. Holland

(57) ABSTRACT

Systems and methods are provided for collecting, distributing and managing notifications of user presence. More specifically, systems and methods are provided for collecting notifications of user presence that are generated by a first IHS and distributing the notifications of user presence to a second IHS for notification, aggregation and/or analysis of user presence events. In some embodiments, notifications of user presence may be collected from the first IHS and distributed to the second IHS to provide notification of user presence events to the second IHS (or a user of the second IHS). In other embodiments, the notifications of user presence generated by the first IHS may be aggregated and/or analyzed by the second IHS to generate various metrics for the user presence events that occur at the first IHS. In doing so, the disclosed embodiments enable security (and other policies) to be set in a data-based, empirically driven way.

16 Claims, 26 Drawing Sheets

(56) References Cited

U.S. PATENT DOCUMENTS

| | | |
|---|---|---|
| 10,452,116 B1 | 10/2019 | Devries et al. |
| 10,726,242 B2 | 7/2020 | Gonion et al. |
| 10,819,920 B1 | 10/2020 | Hamlin et al. |
| 11,222,518 B1 | 1/2022 | Kamepalli et al. |
| 11,334,146 B2 | 5/2022 | Hamlin et al. |
| 11,507,891 B2* | 11/2022 | Clark .................... G06Q 10/02 |
| 11,513,813 B2 | 11/2022 | Hamlin et al. |
| 11,841,785 B1 | 12/2023 | Reddy |
| 2015/0135021 A1 | 5/2015 | Robison |
| 2016/0219332 A1 | 7/2016 | Asbun |
| 2018/0082052 A1 | 3/2018 | Swart |
| 2018/0321731 A1 | 11/2018 | Alfano et al. |
| 2019/0341057 A1 | 11/2019 | Zhang |
| 2020/0133358 A1 | 4/2020 | Mishra |
| 2020/0134151 A1 | 4/2020 | Magi et al. |
| 2020/0175209 A1 | 6/2020 | Yost |
| 2020/0250348 A1 | 8/2020 | Hamlin et al. |
| 2020/0326767 A1 | 10/2020 | Iyer et al. |
| 2021/0109486 A1 | 4/2021 | Hamlin et al. |
| 2021/0126909 A1 | 4/2021 | Iyer et al. |
| 2021/0149441 A1* | 5/2021 | Bartscherer ........... G06F 1/1616 |
| 2021/0200998 A1 | 7/2021 | Ghose |
| 2021/0240254 A1 | 8/2021 | Hamlin et al. |
| 2021/0240493 A1 | 8/2021 | Hamlin |
| 2021/0240842 A1* | 8/2021 | Hamlin .................. G01S 17/08 |
| 2021/0243595 A1 | 8/2021 | Buck |
| 2021/0329165 A1 | 10/2021 | Liu |
| 2024/0086528 A1 | 3/2024 | Zhang |
| 2024/0241564 A1 | 7/2024 | Alfano |
| 2024/0241933 A1 | 7/2024 | Alpay |
| 2024/0241934 A1 | 7/2024 | Reddy |
| 2024/0241935 A1 | 7/2024 | Reddy |
| 2024/0241942 A1 | 7/2024 | Alpay |
| 2024/0242533 A1 | 7/2024 | Reddy |
| 2024/0242534 A1 | 7/2024 | Reddy |

OTHER PUBLICATIONS

Dell, Dell Optimizer, "Verson 3.1 User's Guide", May 2022, 50 pgs.
Dell Technologies, Dell Optimizer, User Guide Publication Dates, 2022, 2 pgs.

* cited by examiner

| Users detected | System Configuration | Security Setting | Display Configuration |
|---|---|---|---|
| None | Any | No change | No change |
| User A | LCD only | Privacy screen on | No change |
| User B | Any | No change | Windows minimized Blur screen on externals only |

FIG. 11

| TMU Event | Kerberos | FIDO | Hello |
|---|---|---|---|
| Trusted User arrival | No change | Clear | No change |
| Unknown User arrival | Refresh | Clear | Clear |
| Trusted or Unknown User departure | No change | Refresh | Refresh |

FIG. 13

SYSTEM AND METHODS FOR MANAGING DISTRIBUTED USER PRESENCE NOTIFICATIONS

CROSS-REFERENCE TO RELATED APPLICATION(S)

This application is related to the application entitled "System and Methods for Waking and Locking an Information Handling System in a Multi-User Environment," naming Karun P. Reddy, Daniel L. Hamlin, Keith M. Alfano, Mandy C. Phelps and Banu Alpay Waldman as inventors, filed Jan. 18, 2023, application Ser. No. 18/098,211, which application is incorporated herein by reference.

This application is related to the application entitled "Systems and Methods for Controlling Enrollment Status of a Trusted User Based on Time," naming Karun P. Reddy, Daniel L. Hamlin, Mandy C. Phelps, Banu Alpay Waldman and Keith M. Alfano as inventors, filed Jan. 18, 2023, application Ser. No. 18/098,218, which application is incorporated herein by reference.

This application is related to the application entitled "System and Methods for Managing a System Wake Event for an Information Handling System Based on User Presence," naming Banu Alpay Waldman, Keith M. Alfano, Mandy C. Phelps, Karun P. Reddy and Daniel L. Hamlin as inventors, filed Jan. 18, 2023, application Ser. No. 18/098,204, which application is incorporated herein by reference.

This application is related to the application entitled "System and Methods for Managing System Configuration Settings and Session Retainment Based on User Presence," naming Karun P. Reddy, Mandy C. Phelps, Daniel L. Hamlin, Keith M. Alfano, and Banu A. Waldman as inventors, filed Jan. 18, 2023, application Ser. No. 18/098,200, which application is incorporated herein by reference.

This application is related to the application entitled "Systems and Methods for Enrolling New Users within a Database of Trusted Users," naming Karun P. Reddy, Daniel L. Hamlin, Keith M. Alfano, Mandy C. Phelps, and Banu Alpay Waldman as inventors, filed Jan. 18, 2023, application Ser. No. 18/098,213, which application is incorporated herein by reference.

This application is related to the application entitled "Systems and Methods for Provisioning a Database of Trusted Users Stored within One or More Information Handling Systems," naming Karun P. Reddy, Daniel L. Hamlin, Keith M. Alfano, Banu Alpay Waldman, and Mandy C. Phelps, as inventors, filed Jan. 18, 2023, application Ser. No. 18/098,216, which application is incorporated herein by reference.

This application is related to the application entitled "Systems and Methods for Provisioning a Database of Trusted Users based on Location," naming Banu Alpay Waldman, Keith M. Alfano, Mandy C. Phelps, Karun P. Reddy, and Daniel L. Hamlin as inventors, filed Jan. 18, 2023, application Ser. No. 18/098,208, which application is incorporated herein by reference.

This application is related to the application entitled "System and Methods for Monitoring User Presence in a System Having Multiple User Presence Detection (UPD) Capable Devices," naming Karun P. Reddy, Daniel L. Hamlin, Keith M. Alfano, Banu Alpay Waldman, and Mandy C. Phelps, as inventors, filed Jan. 18, 2023, application Ser. No. 18/098,217, which application is incorporated herein by reference.

BACKGROUND OF THE INVENTION

Field of the Invention

The present invention relates in general to the field of information handling systems, and more particularly to a system and methods for managing distributed user presence notifications.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

User Presence Detection (UPD) technology is integrated within a wide variety of information handling systems (IHSs). An IHS having UPD capabilities (i.e., a UPD-capable IHS) may be generally configured to detect the presence of a user within a field of view (FOV) of the system and perform various actions in response thereto. For example, a UPD-capable IHS may be configured to automatically wake from a locked or low power state, turn on the display and display the login screen whenever a user is detected within the system FOV. A UPD-capable IHS may also be configured to automatically lock an active system session when the user walks away and leaves the system FOV for an extended period of time.

Some UPD-capable information handling systems may detect the presence of another user behind the user and/or determine when a user looks away from their display screen. For example, some UPD-capable information handling systems may display an on-screen alert on a user's display screen when the user is present and an additional user (e.g., an "onlooker") is detected within the system FOV. To protect the user's privacy, the on-screen alert may provide options to reduce visibility of the user's display screen (e.g., by texturizing the display screen or activating a display screen privacy mode). In some UPD-capable information handling systems, display screen brightness or visibility may be reduced when a user looks away from the display screen for longer than a preset time limit, and may be restored to original levels when the user faces the display screen.

However, problems arise when conventional UPD-capable information handling systems are utilized in environments in which multiple users are present (otherwise referred to as multi-user environments). For example, a user may use login credentials to authenticate into a UPD-capable IHS, becoming an authenticated user for a current system session. The system may be subsequently locked, or placed in a low power state. When user presence is again detected within the system FOV, the wake method described above will automatically wake the system, turn on the display screen and display the login screen upon detecting the presence of any user (not just the authenticated user). Since there is currently no way to configure the wake method to customize when and who is permitted to wake the information handling system, this wake method leads to spurious system wake events and aggregated power losses.

Other problems arise with currently available lock methods. After a user authenticates into a UPD-capable IHS using their login credentials, the current system session may remain active until the authenticated user: (a) logs out of the session, (b) manually locks the session, or (c) leaves the system FOV for a period of time that exceeds a predetermined lock time setting (e.g., 60 seconds). When the authenticated user leaves without logging out or manually locking the session, there is potential for an untrusted user to gain access to the user's system before the predetermined lock time expires and the session is locked.

SUMMARY OF THE INVENTION

Therefore, a need has arisen for systems and methods that improve security and reduces power loss in a UPD-capable IHS utilized in multi-user environments.

In order to meet such need, the present disclosure provides various embodiments of systems and methods for managing and operating a UPD-capable IHS within a multi-user environment. The systems and methods described herein overcome problems that occur when conventional UPD-capable systems are utilized in a multi-user environment by providing and utilizing a database of trusted users (otherwise referred to herein as a trusted multi-user (TMU) database). As described in more detail below, the TMU database may contain one or more trusted users and biometric data obtained for each trusted user enrolled in the TMU database. In some embodiments, the TMU database may also include policy managed limitations and/or TMU configuration settings for the trusted user(s).

Whenever a user (e.g., an authenticated user or another user) is detected within the system FOV, the systems and methods described herein compare biometric data obtained from the user with biometric data stored within the TMU database to determine whether the user is a trusted user enrolled in the TMU database or an unknown/untrusted user not enrolled in the TMU database (otherwise referred to herein as a TMU status of the user). In some embodiments, the biometric data obtained from the user may also be compared with the biometric data stored within the TMU database to determine the identity of the user. The systems and methods described herein may then perform various actions based on the TMU status or the identity of the user detected within the system FOV.

The systems and methods described herein may perform a wide variety of actions based on the TMU status or the identity of the user detected within the system FOV. In some embodiments, for example, the systems and methods described herein may automatically lock a UPD-capable IHS without waiting for a predetermined lock time to expire when an authenticated user walks away from the UPD-capable IHS and another user is detected within the system FOV. If an authorized user walks away without logging out of or manually locking their system, the systems and methods described herein may continue to monitor user presence after the authorized user leaves the system FOV, identify any users detected within the system FOV as a trusted user or an unknown/untrusted user, and immediately lock when an unknown/untrusted user is detected within the system FOV before the predetermined lock time expires. This may improve system security by preventing unauthorized users from gaining access to the authenticated user's system.

In other embodiments, the systems and methods described herein may be used to control system wake events. For example, some embodiments described herein may wake a locked UPD-capable IHS only when a trusted user, which is enrolled within the TMU database, approaches the system and is detected within the system FOV. When an unknown/untrusted user is detected within the system FOV, the systems and methods described herein may wait for other input (e.g., physical operation of power button, mouse, keyboard, etc.) to wake the system. This eliminates spurious wake events and reduces aggregated power losses. Other embodiments disclosed herein may be wake the IHS in a secured operating mode when the presence of a user, other than the authenticated user, is detected within the system FOV during the system wake event. This prevents potential data theft or inappropriate viewing of the applications, windows and/or content that may be displayed on the display screen when the IHS is awakened in a multi-user environment.

In other embodiments, the systems and methods described herein may improve system security in a UPD-capable IHS located within a multi-user environment by managing system configuration settings and session retainment during an active system session. For example, some embodiments described herein may manage system configuration settings for an IHS during an active system session, based on the identity of a second user (e.g., a trusted user or an unknown user) and policy stored within the IHS, when the presence of a first user (e.g., an authenticated user) is detected within the system FOV. Other embodiments described herein may manage session revocation requirements for an active system session, based on the TMU status of the second user and policy stored within the IHS, when the presence of the first user is no longer detected within the FOV of the sensor.

In other embodiments, the systems and methods described herein may be used to collect, distribute and manage notifications of user presence. In some embodiments, notifications of user presence may be collected from a first IHS and distributed to a second IHS to provide notification of user presence events to the second IHS (or a user of the second IHS). In other embodiments, the notifications of user presence generated by the first IHS may be aggregated and/or analyzed by the second IHS to generate various metrics for the user presence events that occur at the first IHS. This enables security (and other policies) to be set in a data-based, empirically driven way.

Each of the embodiments described above utilizes a TMU database of trusted users. Systems and methods are provided herein for enrolling trusted users within a TMU database, and controlling the enrollment status of trusted users enrolled within a TMU database based on time. Systems and methods are also provided herein for provisioning a TMU database stored within one or more information handling systems. For example, the systems and methods disclosed herein may utilize a TMU database, a database template and/or policy stored within a remote IHS (such as, e.g., a cloud or backend server) to remotely manage and provision a TMU database stored locally within one or more information handling systems. In doing so, the systems and methods disclosed herein may be used to securely back-up and restore a TMU database stored locally within an IHS, remotely manage enrollment and provisioning of a TMU database stored locally within one or more information handling systems based on location and/or policy, and apply TMU configuration settings globally to TMU databases stored locally within a plurality of information handling systems.

Systems and methods are also provided herein to monitor user presence, and manage various actions in response to user presence, within a system comprising multiple UPD-capable devices. In some embodiments, the systems and methods disclosed herein may collect user presence data from a plurality of UPD-capable devices, monitor the user presence data collected from the plurality of UPD-capable devices to accurately identify a user's presence, attention and/or engagement with a particular UPD-capable device, and manage various actions performed within the particular UPD-capable device (such as, e.g., waking or locking the UPD-capable device, managing system configuration settings or session revocation requirements specified for the particular UPD-capable, displaying notifications on a display screen of the particular UPD-capable, etc.) based on said monitoring. In doing so, the systems and methods disclosed herein may reduce or eliminate problems that may otherwise occur when multiple UPD-capable devices are used within a system to monitor user presence.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 11 is a table illustrating an example policy that may be used to manage system configuration settings during an active system session when a trusted user is detected within the field of view of the IHS;

FIG. 13 is a table illustrating an example policy that may be used to manage session retainment based on the user(s) present within the field of view of the IHS during an active system session;

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
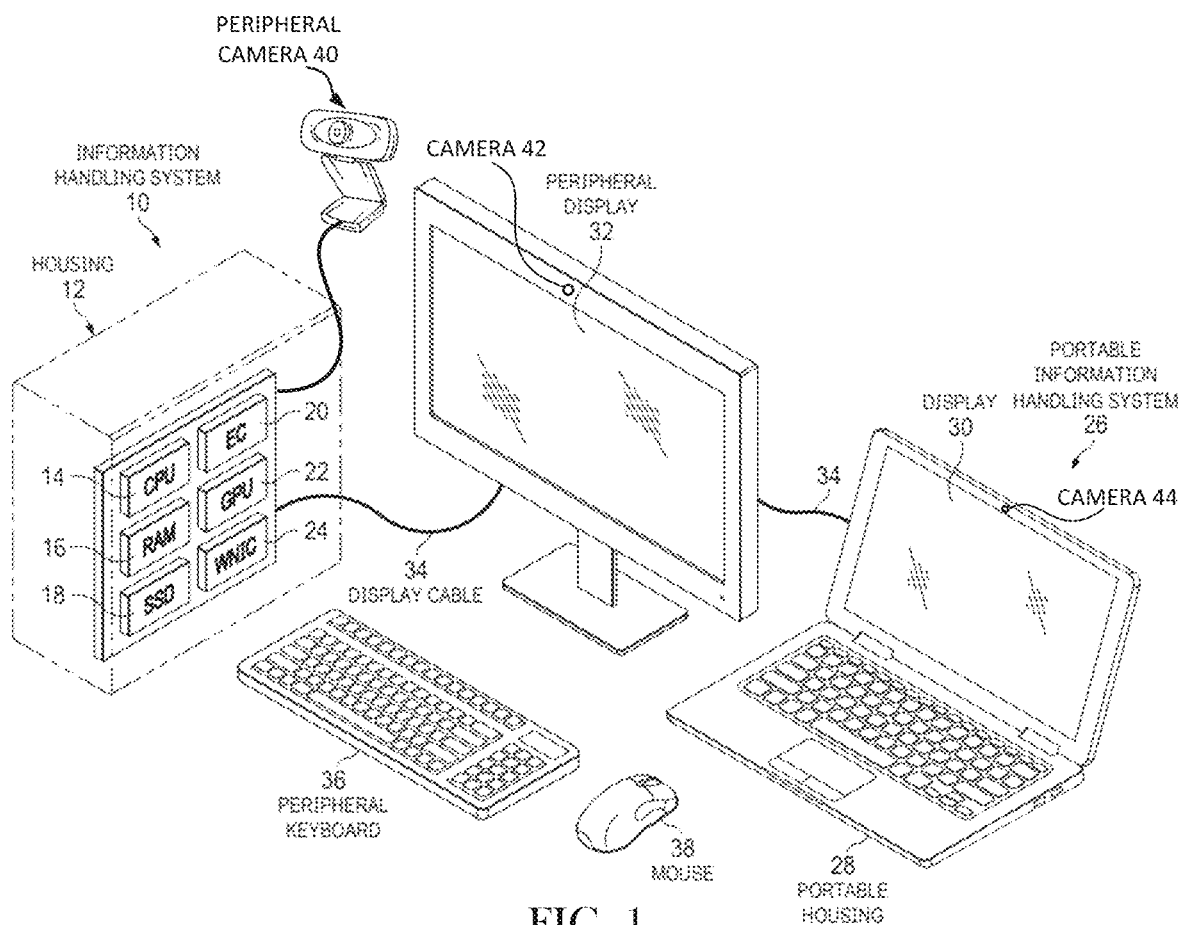
FIG. 1 is a perspective view of a system including multiple information handling systems and peripheral devices.

Turning now to the drawings, FIG. 1 is a perspective view of a system including multiple information handling systems and associated peripheral devices. Examples of information handling systems include information handling systems having stationary configurations (such as, e.g., a desktop computer, a server, etc.) and portable information handling systems (such as, e.g., a laptop computer, a tablet computer, a smart phone, an Internet of Things (IOT) device, etc.). In the example shown in FIG. 1, information handling system 10 is a desktop computer and portable information handling system 26 is a laptop computer. IHS 10 and portable IHS 26 each include a housing 12/28 containing a variety of hardware and software components, which function together to process information.

As shown in FIG. 1, IHS 10 may generally include a host processor (e.g., a central processing unit, CPU 14), a system memory (e.g., random access memory, RAM 16), a computer readable storage device (e.g., a solid state drive, SSD 18), an embedded controller (EC) 20, a graphics processing unit (GPU) 22 and a wireless network interface controller (NIC) 24. Similar components may be included within portable information handling system 26. Additional components not shown in FIG. 1 may also be included within IHS 10 and portable IHS 26, as discussed further herein.

The hardware and software components included within IHS 10 and portable IHS 26 cooperate to process information, control system operation and manage information input/output between the IHS and other systems and devices connected thereto. In the example shown in FIG. 1, CPU 14 executes program instructions to process information in cooperation with RAM 16 (i.e., volatile memory), which temporarily stores the program instructions and information while power is applied to the IHS. Unlike RAM 16, SSD 18 utilizes non-transitory memory (e.g., persistent or non-volatile memory, such as flash memory) to store program instructions and data that persist even after power is removed from the IHS. For example, SSD 18 may persistently store an operating system (OS), applications, services and drivers, which can be supplied at power up to RAM 16 for execution by CPU 14.

EC 20 manages operational conditions of the IHS, such as application of power to the processing components, maintenance of thermal constraints and interactions with peripheral devices. GPU 22 receives visual image information from CPU 14 and processes the visual information to define visual images for presentation on a display, such as the display 30 integrated within portable IHS 26 or the peripheral display 32 coupled to IHS 10. NIC 24 includes a radio that transmits and receives wireless signals to communicate information to/from the IHS over one or more wireless networks, such as a wireless local area network (WLAN) like Wi-Fi and/or a wireless personal area network (WPAN) like Bluetooth.

IHS 10 and portable IHS 26 may further include, or be coupled to, a wide variety of peripheral devices, such as but not limited to, the peripheral display 32, keyboard 36, mouse 38 and cameras 40, 42 and 44 shown in FIG. 1. Peripheral display 32 may be coupled to IHS 10 and/or portable IHS 26 via a display cable 34 for displaying visual content and information to the user. Keyboard 36 and mouse 38 may be coupled via wired or wireless connections to IHS 10 and/or portable IHS 26 for communicating input from a user to the IHS. Although not shown in FIG. 1, peripheral speakers may also be coupled to IHS 10 and/or portable IHS 26 for providing audio output from the IHS to the user. Likewise, a microphone may be incorporated within or coupled to the IHS 10 and/or portable IHS 26 for receiving audio input from the user and/or the user's environment.

As shown in FIG. 1, a variety of cameras may be coupled to (or included within) an information handling system for capturing visual input (e.g., images and/or visual information) from the user and/or the user's environment. For example, peripheral camera 40 may be a webcam, which is connected to IHS 10 via a wired connection (such as, e.g., a universal serial bus, USB, cable) for capturing visual and audio input from the user and/or the user's environment. Cameras may also be integrated within the housing of an IHS or peripheral device. In the embodiment shown in FIG. 1, for example, camera 42 is integrated within the peripheral display 32 and camera 44 is integrated within portable IHS 26 for capturing visual input from the user and/or the user's environment.

Some information handling systems and peripheral devices are equipped with user presence detection (UPD) technology. These systems and peripheral devices use a combination of hardware and software to detect the presence of a user within a field of view of the IHS and perform various actions in response thereto. For example, a UPD-capable system or device may generally include a sensor (e.g., a camera, image sensor or other proximity sensor) for obtaining data pertaining to user presence. UPD-capable systems and devices may also include, or be coupled to, a processing device that executes program instructions for analyzing the data obtained by the sensor to detect user presence (or absence) within a FOV of the sensor and/or system.

The IHS 10 and portable IHS 26 shown in FIG. 1 are examples of UPD-capable information handling systems having at least one sensor (e.g., peripheral camera 40 and camera 44, respectively) and a processing device, as described above. Peripheral display 32 is an example of a UPD-capable peripheral device, which includes a sensor (e.g., camera 42) for obtaining data pertaining to user presence, and is coupled to a processor within IHS 10 or portable IHS 26 via, e.g., display cable 34.

Figure 2:
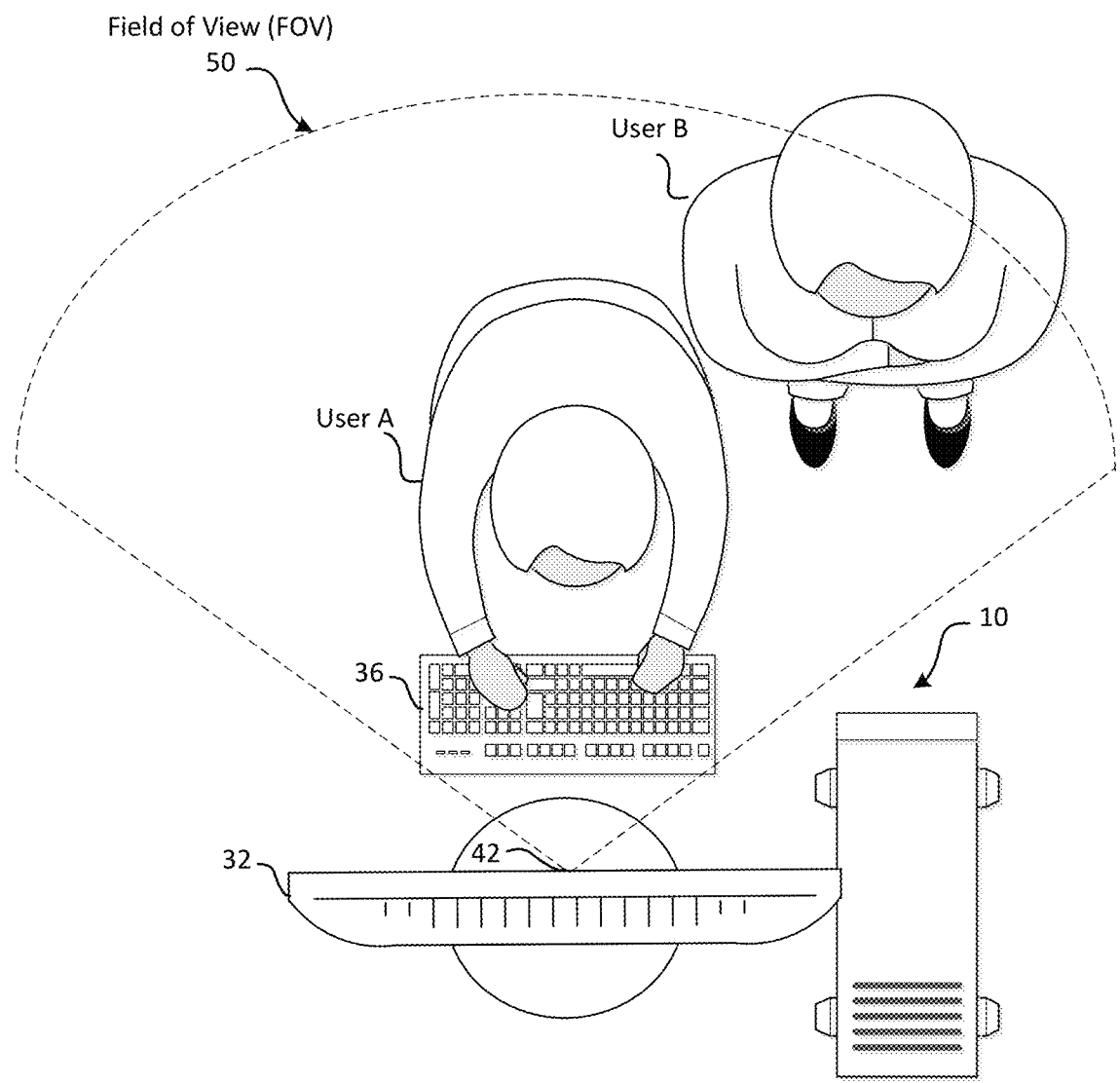
FIG. 2 is a top-down view depicting one embodiment of an IHS having user presence detection (UPD) capabilities, illustrating user presence detection of one or more users (e.g., User A and User B) within a field of view (FOV) of the UPD-capable IHS.

As shown in FIG. 2, a UPD-capable IHS (such as, e.g., IHS 10) may detect the presence of one or more users (e.g., User A and/or User B) when the user(s) is/are present within a field of view (FOV) 50 of the UPD-capable IHS. More specifically, the UPD-capable IHS may detect the presence of a user when the user is present within a FOV 50 of a sensor utilized by the system to detect user presence or absence. In the embodiment illustrated in FIG. 2, user presence of User A and User B is detected when User A and User B are present within the FOV 50 of the camera 42 included within the peripheral display 32. When User A or User B walks away and leaves the FOV 50, the absence of that user is detected.

A UPD-capable IHS in accordance with the present disclosure is not strictly limited to a single sensor (or FOV 50), as shown in FIG. 2, and may utilize a wide variety of inputs to detect user presence and absence. For example, a UPD-capable IHS may process visual input received from one or more cameras (e.g., one or more of cameras 40, 42 and 44) to detect the presence of a user within the field of view of the one or more cameras. Other input, such as audio input received from a microphone or sensor input received from an integrated proximity sensor (e.g., a time-of-flight sensor, an ultrasound sensor, Wi-Fi doppler, radio frequency radar and/or ultra-wide band (UWB) sensor) may also be used to detect the presence (or absence) of a user within the system FOV. The UPD-capable IHS may then perform various actions (such as, e.g., waking or locking the UPD-capable IHS) based on the presence (or absence) of the user within system FOV.

As noted above, conventional UPD-capable information handling systems suffer from various disadvantages when utilized in environments in which multiple users are present within the system FOV (otherwise referred to as multi-user environments). For example, lock methods used in conventional UPD-capable information handling systems rely on timeouts to lock an authenticated user's system when the authenticated user (e.g., User A) walks away without logging out of or manually locking their system and leaves the system FOV for a period of time that exceeds a predetermined lock time setting (e.g., 60 seconds). However, timeouts cannot always be relied upon to prevent another user (e.g., User B) from gaining unauthorized access to the authenticated user's system in a multi-user environment. Wake methods used in conventional UPD-capable information handling systems also suffer when utilized in a multi-user environment. As noted above, currently available wake methods suffer from spurious system wake events and aggregated power losses by automatically waking the information handling system, turning on the display screen and displaying the login screen upon detecting the approach of any user (not just the authenticated user).

In order to overcome the disadvantages mentioned above, the present disclosure provides various embodiments of systems and methods for managing and operating a UPD-capable IHS within a multi-user environment. The systems and methods described herein overcome the problems that occur when conventional UPD-capable information handling systems are utilized in a multi-user environment by providing and utilizing a database of trusted users (otherwise referred to herein as a trusted multi-user (TMU) database). As described in more detail below, the TMU database may contain one or more trusted users and biometric data obtained for each trusted user enrolled in the TMU database. In some embodiments, the TMU database may also include policy managed limitations and/or TMU configuration settings for the trusted user(s).

Whenever a user (e.g., an authenticated user or another user) is detected within the system FOV, the systems and methods described herein compare biometric data obtained from the user with biometric data stored within the TMU database to determine whether the user is a trusted user enrolled in the TMU database or an unknown/untrusted user not enrolled in the TMU database (otherwise referred to herein as a TMU status of the user). In some embodiments, the biometric data obtained from the user may be further compared with the biometric data stored within the TMU database to determine the identity of the user. The systems and methods described herein may then perform various actions, such as waking a locked information handling system and/or locking an active system session, based on the TMU status or the identity of the user detected within the system FOV.

Example Information Handling System Configuration

Figure 3A:
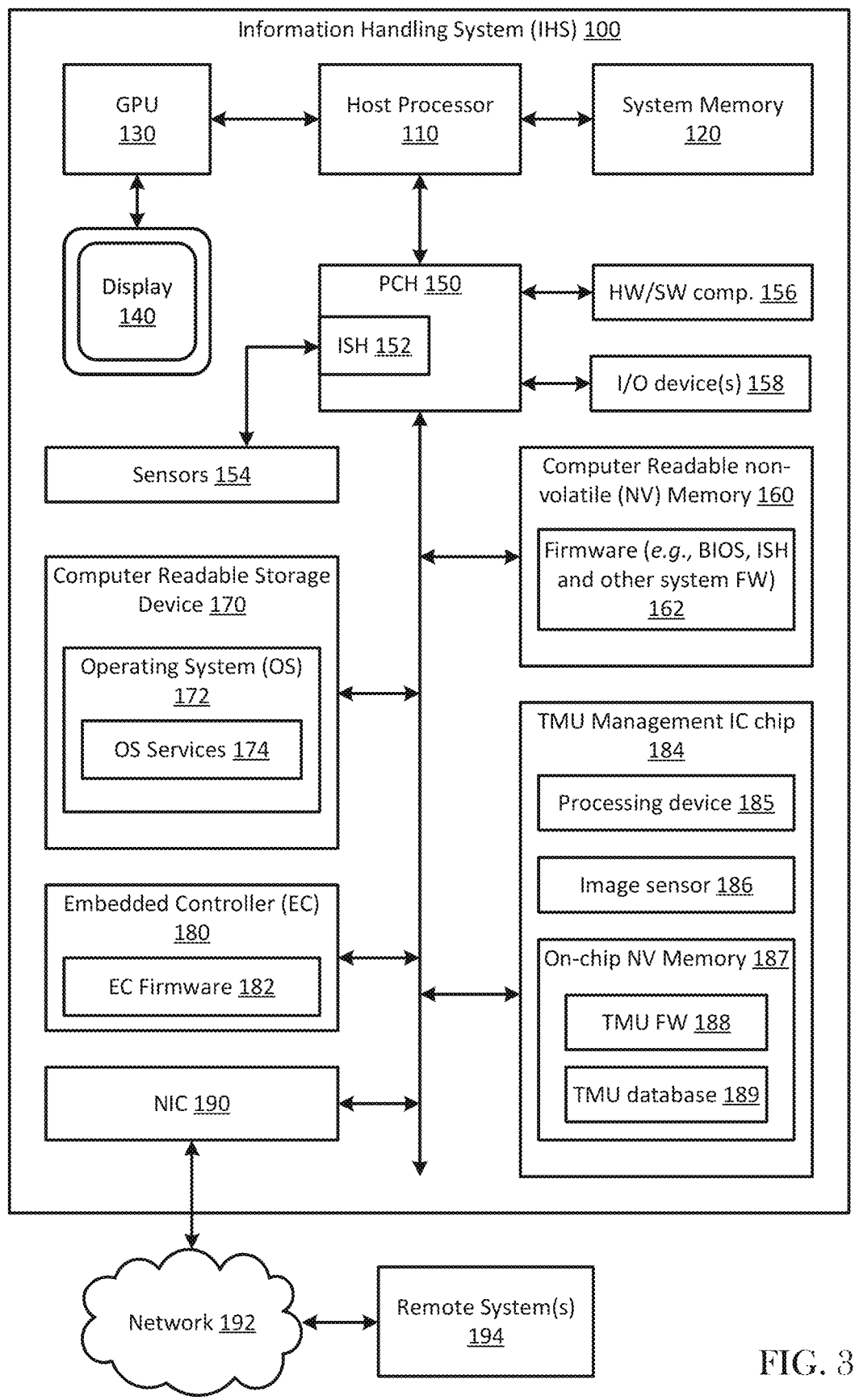
FIG. 3A is a block diagram illustrating example hardware, software and firmware components included within an IHS in accordance with the present disclosure.

FIG. 3A is a block diagram illustrating one embodiment of an information handling system 100 (e.g., a desktop computer, laptop computer, tablet computer, etc.) as it may be configured according to one embodiment of the present disclosure. As shown in FIG. 3A. IHS 100 may generally include a host processor 110, a system memory 120, a graphics processor unit (GPU) 130, a display device 140, a platform controller hub (PCH) 150 having an integrated sensor hub (ISH) 152, a plurality of sensors 154 coupled to the ISH 152, additional hardware/software components 156 and one or more input/output (I/O) devices 158. The IHS 100 may also include a computer readable non-volatile (NV) memory 160, a computer readable storage device 170, an embedded controller (EC) 180, a trusted multi-user management integrated circuit (IC) chip 184 and a wireless network interface controller (NIC) 190.

It is expressly noted that the IHS configuration shown in FIG. 3A is exemplary, and that the methods disclosed herein may be implemented on any type and/or configuration of information handling system. It will be further understood that while certain components of the information handling system are shown in FIG. 3A for illustrating embodiments of the present disclosure, the information handling system disclosed herein is not restricted to including the components shown in FIG. 3A and described below.

Host processor 110 may include various types of programmable integrated circuits (e.g., a processor such as a controller, microcontroller, microprocessor, application specific integrated circuit, ASIC, etc.). According to one embodiment, host processor 110 may include at least one central processing unit (CPU) having one or more processing cores. System memory 120 is coupled to host processor 110 and configured to store program instructions that are executed by host processor 110. System memory 120 may include various types of volatile memory, such as but not limited to, random access memory (RAM), static RAM (SRAM), dynamic RAM (DRAM), synchronous dynamic RAM (SDRAM). GPU 130 is coupled to host processor 110 and configured to coordinate communication between the host processor and one or more display components of the IHS. In the embodiment shown in FIG. 3A, GPU 130 is coupled to display device 140 and configured to provide visual images to the user. Although GPU 130 is shown as a separate processing device in the embodiment of FIG. 3A, GPU 130 may be omitted when the functionality provided thereby is integrated within host processor 110 in a system-on-chip (SoC) design.

Platform controller hub (PCH) 150 is coupled to host processor 110 and configured to handle I/O operations for the IHS. PCH 150 may include a wide variety of communication interfaces and ports for communicating with various system components, such as additional hardware/software components 156, input/output (I/O) devices 158, computer readable NV memory 160, computer readable storage device 170, EC 180, TMU management IC chip 184 and NIC 190.

In the example embodiment shown in FIG. 3A, PCH 150 includes an integrated sensor hub (ISH) 152 for receiving and processing sensor data and other system data. ISH 152 is coupled to receive sensor data from one or more sensors 154. In some embodiments, the sensor data received from the sensor(s) 154 may be used to detect the presence of a user (i.e., detect user presence) and generate user presence data. Example sensor(s) 154 that may be used to generate user presence data include, but are not limited to, a camera, an image sensor, an eye tracking device, an optical scanner, an infrared time-of-flight (TOF) sensor, a motion sensor, an infrared (IR) sensor, a temperature sensor, an acoustic sensor, a vibration sensor, a fingerprint reader, an ultrasound sensor, a Wi-Fi doppler sensor, a radio frequency (RF) radar sensor, an UWB sensor and other types of proximity sensors used detect user presence. In some embodiments, the ISH 152 (or an OS service 174 executed by the host processor 110) may analyze the sensor data collected by one or more of the sensors 154 to generate user presence data. For example, the sensor data can be analyzed to determine if a user is physically present or absent within a field of view of the sensor(s) 154.

In some embodiments, the sensor data received from the sensor(s) 154 may be used to determine an identity of the user present within the field of view of the sensor(s) 154. For example, in addition to detecting user presence, a number of the sensors mentioned above can be used to obtain biometric data from the user that can be analyzed to determine an identity of the user present within the field of view of the sensor(s) 154. As used herein, "biometric data" is any biological (e.g., anatomical or physiological) and/or behavioral characteristic of a user that can be measured by a sensor 154 and used to recognize or identify the user. For example, a fingerprint reader can be used to obtain a fingerprint from the user, an optical scanner can be used to obtain a retinal and iris scan from the user, a camera, image sensor or TOF sensor can be used to obtain facial landmarks (e.g., eyes, eyebrows, nose, mouth, cheeks, chin, etc.) or facial patterns from the user, an acoustic or vibration sensor can be used to obtain voice signatures or gait characteristics from the user, etc. Because the biometric data obtained from the user is unique to that user, the biometric data may be analyzed and compared with previously stored biometric data to determine an identity of the user present within the field of view of the sensor(s) 154.

In one example implementation, sensor(s) 154 may include an infrared (IR) TOF sensor for obtaining data that can be used to detect user presence and/or determine an identity of the user. IRTOF sensors illuminate an area where a user is expected (such as, e.g., in front of a display screen) with an infrared light source and detect objects (e.g., users) based upon the time of flight of IR reflections detected at the sensor. In one example, an IRTOF sensor scans the IR light source as a narrow beam across a plurality of scan sectors to detect changes in distance (or depth) to objects or features in each sector. In some cases, the IR reflections detected at the IRTOF sensor may detect movement of an object over time, indicating the presence of a user. However, because the IRTOF sensor uses IR light to obtain depth information, the IR reflections detected at the IRTOF sensor may also be used to obtain biometric data (e.g., facial landmarks or patterns from the user's face), which can be used to determine an identity of the user. In some embodiments, the facial landmarks obtained from the user's face can be combined, aggregated or otherwise analyzed by facial recognition software to form a facial identifier (or "face ID") for the user. IRTOF sensors provide a high degree of accuracy and sensitivity, while consuming very little power and processing resources, and thus, may be preferred in some embodiments.

In addition to receiving sensor data from the sensor(s) 154, ISH 152 may also receive system state information from a plurality of hardware and/or software components of the IHS. Example hardware and software components that may be used to provide system state information to ISH 152 include, but are not limited to, OS 172, EC 180, and NIC 190. For example, ISH 152 may be coupled to receive geographic location and system performance data from OS 172, system state information from EC 180 and/or network information from NIC 190. ISH 152 may also be configured to store policy that may be used for managing system wake events, as described in more detail below.

In some embodiments, additional hardware/software components 156 may be included within IHS 100. For example, hardware/software components 156 may include, but are not limited to, an audio controller, a network controller (e.g., a Bluetooth or Wi-Fi controller), a USB controller, a Global Positioning System (GPS) sensor, a display controller, etc. In some embodiments, one or more of the additional hardware/software components 156 may provide system state information to ISH 152. For example, ISH 152 may be coupled to receive audio activity (e.g., a 3D time-of-flight location of a user, multiuser information and/or audio speaker recognition) from an audio controller. In addition or alternatively, ISH 152 may be coupled to receive geographic location information from a GPS sensor or network controller.

I/O devices 158 enable the user to interact with IHS 100, and to interact with software/firmware executing thereon. Examples of I/O devices 158 include, but are not limited to, keyboards, keypads, touch screens, mice, and any other devices suitable for entering or retrieving data. In some embodiments, a user of the IHS 100 may utilize one or more I/O devices 158 to provide input (e.g., a PIN, password, passphrase, fingerprint, facial image, etc.) to the system for authentication purposes. In other embodiments, a user may utilize one or more I/O devices 158 to intentionally wake the IHS 100 from locked or a low power state, or intentionally lock or log out of an active system session.

Computer readable memory 160 may include any type of non-volatile (NV) memory including, but not limited to, read-only memory (ROM), Flash memory and non-volatile random-access memory (NVRAM), and may be generally configured to store software and/or firmware modules. For example, computer readable NV memory 160 may be configured to store firmware 162, such as BIOS firmware, ISH firmware and other system firmware.

Computer readable storage device 170 may be any type of persistent, non-transitory computer readable storage device, such as one or more hard disk drives (HDDs) or solid-state drives (SSDs). Computer readable storage device 170 may be generally configured to store software and/or data, such as operating system (OS) 172 and various OS applications, drivers and data. In addition, computer readable storage device 170 may store various OS services 174, which may be executed by the host processor 110 to perform a variety of functions.

In some embodiments, for example, host processor 110 may execute one or more the OS services 174 to obtain TMU status and other TMU information from a firmware service running in the TMU management IC chip 184, collect system session information (e.g., system configuration settings) from the OS 172, identify TMU configuration settings specified for the system session, and modify system configuration settings and/or session revocation requirements (e.g., revoke system authentication, lock the active system session and/or trigger the login screen) based on changes in TMU status and policy configured and distributed to the IHS 100. The OS services 174 may be further executed by the host processor 110 to perform other functions, as discussed further herein.

EC 180 may generally include memory (e.g., RAM) for storing EC firmware 182 and a processing device (e.g., a controller, microcontroller, microprocessor, ASIC, etc.) for executing program instructions stored within the EC firmware 182. In some embodiments, EC 180 may execute EC firmware 182 to obtain a TMU status from a firmware service running in the TMU management IC chip 184, and modify the policy stored within the ISH 152 for managing system wake events based on the TMU status. In other embodiments, EC 180 may execute EC firmware 182 to obtain a notification of user presence (e.g., an onlooker event notification) from a firmware service running in the TMU management IC chip 184. The EC 180 may store the notification locally within the EC 180 or provide the notification to a remote management service running on a remote system 194.

In the embodiment shown in FIG. 3A, IHS 100 includes a TMU management IC chip 184 comprising an on-chip processing device 185 (e.g., a machine learning co-processor), a CMOS image sensor 186 and a non-volatile memory 187 (e.g., a Flash memory). Although not restricted to such, the TMU management IC chip 184 may be implemented as a lid controller hub (LCH) or AI companion die, in some embodiments.

The TMU management IC chip 184 utilizes "always on" vision sensing to provide secure, low power user presence detection. For example, the CMOS image sensor 186 may be used to obtain user presence data, which may be analyzed by artificial intelligence (AI) algorithms running on the processing device 185 to detect the presence (or absence) of a user. In some embodiments, the CMOS image sensor 186 may obtain biometric data from the user, which may be analyzed by the AI algorithms running on the processing device 185 to detect the presence of a user and determine an identity of the user. In one example implementation, the biometric data obtained by CMOS image sensor 186 may be used to detect various landmarks (e.g., eyes, eyebrows, nose, mouth, cheeks, chin, etc.) of the user's face. In some embodiments, the facial landmarks obtained from the user's face can be combined, aggregated or otherwise analyzed by facial recognition software to form a facial identifier (or "face ID") for the user.

The user presence data and/or biometric data obtained by the TMU management IC chip 184 is securely stored within the TMU management IC chip 184 and protected from online hackers and OS applications. In some embodiments, the user presence data and/or biometric data obtained by the TMU management IC chip 184 may be combined with sensor data obtained from other proximity sensors (such as one or more of sensors 154) to provide secure, low power, always on user presence detection with context awareness of the user and the surrounding environment.

Figure 3B:
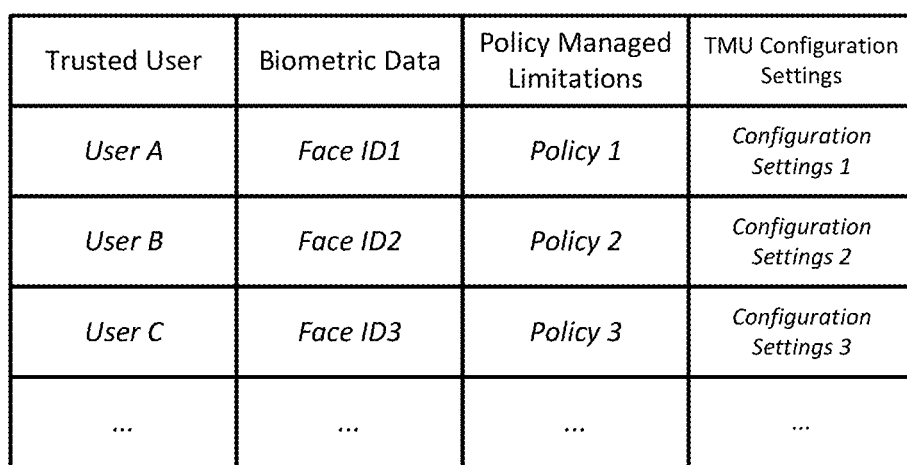
FIG. 3B is a table illustrating one example of a database of trusted users.

As shown in FIG. 3A, the on-chip non-volatile (NV) memory 187 included within the TMU management IC chip 184 is configured to store TMU firmware 188 and a TMU database 189. One or more users, which are trusted to view/interact with a particular IHS, user profile or system session (i.e., trusted users), may be enrolled within the TMU database 189. FIG. 3B illustrates one example of a TMU database 189 in accordance with the present disclosure.

As shown in FIG. 3B, TMU database 189 includes biometric data, which is obtained for each trusted user (e.g., User A, User B, User C) enrolled in the TMU database 189. Although a wide variety of biometric data may be used, a face ID (e.g., Face ID1, Face ID2, Face ID3) generated by combining various facial landmarks (e.g., eyes, eyebrows, nose, mouth, cheeks, chin, etc.) obtained from a trusted user's face may be stored within the TMU database 189 as biometric data, in at least one preferred embodiment. In addition to storing biometric data for trusted users, the TMU database 189 may also store policy managed limitations and/or TMU configuration settings, as described further herein. The information stored within the TMU database 189 may be collectively referred to herein as "TMU information."

In some embodiments, the TMU information (e.g., the trusted user(s), biometric data, policy managed limitations and TMU configuration settings) stored within the TMU database 189 may correspond to a particular IHS, a particular user profile or a particular system session. In some embodiments, the TMU database 189 stored within a shared client device may include a set of trusted users (and associated TMU information) that is trusted to view/interact with that particular machine. In other embodiments, the set of trusted users (and associated TMU information) stored within the TMU database 189 may correspond to a particular user profile or system session, rather than a particular machine. For example, when a user logs into an IHS (e.g., a shared or personal client device) and becomes an authenticated user, TMU information associated with the authenticated user's profile may be loaded into and stored within the TMU database 189. In some embodiments, the TMU information stored within the TMU database 189 for a particular user profile may change, depending on the location of the IHS 100. For example, when IHS 100 moves from a first location (e.g., a first office location) to a second location (e.g., a second office location), the TMU database 189 stored within the on-chip NV memory 187 may be reprovisioned with a new set of TMU information corresponding to the second location.

In some embodiments, memory management techniques may be used to control or manage the size of the TMU database 189 stored within the on-chip NV memory 187. Updating or changing the TMU information stored within the TMU database 189 based on the user profile of the authenticated user or the location of the IHS are examples of memory management techniques that may be used to reduce the size of the TMU database 189 stored within the on-chip NV memory 187. In some cases, the size of the TMU database 189 may be further reduced by controlling the enrollment status of one or more trusted users enrolled in the TMU database 189. For example, the enrollment status of a trusted user enrolled in the TMU database 189 may be changed (e.g., from a trusted user to an untrusted user) based on time, as described in more detail below. Other techniques may be used to control or manage the size of the TMU database 189.

The TMU firmware 188 stored within the on-chip NV memory 187 includes the AI algorithms used for detecting user presence and determining user identity. The TMU firmware 188 also includes additional firmware services, which may be executed by the processing device 185 to perform TMU related functions. For example, firmware services included within the TMU firmware 188 may be executed by processing device 185 to continuously determine a TMU status of one or more users present within the system FOV by comparing biometric data obtained from the user(s) detected within the system FOV with the biometric data stored for the trusted user(s) enrolled within the TMU database 189. The TMU status may identify the user(s) as a trusted user (e.g., an authenticated user or friendly user) enrolled within the TMU database 189, or an unknown/untrusted user (e.g., an onlooker) that is not enrolled in the TMU database 189. The firmware services included within the TMU firmware 188 may also distribute the TMU status to various EC and OS services and perform other functions, as discussed further herein.

Examples of trusted users include authenticated users, friendly users and other trusted users that have been registered or enrolled within the TMU database 189. An authenticated user is a user that has undergone authentication (e.g., Window's Hello authentication) for an active system session. In some embodiments, an authenticated user may be enrolled within the TMU database 189 during the authentication process. Biometric data may also be obtained for the authenticated user during authentication and stored within the TMU database 189.

A friendly user is an additional user, which is not the authenticated user for the active system session, but is trusted to view/interact with the IHS, user profile or active system session. In some embodiments, a friendly user may be added to the TMU database 189 during the active system session. For example, when an additional user is detected within the system FOV, the authenticated user may be notified of the presence of the additional user via an on-screen notification (otherwise referred to herein as an onlooker event notification). If the authenticated user decides to share screen content with the additional user, the additional user may be tagged as a friendly user and enrolled within the TMU database 189 as a trusted user. During enrollment, biometric data for the friendly user is obtained and stored within the TMU database 189.

In some embodiments, the trusted users and associated TMU information may be stored within the TMU database 189 in a particular order. For example, TMU information corresponding to the authenticated user may be stored within a first table entry (e.g., the table entry corresponding to User A in FIG. 3B) of the TMU database 189. The TMU information corresponding to friendly users, which are enrolled within the TMU database 189 as trusted users, may be stored within subsequent table entries (e.g., table entries corresponding to User B and User C in FIG. 3B). In some embodiments, the order in which the friendly users are stored within the subsequent table entries may further depend on various factors. For example, friendly users and associated TMU information may be stored within the subsequent table entries in a consecutive order (e.g., the order in which each friendly user is detected within the system FOV and enrolled within the TMU database 189 over time). Alternatively, the frequency or number of times the friendly users are detected within the system FOV may affect the order in which the friendly users and associated TMU information are stored within the subsequent table entries. For example, friendly users detected more frequently within the system FOV may be stored in higher table entries, while friendly users detected less frequently are stored in lower table entries. Although the embodiments described herein are not restricted to such, storing the trusted users (e.g., the authenticated user and the friendly users) within the TMU database 189 in a particular order, as described above, may enable the TMU firmware 188 to determine the TMU status of user(s) present within the system FOV more quickly.

NIC 190 enables IHS 100 to communicate with one or more remotely located systems 194 via an external network 192 using one or more communication protocols. The external network 192 may be a local area network (LAN), a wide area network (WAN), or a personal area network (PAN), and the connection to and/or between IHS 100 and network 192 may be wired, wireless or a combination thereof. In some embodiments, IHS 100 may utilize NIC 190 to communicate with one or more remote systems 194, such as a cloud or backend server. As described in more detail below, the one or more remote systems 194 may contain back-up copies of TMU databases stored locally within one or more information handling systems, database template(s) for provisioning TMU databases stored locally within one or more information handling systems, and/or policy for managing enrollment and provisioning of the TMU databases stored locally within one or more information handling systems.

The IHS 100 shown in FIG. 3A illustrates one embodiment of a UPD-capable IHS that may be operated in a multi-user environment. Unlike conventional UPD-capable systems, the UPD-capable IHS described herein improves system security and reduces power loss in a multi-user environment by continuously: (a) monitoring user presence within the system FOV, (b) comparing biometric data obtained from the user(s) present within the system FOV with biometric stored within a database of trusted users (such as, e.g., TMU database 189), and (c) performing various actions based on the comparison. Examples of actions and other operations that may be performed by the UPD-capable IHS described herein are discussed in more detail below.

System and Methods for Waking and Locking an Information Handling System in a Multi-User Environment Improved systems and methods are provided in FIGS. 4-7 for waking and locking a UPD-capable IHS in a multi-user environment. As used herein, the term "lock" or "locking" refers to a security feature that restricts access to the IHS and the contents displayed on a display screen of the IHS. For example, an IHS may be manually locked by depressing the Windows key+L key to lock the active system session and trigger the display of a login screen on the display device. When an IHS is locked, applications previously opened during the active system session remain open and running. In contrast, applications running during the active system session are closed when the user logs out of the active system session.

As used herein, the term "wake" or "waking" means that the IHS is transitioned from a low power state to a full-power working state. When operating in a "low power state," the IHS consumes less power than it does when operating in the working state. The IHS as a whole, or individual hardware components thereof, are frequently transitioned to lower power states to save power.

As known in the art, an information handling system may operate in a variety of power states. For example, the Advanced Configuration and Power Interface (ACPI) specification defines five power states (S0-S5) ranging from highest to lowest power consumption. During the working state (S0), power is supplied to the hardware components of the IHS and the IHS is awake and running, regardless of whether the display screen is on or off. In the S0 low-power idle state (modern standby state), the IHS remains partially running so that it can easily switch to the working state in response to hardware or network events. Although the IHS appears to be turned "off" in sleep states S1-S3, volatile memory is kept refreshed to maintain system state and some hardware components remain powered so that the IHS can respond to system wake events. Power consumed in sleep states S1-S3 is less than S0 but more that S4 (hibernation state), with S3 consuming less power than S2 and S2 consuming less power than S1. In the hibernation state (S4), the IHS appears to be off and power consumption is reduced to its lowest level compared to the soft off state (S5), which is comprised of a full shutdown and boot cycle.

As known in the art, a variety of system wake events may be used to transition an IHS from a low power state (S1-S4) to a working state (S0). For example, the IHS may transition from a low power state to a working state in response to detecting input received from a variety of wake sources, such as a real-time clock or always-on timer, a power button, a lid, a network or communication device (e.g., Wi-Fi, Bluetooth, ethernet or mobile broadband device), a connector or device (e.g., a power connector, USB connector, an SD card, a headphone or microphone connector), an input device (e.g., a mouse, keyboard, touchpad, touchscreen, fingerprint reader, etc.) or other input obtained from a user (e.g., voice input, facial recognition, etc.).

As noted above, conventional methods have been developed to wake and lock an IHS based on user presence. However, these conventional wake/lock methods suffer from various disadvantages in a multi-user environment. In order to provide an improved wake/lock response in a multi-user environment, the systems and methods shown in FIGS. 4-7 continuously monitor user presence within the system FOV and compare biometric data obtained from the user(s) present within the system FOV with biometric stored within a database of trusted users (e.g., a TMU database) to determine a TMU status (e.g., a trusted user or an unknown/untrusted user) of any users detected within the system FOV. In some embodiments, the systems and methods shown in FIGS. 4-7 may also determine the identity of the user(s) detected within the system FOV based on the comparison. Unlike conventional wake/lock methods, the system and methods shown in FIGS. 4-7 utilize the TMU status and/or identity of the user(s) detected within the system FOV to control waking and locking of the IHS.

Figure 4:
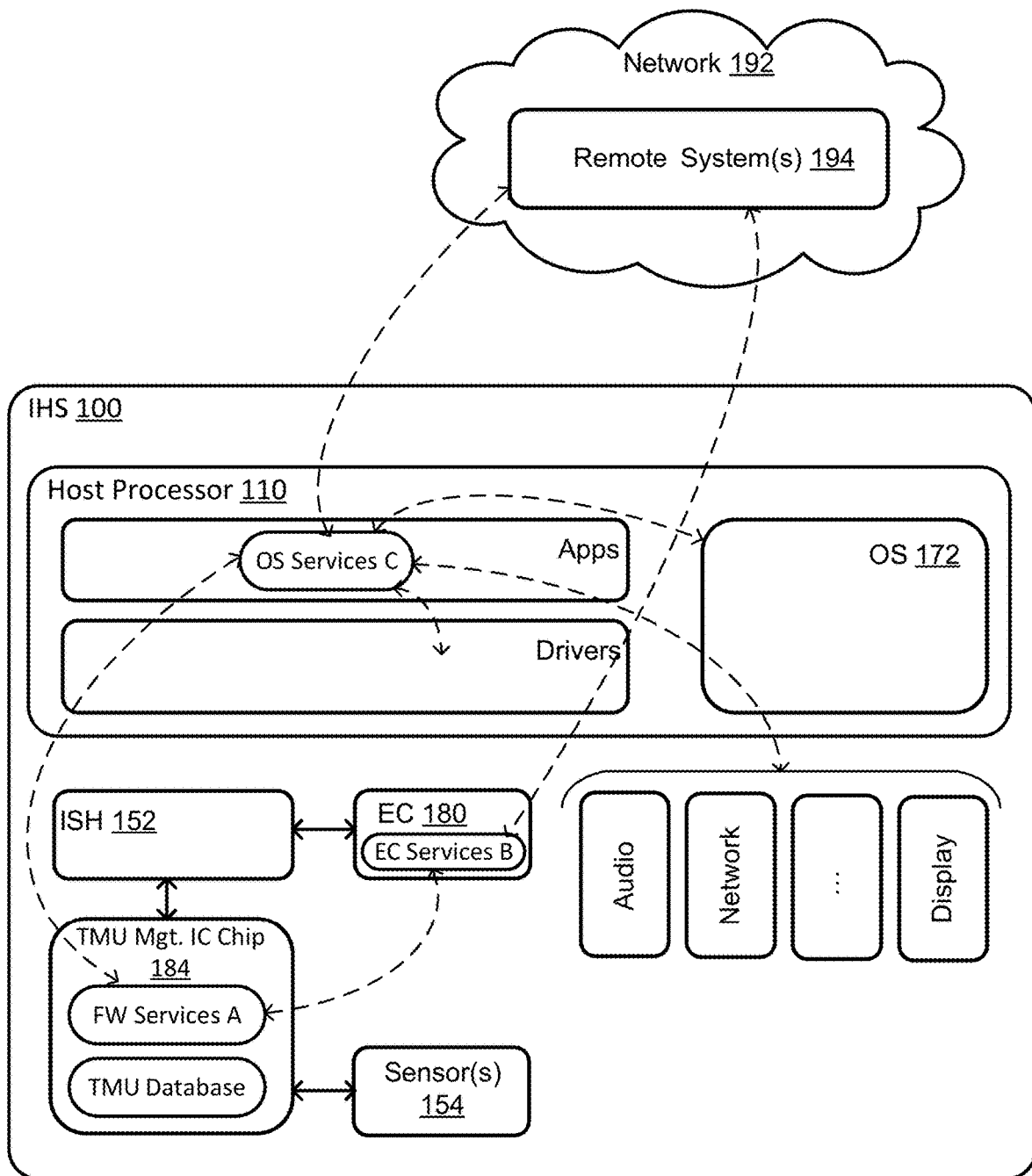
FIG. 4 is a block diagram illustrating example hardware components, firmware (FW) services and operating system (OS) services used to perform various methods described herein.

FIG. 4 illustrates example hardware components, firmware (FW) services and operating system (OS) services included within IHS 100 that can be used provide improved methods for waking or locking a UPD-capable IHS in a multi-user environment. The hardware components shown in FIG. 4 include the host processor 110, ISH 152, EC 180 and TMU management IC chip 184 discussed above in reference to FIG. 3A. In some embodiments, the on-chip CMOS image sensor 186 included within the TMU management IC chip 184 may be used to obtain biometric data from user(s) present within the system FOV. In some embodiments, one or more sensors 154 may additionally or alternatively be used to obtain biometric data from the user(s) present within the system FOV.

In order to provide an improved wake/lock response in a multi-user environment, a firmware service (included, e.g., within FW Services A) running on the TMU management IC chip 184 continuously determines the TMU status of any users detected within a field of view of the IHS 100 by comparing biometric data obtained from the user(s) detected within the system FOV with the biometric data stored within the TMU database 189. In some embodiments, the firmware service may also determine the identity of the user(s) detected within the system FOV based on the comparison. In some embodiments, the TMU status and/or the identity of the user(s) may be distributed to a firmware service running within the EC 180 and/or an OS service running within the host processor 110 to provide TMU status changes and persistent status updates.

In some embodiments, an OS service (included, e.g., within OS Services C) running on the host processor 110 may receive the TMU status from FW Service A during an active system session. In addition to receiving TMU status, the OS service may collect system session information (e.g., from OS 172 and/or drivers), identify TMU configuration settings (stored, e.g., within the TMU database 189) specified for the system session, and modify session revocation requirements (e.g., by revoking system authentication, locking an active system session and/or triggering a login screen) based on changes in TMU status and policy distributed to the IHS 100 (e.g., via remote systems 194).

In some embodiments, host processor 110 may execute the OS service to manage an active system session based on the TMU status and/or identity of a second user, which is detected within the system FOV when a first user (e.g., the authenticated user) is absent. For example, host processor 110 may execute the OS service to immediately lock the active system session when user presence of the authenticated user is no longer detected within the system FOV and the TMU status of the second user identifies the second user as an unknown/untrusted user. Alternatively, host processor 110 may execute the OS service to continue the active system session or lock the active system session, based on policy, when the user presence of the authenticated user is no longer detected within the system FOV and the TMU status of the second user identifies the second user as a trusted user.

In some embodiments, a firmware service (included, e.g., within EC Services B) running within the EC 180 may receive the TMU status from FW Services A while IHS 100 is in a low power state, and may utilize the TMU status to modify the policy stored within the ISH 152 for managing system wake events. For example, EC 180 may execute the firmware service to: (a) modify the policy stored within the ISH 152 to wake the IHS 100 from the low power state when the TMU status identifies the user detected within the system FOV as a trusted user, and (b) wait to receive other physical input to initiate the system wake event when the TMU status identifies the user as an unknown/untrusted user.

Figure 5:
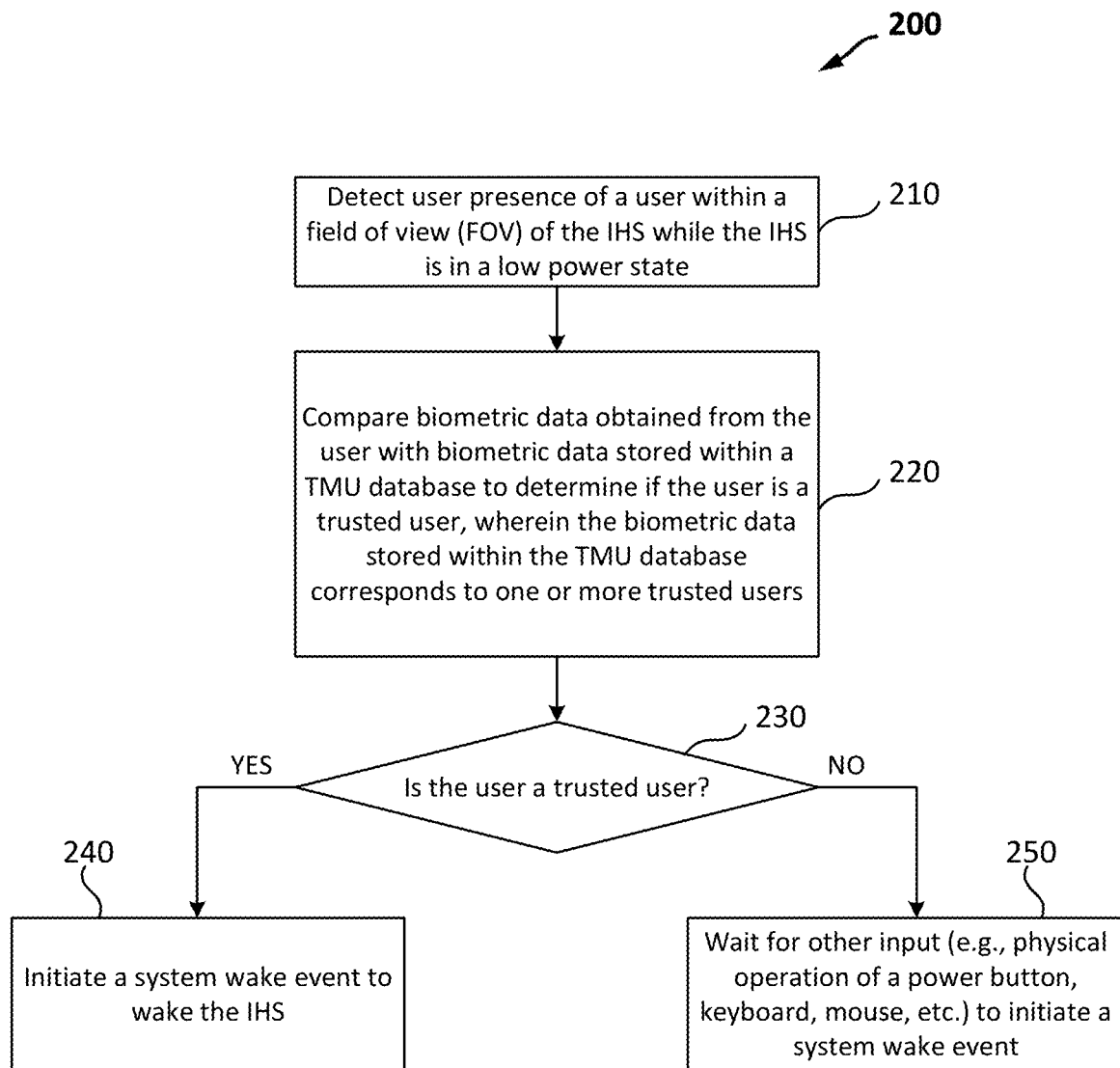
FIG. 5 is a flowchart diagram illustrating one embodiment of a method to wake an IHS in a multi-user environment, based on the identity of user(s) detected within a field of view of the IHS.

FIG. 5 illustrates one embodiment of a method 200 that may be used to wake an IHS in a multi-user environment, based on the TMU status and/or identity of user(s) detected within a field of view of the IHS. The method 200 shown in FIG. 5 may be performed by at least one processing device executing program instructions stored within non-transitory memory (such as, e.g., a non-volatile memory and/or non-volatile computer readable storage device). In some embodiments, the method 200 shown in FIG. 5 may be performed by executing program instructions contained, e.g., within the FW Services A, EC Services B and/or OS Services C shown in FIG. 4.

As shown in FIG. 5, method 200 may begin by detecting user presence of a user within a field of view (FOV) of the IHS while the IHS is in a low power state (step 210). In step 220, the method 200 compares biometric data obtained from the user with biometric data stored within a TMU database to determine if the user is a trusted user or an unknown/untrusted user (in step 220). As noted above, the TMU database stores biometric data corresponding to one or more trusted users. If the method 200 determines that the user is a trusted user (YES branch of step 230), method 200 initiates a system wake event to wake the IHS (in step 240) and transition the IHS from the low power state to a working state. If the method 200 determines that the user is not a trusted user (NO branch of step 230), the method 200 waits to receive other physical input (e.g., physical operation of power button, mouse, keyboard, etc.) to initiate a system wake event (in step 250).

Unlike conventional wake methods, the method 200 shown in FIG. 5 wakes the IHS only when a trusted user, which is enrolled within the TMU database, approaches the system and is detected within the system FOV. When an unknown/untrusted user is detected within the system FOV, the method 200 waits for other input (e.g., physical operation of power button, mouse, keyboard, etc.) to wake the system. This eliminates spurious wake events and reduces aggregated power losses.

Figure 6:
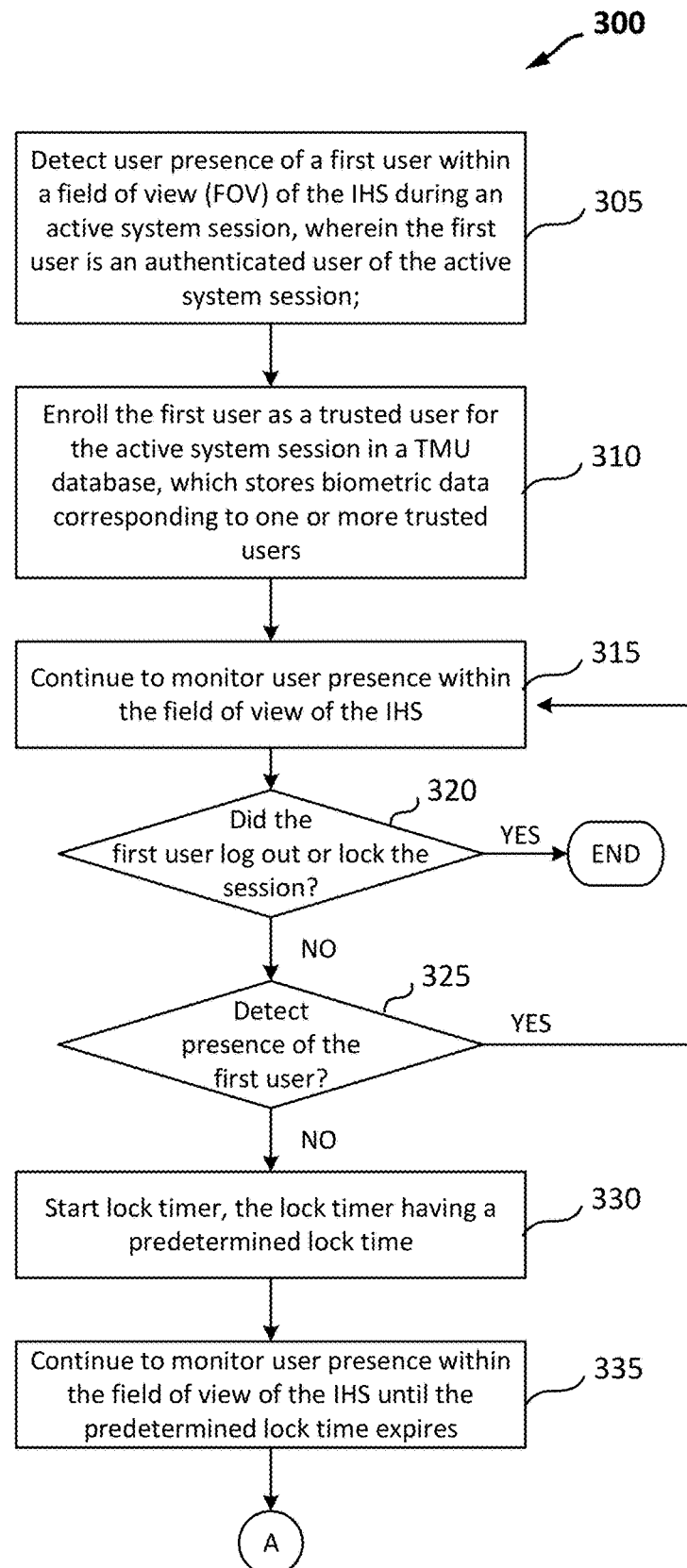
FIG. 6 is a flowchart diagram illustrating one embodiment of a method to lock an IHS in a multi-user environment, based on the identity of user(s) detected within a field of view of the IHS and policy.
Figure 6:
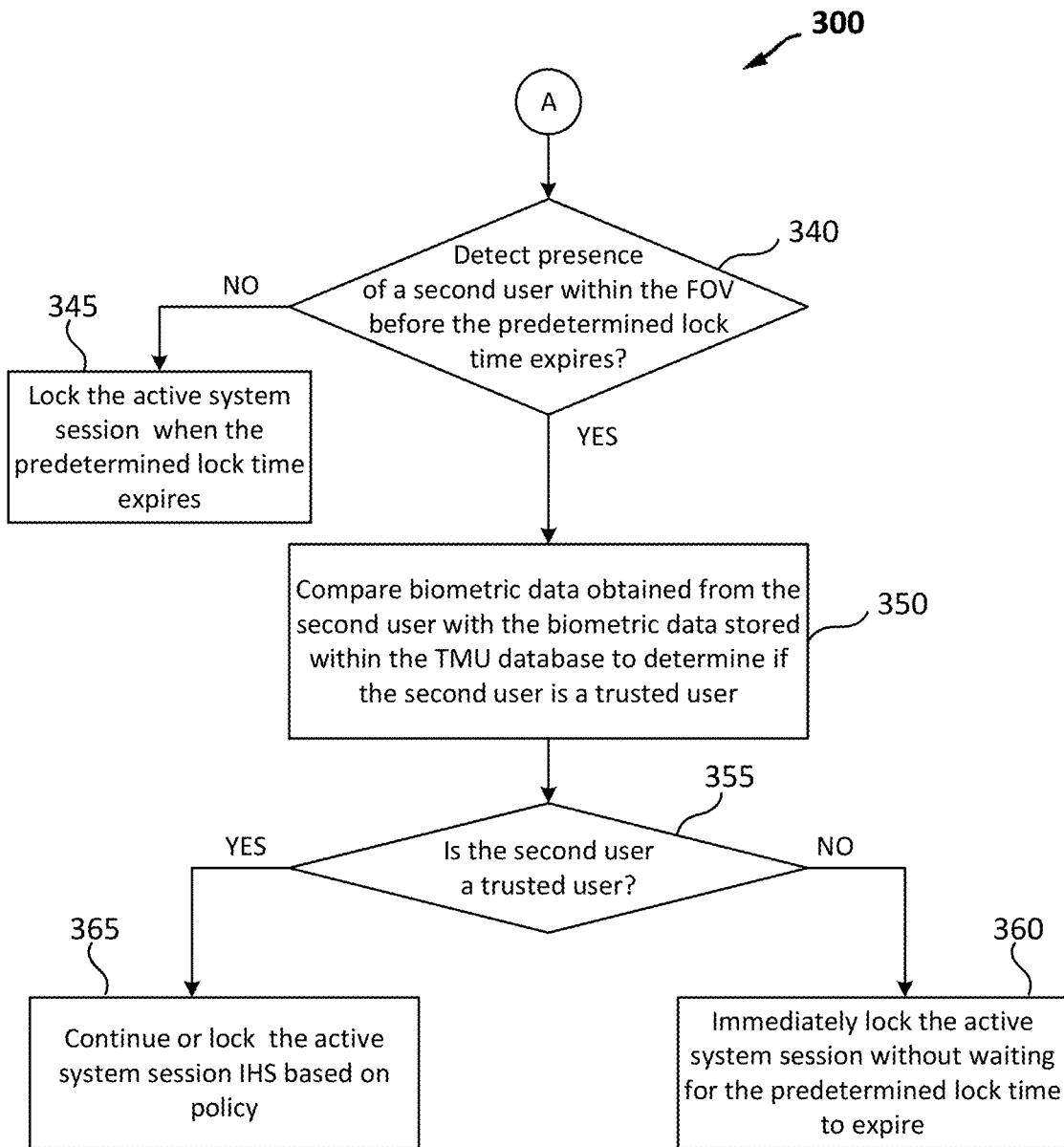

FIG. 6 illustrates one embodiment of a method 300 that may be used to lock an IHS in a multi-user environment, based on the TMU status and/or the identity of user(s) detected within a field of view of the IHS and policy. The method 300 shown in FIG. 6 may be performed by at least one processing device executing program instructions stored within non-transitory memory (such as, e.g., a non-volatile memory or non-volatile computer readable storage device). In some embodiments, the method 300 shown in FIG. 6 may be performed by executing program instructions contained, e.g., within the FW Services A, EC Services B and/or OS Services C shown in FIG. 4.

As shown in FIG. 6, method 300 may begin by detecting user presence of a first user within a field of view (FOV) of the IHS (in step 305). The first user may utilize a variety of authentication methods (e.g., Window's Hello authentication) to authenticate into the IHS. After the first user is authenticated into the IHS for an active system session, method 300 enrolls the first user as a trusted user for the active system session in a TMU database (in step 310), which stores biometric data corresponding to one or more trusted users. Method 300 continues to monitor user presence within the FOV of the IHS (in step 315) until the first user logs out or manually locks the active system session (YES branch of step 320) or the presence of the first user is no longer detected (NO branch of step 325).

If the first user moves away from the IHS without logging out of or manually locking the active system session (NO branch of step 320) and the presence of the first user is no longer detected within the system FOV (NO branch of step 325), the method 300 starts a lock timer having a predetermined lock time (in step 330) and continues to monitor user presence within the field of view of the IHS until the predetermined lock time expires (in step 335). If the presence of a second user is not detected within the system FOV before the predetermined lock time expires (NO branch of step 340), the method 300 locks the active system session when the predetermined lock time expires (in step 345).

If method 300 detects the presence of a second user within the field of view of the IHS before the predetermined lock time expires (YES branch of step 340), method 300 compares biometric data obtained from the second user with biometric data stored within the TMU database to determine if the second user is a trusted user (in step 350). If the second user is not a trusted user (NO branch of step 355), method 300 immediately locks the active system session without waiting for the predetermined lock time to expire (in step 360) to prevent untrusted or unauthorized users from gaining access to the IHS.

If the second user is determined to be a trusted user (YES branch of step 355), method 300 may continue or lock the active system session based on policy (in step 365). One example policy may specify that the active system session be immediately locked if any user presence, other than the first user, is detected within the system FOV in the absence of the first user. Another example policy may specify that the active system session continue, if a trusted user is detected within the system FOV in the absence of the first user. Other policies may also be utilized in step 365.

Unlike conventional lock methods, the method 300 shown in FIG. 6 does not strictly rely on a timeout to lock an authenticated user's system when the authenticated user walks away (without logging out of or manually locking their system) and leaves the system FOV for a period of time that exceeds a predetermined lock time setting (e.g., 60 seconds). Instead, when an authenticated user leaves the system FOV without logging out of or manually locking an active system session, the method 300 shown in FIG. 6 may: (a) immediately lock the active system session when an unknown/untrusted user is detected before the predetermined lock time expires (in step 360), or (b) immediately lock or continue the active system session, based on policy, if a trusted user is detected within the system FOV before the predetermined lock time expires (in step 365).

The method 300 shown in FIG. 6 provides one example of a lock method, which improves system security after an authorized user walks away without logging out of or manually locking their system, by continuing to monitor user presence after the authorized user leaves, identifying any users detected within the system FOV as a trusted user or an unknown/untrusted user, and immediately locking the active system session when an unknown/untrusted user is detected within the system FOV before the predetermined lock time expires. However, other embodiments of lock methods are also contemplated herein.

Figure 7:
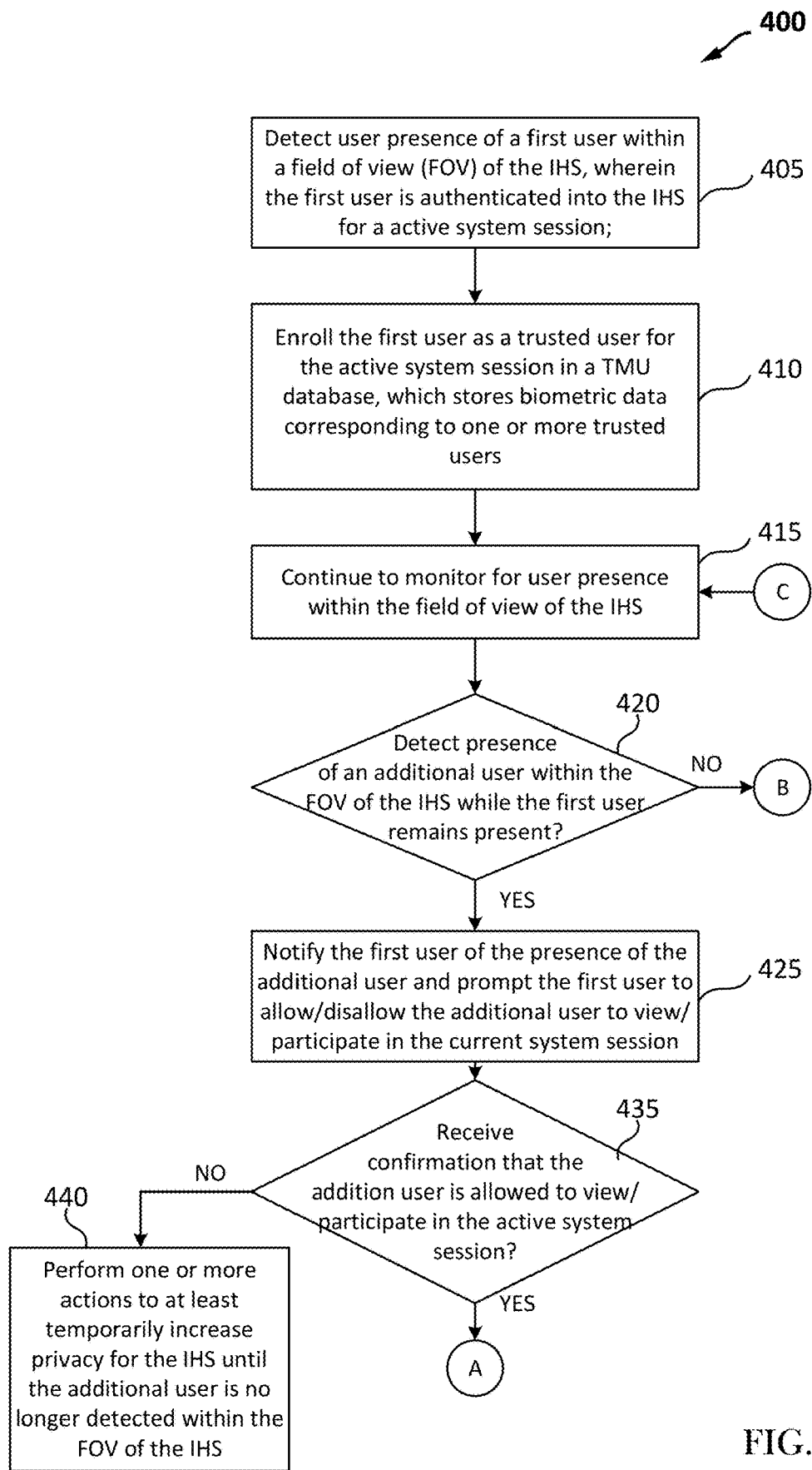
FIG. 7 is a flowchart diagram illustrating another embodiment of a method to lock an IHS in a multi-user environment, based on the identity of user(s) detected within a field of view of the IHS and policy.
Figure 7:
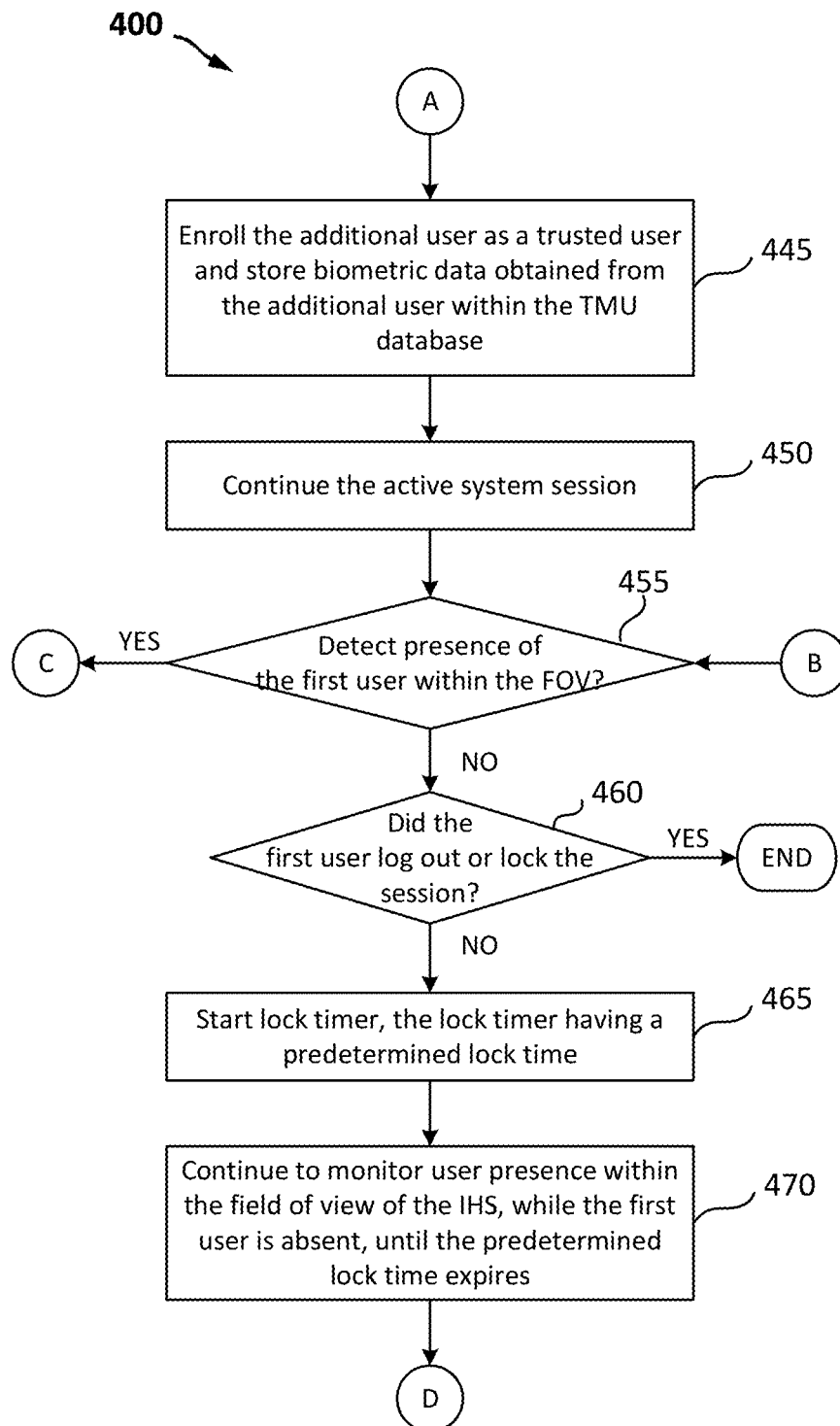
Figure 7:
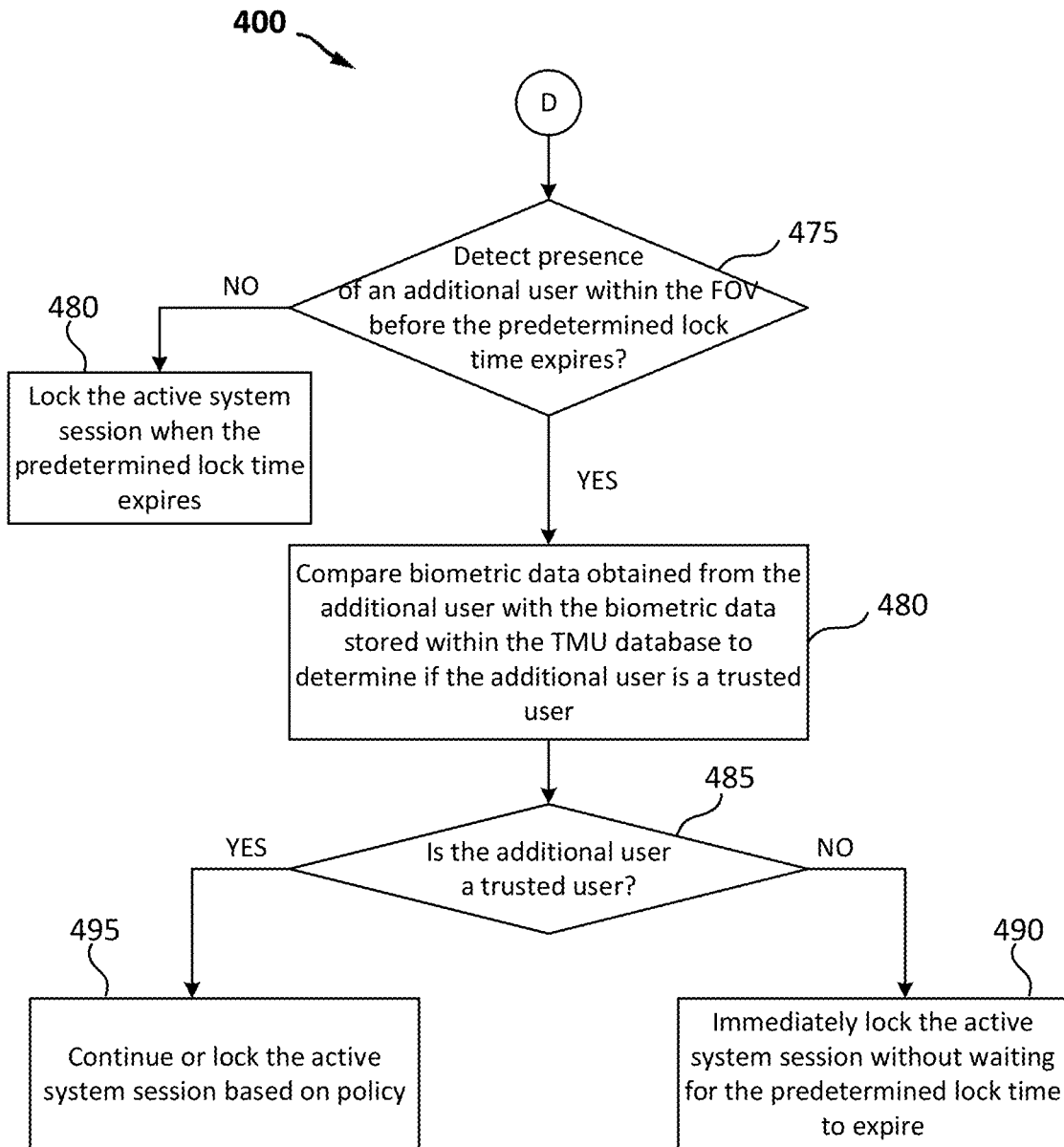

FIG. 7 illustrates another embodiment of a method 400 that may be used to lock an IHS in a multi-user environment, based on the TMU status and/or identity of user(s) detected within a field of view of the IHS and policy. Like the embodiment shown in FIG. 7, the method 400 shown in FIG. 7 may be performed by at least one processing device executing program instructions stored within a non-transitory memory (such as, e.g., a non-volatile memory or non-volatile computer readable storage device). For example, the method 400 shown in FIG. 7 may be performed by executing program instructions contained, e.g., within the FW Services A, EC Services B and/or OS Services C shown in FIG. 4.

As shown in FIG. 7, method 400 may begin by detecting user presence of a first user within a field of view (FOV) of the IHS (in step 405). As noted above, the first user may utilize a variety of authentication methods (e.g., Window's Hello authentication) to authenticate into the IHS. After the first user is authenticated into the IHS for an active system session, the method 400 enrolls the first user as a trusted user for the active system session in a TMU database (in step 410) that stores biometric data corresponding to one or more trusted users. Method 400 continues to monitor user presence within the FOV of the IHS (in step 415) until the presence of an additional user is detected within the FOV of the IHS (YES branch of step 420) or the presence of the first user is no longer detected within the FOV of the IHS (NO branch of step 455).

If the presence of an additional user is detected within the FOV of the IHS while the first user remains present (YES branch of step 420), method 400 notifies the first user of the presence of the additional user (e.g., an "onlooker") and prompts the first user to allow/disallow the additional user to view/participate in the active system session (in step 425). If the additional user is not allowed to view/participate in the active system session (NO branch of step 435), method 400 may perform one or more actions to increase privacy for the IHS, at least temporarily, until the additional user is no longer detected within the field of view of the system (in step 440). For example, method 400 may reduce the visibility of the user's display screen (e.g., by texturizing the display screen or activating a display screen privacy mode) to protect the user's privacy and/or prevent the additional user from viewing screen content. If confirmation is received that the additional user is allowed to view/participate in the active system session (YES branch of step 435), method 400 registers the additional user as a trusted user and stores biometric data obtained from the additional user within the TMU database (in step 445) before continuing the active system session (in step 450).

In some embodiments, method 400 may continue to monitor user presence within the field of view of the IHS (in step 415) and potentially respond to the presence of one or more additional users detected within the system FOV (in steps 420-445), until the presence of the first user is no longer detected within the FOV of the IHS (NO branch of step 455).

If the first user moves away from the IHS without logging out of or manually locking the active system session (NO branch of steps 455 and 460), method 400 starts a lock timer having a predetermined lock time (in step 465). Method 400 continues to monitor user presence within the field of view of the IHS, while the first user is absent, until the predetermined lock time expires (in step 470). If the presence of an additional user is not detected within the system FOV before the predetermined lock time expires (NO branch of step 475), method 400 locks the active system session when the predetermined lock time expires (in step 480).

If method 400 detects the presence of an additional user within the field of view of the IHS before the predetermined lock time expires (YES branch of step 475), method 400 compares biometric data obtained from the additional user with biometric data stored within the TMU database to determine if the additional user is a trusted user (in step 480). If the additional user is not a trusted user (NO branch of step 485), method 400 immediately locks the active system session without waiting for the predetermined lock time to expire (in step 490) to prevent untrusted or unauthorized users from gaining access to the IHS.

If the additional user is determined to be a trusted user (YES branch of step 485), method 400 may continue or lock the active system session based on policy (in step 495). For example, policy may specify that the active system session be immediately locked if any additional user presence, other than the first user, is detected within the system FOV when the first user leaves the system FOV. Another example policy may specify that the active system session may continue when the first user walks away and leaves the system FOV, as long as the user remaining within the system FOV is a friendly user or a trusted user. Other policies may be utilized in step 495 to restrict access to the active system session.

Unlike the previous method 300 shown in FIG. 6, the method 400 shown in FIG. 7 enables additional users to be tagged as friendly users and enrolled within the TMU database as trusted users while the authenticated user is present within the system FOV. The method 400 shown in FIG. 7 also addresses potential security concerns that may arise when more than one user is detected within the system FOV before the authenticated user walks away and leaves the system FOV. When the authenticated user walks away (without logging out of or manually locking their system), leaving another user within the system FOV, the method 400 may: (a) immediately lock the system session to prevent the additional user from gaining access to the authenticated user's system, (b) continue the active system session to allow the additional user to participate while the authenticated user is gone, and/or (c) restrict the additional user's access to the active system session, depending on the identity of the additional user and policy.

The systems and methods shown in FIGS. 4-7 improve upon previous methods for waking and locking a UPD-capable IHS by improving system security and reducing power losses when the UPD-capable IHS is utilized in a multi-user environment. Unlike conventional methods, the systems and methods shown in FIGS. 4-7 continuously monitor user presence and determine the TMU status or identity of user(s) present within the system FOV in the background in an "always on" mode. The determination to wake/lock a UPD-capable IHS is based on the TMU status of the user(s) detected within the system FOV (e.g., whether the user is an authenticated user, a trusted user or an unknown/untrusted user) and policy, which may be set for example by an administrator. In some embodiments, AI algorithms may determine the user's identity by comparing facial landmarks obtained from the user to facial landmarks (or a face ID) of trusted users stored within the TMU database. This provides a very low power and non-intrusive AI-based solution, which does not require a camera ISP and/or image processing on the host system or cloud. The methods disclosed herein are also instantaneous and very hard to spoof.

Systems and Methods for Controlling Enrollment Status of a Trusted User Based on Time The method 400 shown in FIG. 7 enables new trusted user(s) to be enrolled within the TMU database during an active system session. For example, when a new user is detected within the system FOV, the authenticated user may be notified of the user presence of the new user (e.g., an "onlooker") and prompted to allow/disallow the new user to view/participate in the active system session. If the authenticated user chooses to allow the new user to participate, the new user is enrolled in TMU database as a trusted user and the active system session continues. In some cases, the authenticated user may walk away from the system, leaving the newly enrolled user to view and/or interact with the system. In the method 400 shown in FIG. 7, there is no way to control how long an enrolled user is given access to an active system session when the authenticated user walks away.

Figure 8:
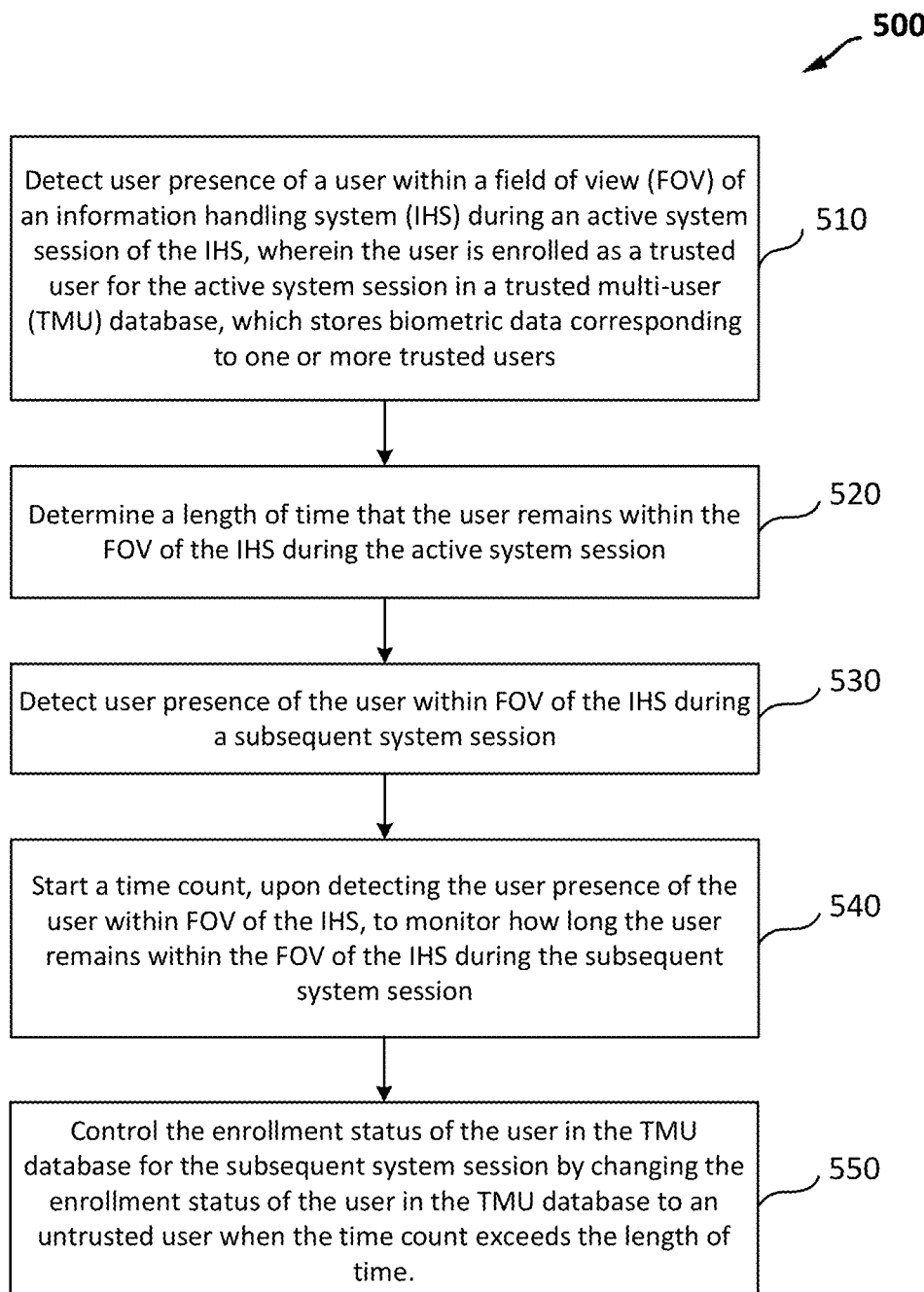
FIG. 8 is a flowchart diagram illustrating one embodiment of a method to control the enrollment status of a trusted user enrolled within a trusted multi-user (TMU) database based on time.

Additional systems and methods are provided in FIGS. 4 and 8 for controlling the enrollment status of trusted users included within a TMU database. For example, FIG. 8 illustrates one embodiment of a method 500 that may be used to control the enrollment status of a trusted user enrolled within a TMU database based on time. The method 500 shown in FIG. 8 may be performed by at least one processing device executing program instructions stored within a non-transitory memory (such as, e.g., a non-volatile memory or non-volatile computer readable storage device). In one embodiment, the method 500 shown in FIG. 8 may be performed by executing program instructions included, e.g., within the FW Service A shown in FIG. 4.

In some embodiments, the method 500 shown in FIG. 8 may be performed after the presence of a trusted user is detected in steps 475, 480 and 485 and the active system session is continued in step 495 of the method 400 shown in FIG. 7. However, the method 500 shown in FIG. 8 is not dependent on the previous method 400 shown in FIG. 7 and may be performed before or after an authenticated user (e.g., a first user) walks away without logging out of or manually locking the active system session, leaving a trusted user (e.g., an additional user) to view or participate in the active system session.

As shown in FIG. 8, the method 500 may begin (in step 510) by detecting user presence of a user within a FOV of an IHS during an active system session of the IHS. The user detected in step 510 is enrolled as a trusted user for the active system session in a trusted multi-user (TMU) database, which stores biometric data corresponding to one or more trusted users. Next, the method 500 determines the length of time that the user remains within the FOV of the IHS during the active system session (in step 520). In some embodiments, the method 500 may control the enrollment status of the user in the TMU database for a subsequent system session based on the length of time determined in step 520. For example, the method 500 may detect user presence of the user within FOV of the IHS during a subsequent system session (in step 530), and start a time count, upon detecting the user presence of the user, to monitor how long the user remains within the FOV of the IHS during the subsequent system session (in step 540). In some embodiments, the method 500 may control the enrollment status of the user in the TMU database for the subsequent system session by changing the enrollment status of the user in the TMU database to an untrusted user when the time count exceeds the length of time (in step 550).

In other embodiments, the method 500 may control the enrollment status of the user in the TMU database for a subsequent system session based a weighted time period of interaction for the user. For example, the method 500 may repeat steps 530 and 540 over a plurality of subsequent system sessions. The method 500 may use the time count obtained during each of the plurality of subsequent system sessions to determine a weighted time period of interaction for the user, and may control the enrollment status of the user in the TMU database for a next system session based on the weighted time period of interaction. In some embodiments, the method 500 may control the enrollment status of the user in the TMU database for the next system session by changing the enrollment status of the user in the TMU database to an untrusted user when the weighted time period exceeds a predetermined time period.

Although originally enrolled in the TMU database as a trusted user, the user detected in step 510 is not an authenticated user for the active system session. In some embodiments, the user detected in step 510 may be enrolled within the TMU database during an active system session before the authenticated user leaves the system FOV. For example, when user presence of the user is detected in step 510, the authenticated user may be notified of the user's presence and prompted to allow/disallow the user to view/participate in the active system session, as noted above in reference to FIG. 7. In some embodiments, method 500 may receive confirmation that the user is allowed to view or participate in the active system session. Upon receiving the confirmation that the user is allowed to view or participate in the active system session, method 500 may enroll the user as the trusted user in the TMU database and store biometric data obtained from the user within the TMU database.

The systems and methods shown in FIGS. 4 and 8 improve system security in an IHS operated within a multi-user environment by: (a) controlling how long a trusted user is given access to an active system session when the authenticated user walks away, and (b) providing a way to continue or revoke the enrollment status of a trusted user for a subsequent system session based on time.

System and Methods for Managing a System Wake Event for an Information Handling System Based on User Presence When an authenticated user wakes a locked IHS using a conventional wake method, user applications and windows left open during the previously active system session are displayed on the display screen when the display screen is turned on. This can lead to potential data theft or inappropriate viewing of the applications, windows and/or content displayed on the display screen when the user's system is awakened in a multi-user environment.

Figure 9:
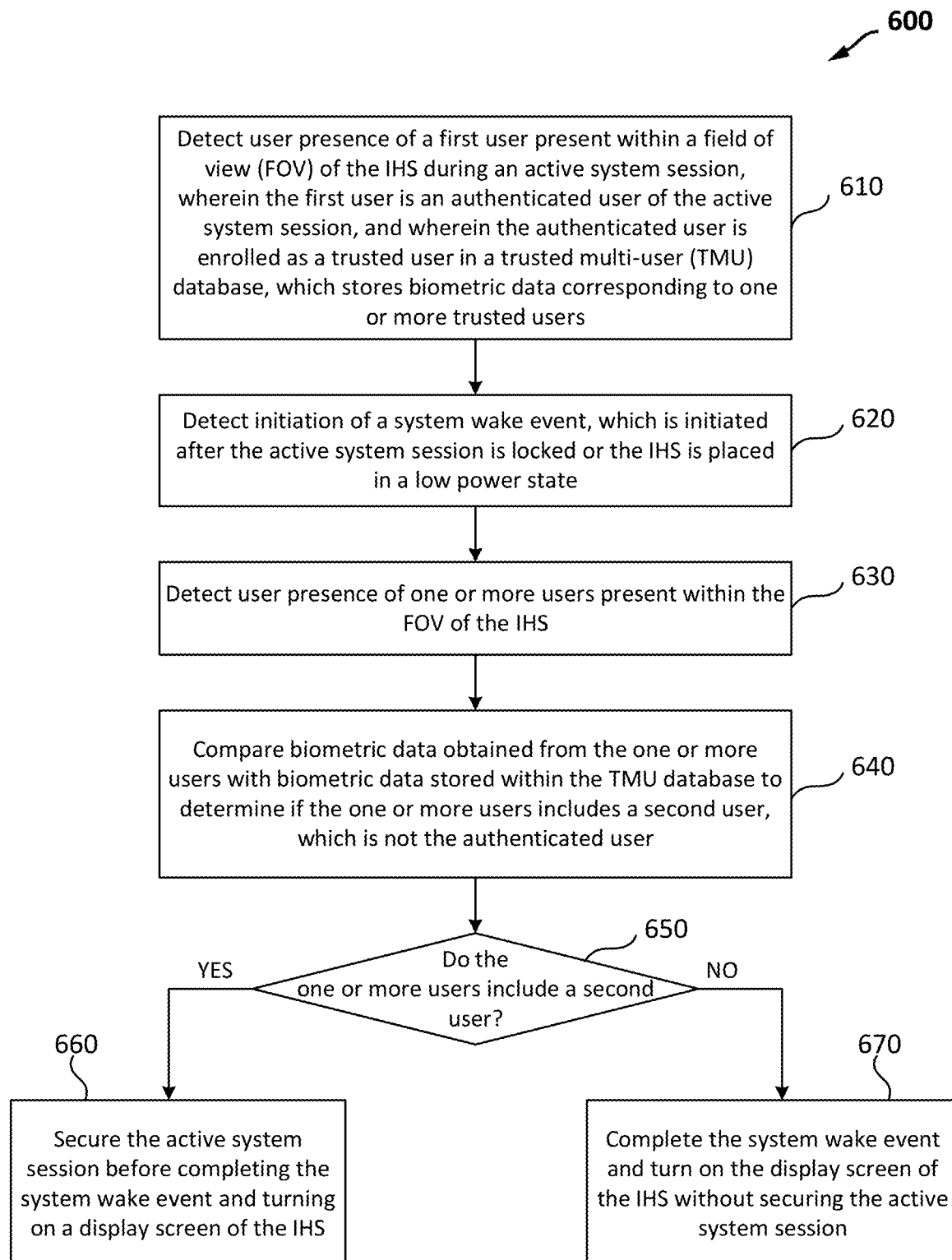
FIG. 9 is a flowchart diagram illustrating one embodiment of a method to manage a system wake event for an IHS located within a multi-user environment, based on the user(s) present within a field of view of the IHS during the system wake event.

To overcome these disadvantages, systems and methods are provided in FIGS. 4 and 9 to secure a previously active system session, based on the user presence detected during a system wake event. The systems and methods shown in FIGS. 4 and 9 improve system security in an IHS operated within a multi-user environment by: (a) monitoring user presence of one or more users present within a field of view (FOV) of the IHS a during system wake event, and (b) waking the IHS in a secure operating mode or a non-secured operating mode, based on the user(s) present within the system FOV during the system wake event. For example, the systems and methods disclosed herein may wake the IHS in a secured operating mode when user presence of a user, other than the authenticated user, is detected within the system FOV during the system wake event. This prevents potential data theft or inappropriate viewing of the applications, windows and/or content that may be displayed on the display screen when the IHS is awakened in a multi-user environment.

FIG. 9 illustrates one embodiment of a method 600 that may be used to manage a system wake event for an IHS located within a multi-user environment, based on the user(s) present within the FOV of the IHS during the system wake event. In some embodiments, method 500 may begin (in step 610) by detecting user presence of a first user present within a field of view (FOV) of the IHS during an active system session. In the method 600, the first user is an authenticated user of the active system session and is enrolled as a trusted user in a trusted multi-user (TMU) database, which stores biometric data corresponding to one or more trusted users. In some embodiments, method 600 may further include enrolling the authenticated user as a trusted user in the TMU database and storing biometric data corresponding to the authenticated user within the TMU database during authentication of the first user.

In step 620, method 600 detects the initiation of a system wake event. The system wake event may be initiated after the active system session is locked or the IHS is placed in a low power state. In response to detecting the initiation of the system wake event, the method 600 may: (a) detect user presence of one or more users present within the FOV of the IHS (in step 630), and (b) compare biometric data obtained from the one or more users with biometric data stored within the TMU database to determine if the one or more users includes a second user, which is not the authenticated user (in step 640). If the comparison determines that the one or more users includes a second user, which is not the authenticated user (YES branch of step 650), method 600 secures the active system session, based on policy, before completing the system wake event and turning on a display screen of the IHS (in step 660). If the comparison determines that the one or more users does not include a second user and only includes the authenticated user (NO branch of step 650), the method 600 completes the system wake event and turns on the display screen of the IHS without securing the active system session (in step 670).

In some embodiments, method 600 may secure the active system session (in step 660) by configuring the IHS to enter a secure operating mode before the display screen of the IHS is turned on. In some embodiments, method 500 may configure the IHS to enter the secure operating mode by modifying one or more of the OS settings. The modified OS settings may configure the IHS in a secure operating mode by: entering a secured OS container; deleting credentials, tokens and/or cookies used for persistent authentication; minimizing or closing any windows, which were previously opened during an active system session; disconnecting a network port, which was previously connected during an active system session, etc. Other OS settings may also be modified to configure the IHS in a secure operating mode.

The method 600 shown in FIG. 9 may be performed by at least one processing device executing program instructions stored within a non-transitory memory (such as, e.g., a non-volatile memory or non-volatile computer readable storage device). In one embodiment, the method 600 shown in FIG. 9 may be performed by executing program instructions included, e.g., within the FW Services A and OS Services C shown in FIG. 4.

When a system wake event is initiated, a firmware service (included, e.g., FW Services A) running on the TMU management IC chip 184 compares biometric data obtained from one or more users detected within the system FOV with the biometric data stored within the TMU database to determine if the one or more users includes the authenticated user and/or another user, which is not the authenticated user. The firmware service may also be executed to determine a TMU status of each user detected within the system FOV during the system wake event, determine a vulnerability state for the IHS based on the TMU status generated for each user, and generate a notification containing the vulnerability state.

One or more OS services (included, e.g., within OS Services C) running on the host processor 110 may receive the notification containing the vulnerability state from the firmware service, collect system session information (e.g., from OS 172) and configure the IHS in a secure operating mode, based on the vulnerability state contained within the notification and policy distributed to the IHS (e.g., via remote systems 194). In some embodiments, the one or more OS services may configure the IHS in a secure operating mode by modifying one or more OS settings contained, e.g., from OS 172). Examples of OS settings that may be modified to configure the IHS in a secure operating mode are provided above. In some embodiments, the one or more OS services may also send a notification to EC 180, causing EC 180 to modify policy stored within ISH 152 for system wake events.

The systems and methods shown in FIGS. 4 and 9 improve system security in an IHS operated within a multi-user environment by configuring the IHS in a secure operating mode when any user, other than the authenticated user, is detected in the system FOV during a system wake event. When another user (other than the authenticated user) is detected during a system wake event, the IHS is placed in a secure operating mode to secure the active system session before the system wake event is completed and a display screen of the IHS is turned on.

System and Methods for Managing System Configuration Settings and Session Retainment Based on User Presence A TMU database stored within an authenticated user's system may contain one or more trusted users and biometric data for such users. Although the authenticated user may "trust" each of these users to view/interact with an active system session while the authenticated user is present, the authenticated user may wish to control the level of access given to each trusted user. For example, the authenticated user may wish to control how applications and data are shared with each trusted user, or how the authenticated user's system is configured or managed, when a trusted user is present within a FOV of the authenticated user's system. In addition, the authenticated user may wish to restrict access to the active system session, or revoke system authentication, when the authenticated user leaves and a trusted user or an unknown user is detected within the system FOV.

Systems and methods are provided in FIGS. 4 and 10-14 for managing system configuration settings during an active system session, and for managing session retainment, based on user presence and policy. As described in more detail below, the systems and methods provided in FIGS. 4 and 10-14 further improve system security in an IHS located within a multi-user environment by managing system configuration and session retainment when a trusted user or an unknown user is present within a FOV of the authenticated user's system during an active system session.

Figure 10:
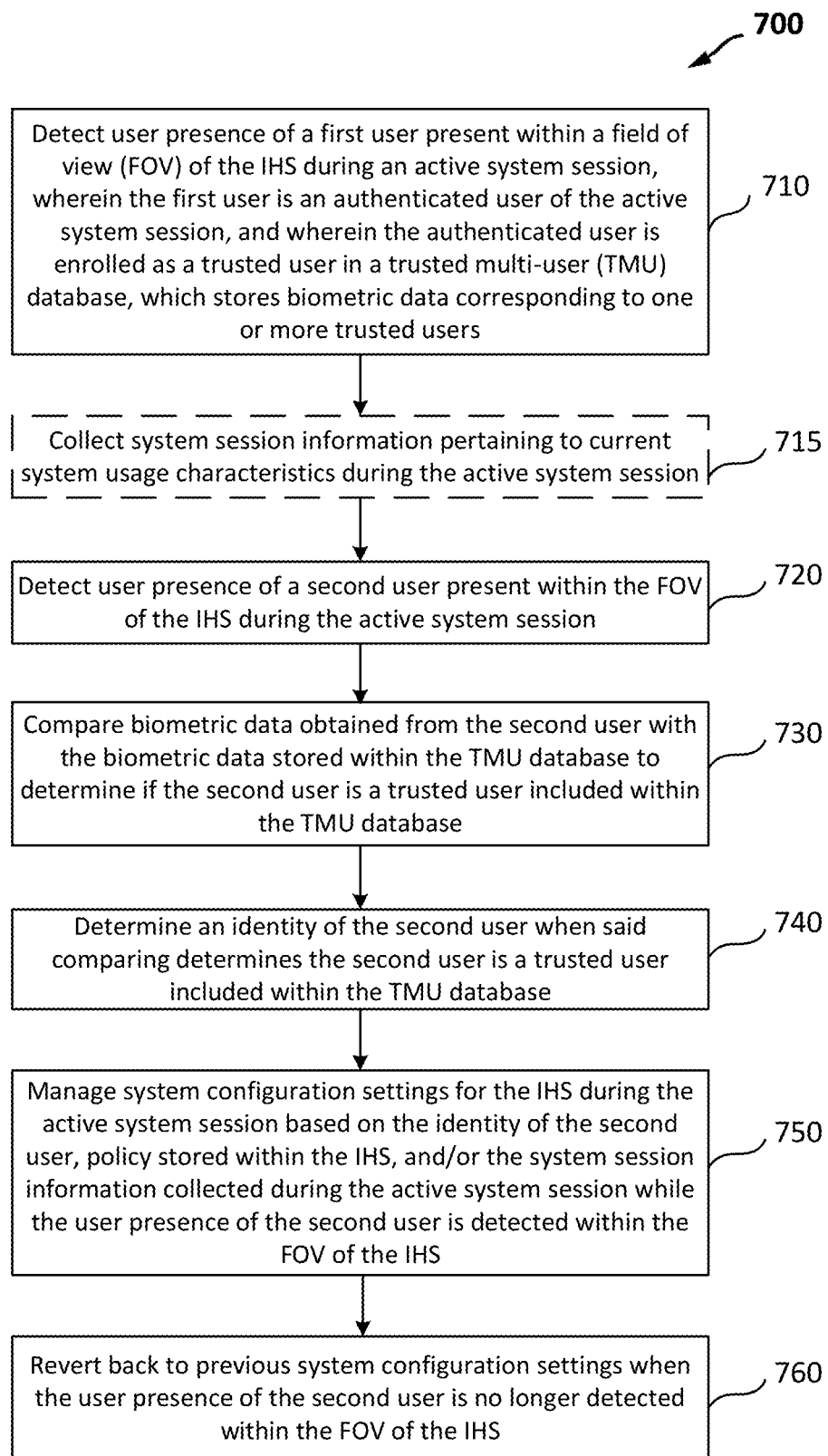
FIG. 10 is a flowchart diagram illustrating one embodiment of a method to manage system configuration settings for an IHS located within a multi-user environment, based on the user(s) present within a field of view of the IHS during an active system session and policy.

FIG. 10 illustrates one embodiment of a method 700 that may be used to manage system configuration settings for an IHS located within a multi-user environment, based on the user(s) present within the FOV of the IHS during an active system session and policy. As shown in FIG. 10, the method 700 may begin (in step 710) by detecting user presence of a first user present within a FOV of the IHS during an active system session. In the method 700, the first user is an authenticated user of the active system session, and is enrolled as a trusted user in a trusted multi-user (TMU) database, which stores biometric data corresponding to one or more trusted users. Method 700 further includes detecting user presence of a second user present within the FOV of the IHS during the active system session (in step 720) and comparing biometric data obtained from the second user with the biometric data stored within the TMU database to determine if the second user is a trusted user included within the TMU database (in step 730).

When the comparison performed in step 730 determines the second user is a trusted user, method 700 determines an identity of the second user (in step 740) and manages system configuration settings for the IHS during the active system session based on the identity of the second user, policy stored within the IHS and/or system session information collected during the active system session (in step 750). In some embodiments, method 700 may manage system configuration settings for the IHS (in step 750) while the user presence of the second user is detected within the system FOV, and may revert back to previous system configuration settings when the user presence of the second user is no longer detected within the FOV of the IHS (in step 760).

The policy stored within the IHS specifies a set of preferred system configuration settings for each trusted user included within the TMU database. In some embodiments, method 700 uses the identity of the second user determined in step 740 to select, from the policy, a set of preferred system configuration settings specified for the second user. Method 700 may then use the set of preferred system configuration settings specified for the second user to modify one or more system configuration settings (in step 750) while the user presence of the second user is detected within the system FOV. When the user presence of the second user is no longer detected within the system FOV, the modified system configurations revert back to previous system configuration settings (in step 760).

FIG. 11 illustrates an example policy that may be used to manage system configuration settings during an active system session when a trusted user (e.g., the second user) is detected within the system FOV. The example policy shown in FIG. 11 provides a set of preferred system configuration settings for two trusted users (e.g., User A and User B). For each trusted user, the set of preferred system configuration settings specifies preferred system configuration settings, security settings and display configuration settings to be used (or changes made thereto) when the trusted user is detected within the system FOV. Although one example policy is provided in FIG. 11, other policies may also be used in the method 700.

In some embodiments, method 700 may collect system session information pertaining to current system usage characteristics during the active system session (in optional step 715). Examples of system session information that may be collected in step 715 include, but are not limited to, a display configuration currently used for a display screen of the IHS, whether any windows are currently open or hidden on the display screen, and a sensitivity level of any applications or data currently displayed within any open or hidden windows.

When system session information is collected in step 715, method 700 manages the system configuration settings (in step 750) by modifying one or more system configuration settings for the IHS, based on the identity of the second user, the policy stored within the IHS and the system session information collected during the active system session. In some embodiments, method 700 may modify one or more system configuration settings to change at least one of the current system usage characteristics while the user presence of the second user is detected within the system FOV. For example, method 700 may modify one or more system configuration settings to: change a display configuration setting currently used for a display screen of the IHS, close or minimize any windows currently open or hidden on the display screen, and/or change a security setting to restrict access to sensitive applications or data currently displayed within any open or hidden windows.

Figure 12:
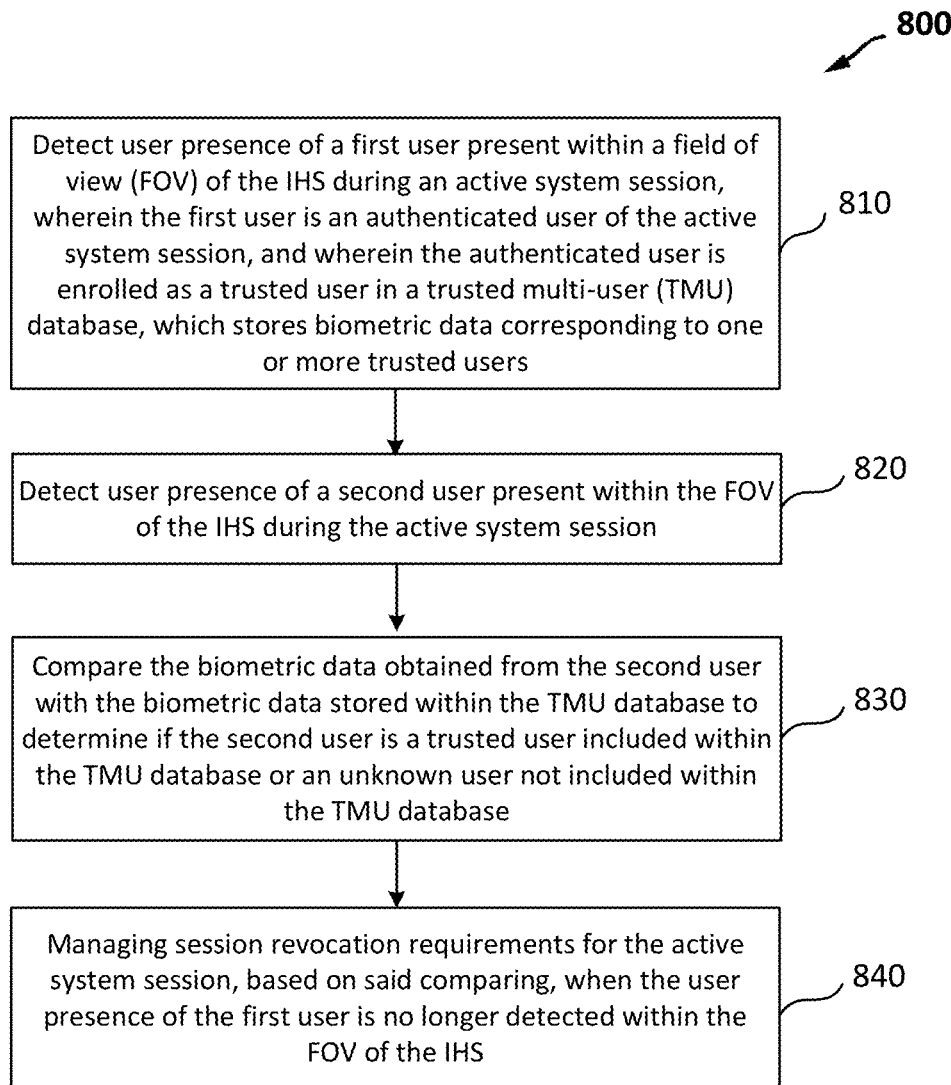
FIG. 12 is a flowchart diagram illustrating one embodiment of a method to manage session retainment for an IHS located within a multi-user environment, based on the user(s) present within a field of view of the IHS during an active system session and policy.

FIG. 12 illustrates one embodiment of a method 800 that may be used to manage session retainment for an IHS located within a multi-user environment, based on the user(s) present within the FOV of the IHS during an active system session and policy. Like the previous embodiment shown in FIG. 10, the method 800 shown in FIG. 12 includes detecting user presence of a first user (e.g., an authenticated user) present within a field of view (FOV) of the IHS during an active system session (in step 810), detecting user presence of a second user present within the FOV of the IHS during the active system session (in step 820), and comparing biometric data obtained from the second user with the biometric data stored within the TMU database to determine if the second user is a trusted user included within the TMU database or an unknown user not included within the TMU database (in step 830).

In step 840, method 800 includes managing session revocation requirements for the active system session, based on the comparison performed in step 830, when the user presence of the first user is no longer detected within the FOV of the IHS. In some embodiments, method 800 may manage the session revocation requirements for the active system session (in step 840) based on policy stored within the IHS. For example, policy stored within the IHS may specify a set of authentication methods and actions to be performed when the first user leaves the system FOV and a second user (e.g., a trusted user or an unknown user) is detected within the system FOV.

FIG. 13 illustrates an example policy that may be used to manage session retainment in step 840. The example policy shown in FIG. 13 specifies example actions to be performed for a set of authentication methods (e.g., Kerberos, Fast Identity Online (FIDO) and Window's Hello) when trusted and unknown users arrive within, and depart from, the system FOV. In some embodiments, method 800 may use the example policy shown in FIG. 13 to manage session revocation requirements for the active system session (in step 840).

For example, when the comparison performed in step 830 determines that the second user is unknown user, method 800 may manage session revocation requirements for the active system session (in step 840) by modifying settings utilized by one or more of the authentication methods to revoke session authentication and trigger a login screen. In the example policy shown in FIG. 13, method 800 may refresh Kerberos settings and clear FIDO and Window's Hello settings to revoke session authentication and trigger a login screen when an unknown user arrives and is detected within the system FOV. On the other hand, when the comparison performed in step 830 determines that the second user is trusted user, method 800 may manage the session revocation requirements for the active system session (in step 840) by modifying settings utilized by one or more of the authentication methods to restrict access to the active system session. In the example policy shown in FIG. 13, for example, method 800 may clear FIDO settings to restrict access to the active system session when the second user is a trusted user. Although one example policy is provided in FIG. 13, other policies may also be used in the method 800.

The method 700 shown in FIG. 10 and the method 800 shown in FIG. 12 may be performed by at least one processing device executing program instructions stored within a non-transitory memory (such as, e.g., a non-volatile memory or a non-volatile computer readable storage device). In one embodiment, the method 700 shown in FIG. 10 and the method 800 shown in FIG. 12 may be performed by executing program instructions included, e.g., within the FW Services A and OS Services C shown in FIG. 4.

When user presence of a first user (e.g., an authenticated user) and a second user (e.g., a trusted user or an unknown user) is detected within the system FOV, the firmware service (included, e.g., within FW Services A) running on the TMU management IC chip 184 compares biometric data obtained from the second user with the biometric data contained within the TMU database to determine a TMU status of the second user. As noted above, the TMU status may identify the second user as a trusted user included within the TMU database, or an unknown user not included within the TMU database. In some embodiments, the firmware service may also compare biometric data obtained from the second user with the biometric data contained within the TMU database to determine an identity of the second user.

An OS service (included, e.g., within OS Services C) running on the host processor 110 may receive the TMU status of the second user and perform various actions in response thereto. For example, the OS service may manage system configuration settings for the IHS during the active system session, based on the identity of second user and policy stored within the IHS, when the user presence of the first user is detected within the system FOV. In addition or alternatively, the OS service may manage session revocation requirements for the active system session, based on the TMU status of the second user and policy stored within the IHS, when the user presence of the first user is no longer detected within the FOV of the sensor.

System and Methods for Managing Distributed User Presence Notifications

Systems and methods have been developed to notify an authenticated user when another user (e.g., an onlooker) is detected within the system FOV. For example, the method 400 shown in FIG. 7 may detect the presence of an onlooker while the authenticated user is present within the system FOV, and may display an on-screen alert (otherwise referred to herein as a "user presence notification" or an "onlooker event notification") on the authenticated user's display screen. Although methods are in place to display such notifications on the user's display screen, there are currently no methods to track and/or distribute these notifications to other users (such as, e.g., administrators, teachers, IT decision makers, etc.) or other information handling systems for notification, aggregation and/or analysis of such events.

Additional systems and methods are provided in FIGS. 4 and 14A-14C for collecting, distributing and managing notifications of user presence. More specifically, systems and methods are provided in FIGS. 4 and 14A-14C for collecting notifications of user presence (e.g., "user presence notifications" or "onlooker event notifications") that are generated by a first IHS, and distributing the notifications of user presence to a second IHS for notification, aggregation and/or analysis of user presence events.

As described in more detail below, a notification of user presence may be generated by the first IHS during an active system session upon detecting the presence of a second user (e.g., an onlooker) while a first user (e.g., the authenticated user) is present within the system FOV. In some embodiments, notifications of user presence are collected from the first IHS and distributed to the second IHS to provide notification of user presence events to the second IHS (or a user of the second IHS). In other embodiments, the notifications of user presence generated by the first IHS are aggregated and/or analyzed by the second IHS to generate various metrics for the user presence events that occur at the first IHS (such as, e.g., how often user presence events occur at a particular IHS, the identity of users responsible for generating the notifications, etc.). In doing so, the systems and methods disclosed in FIGS. 4 and 14A-14C may enable security policies (and other policies) to be set in a data-based, empirically driven way.

Figure 14A:
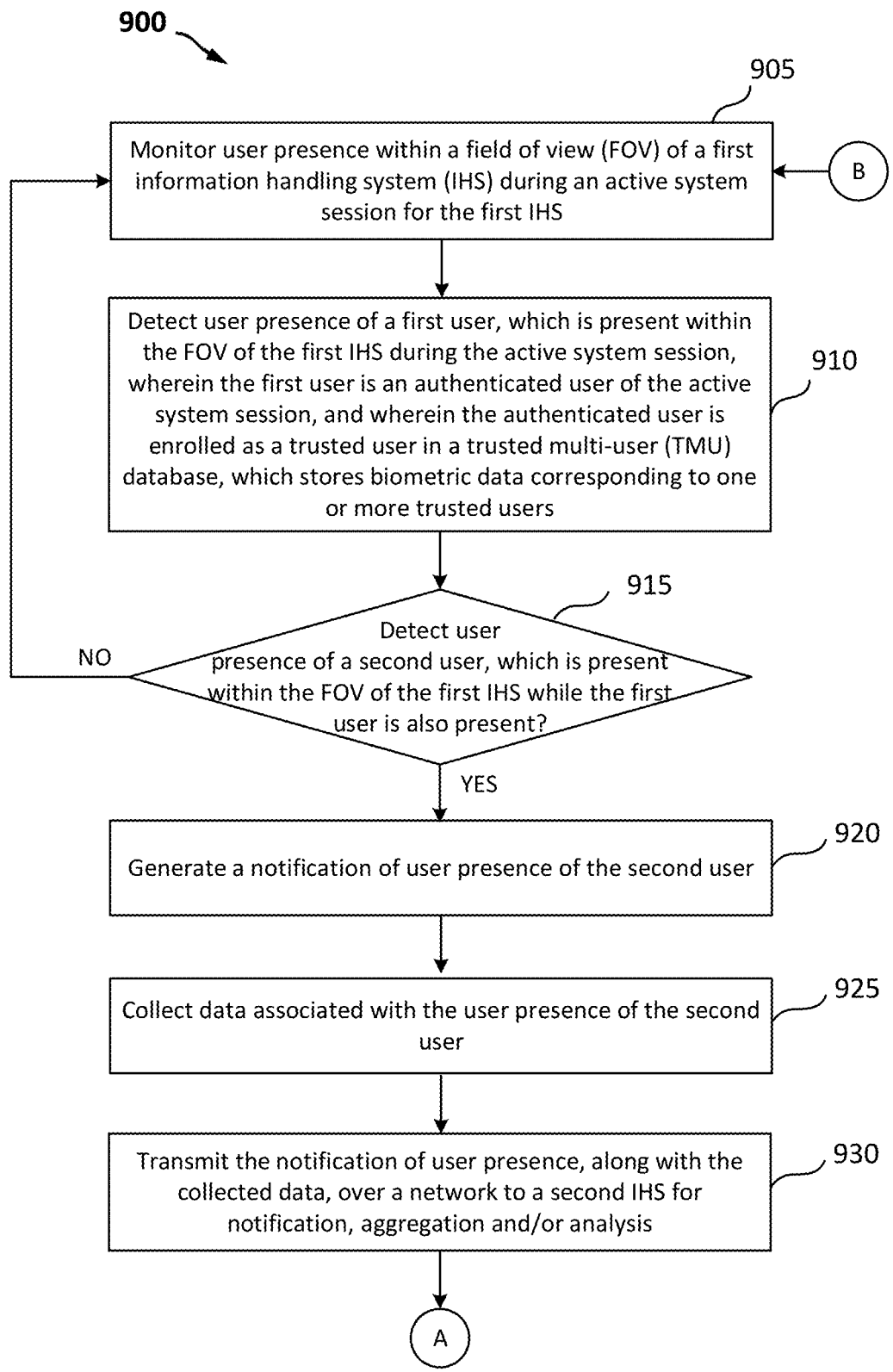
FIGS. 14A-14C are flowchart diagrams illustrating various embodiments of a method to collect, distribute and manage user presence notifications.
Figure 14B:
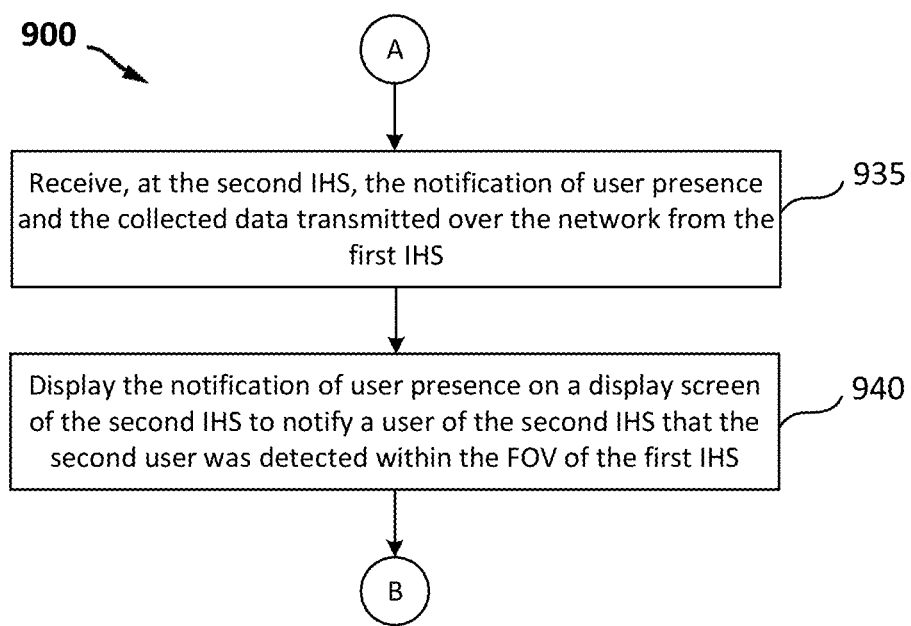
Figure 14C:
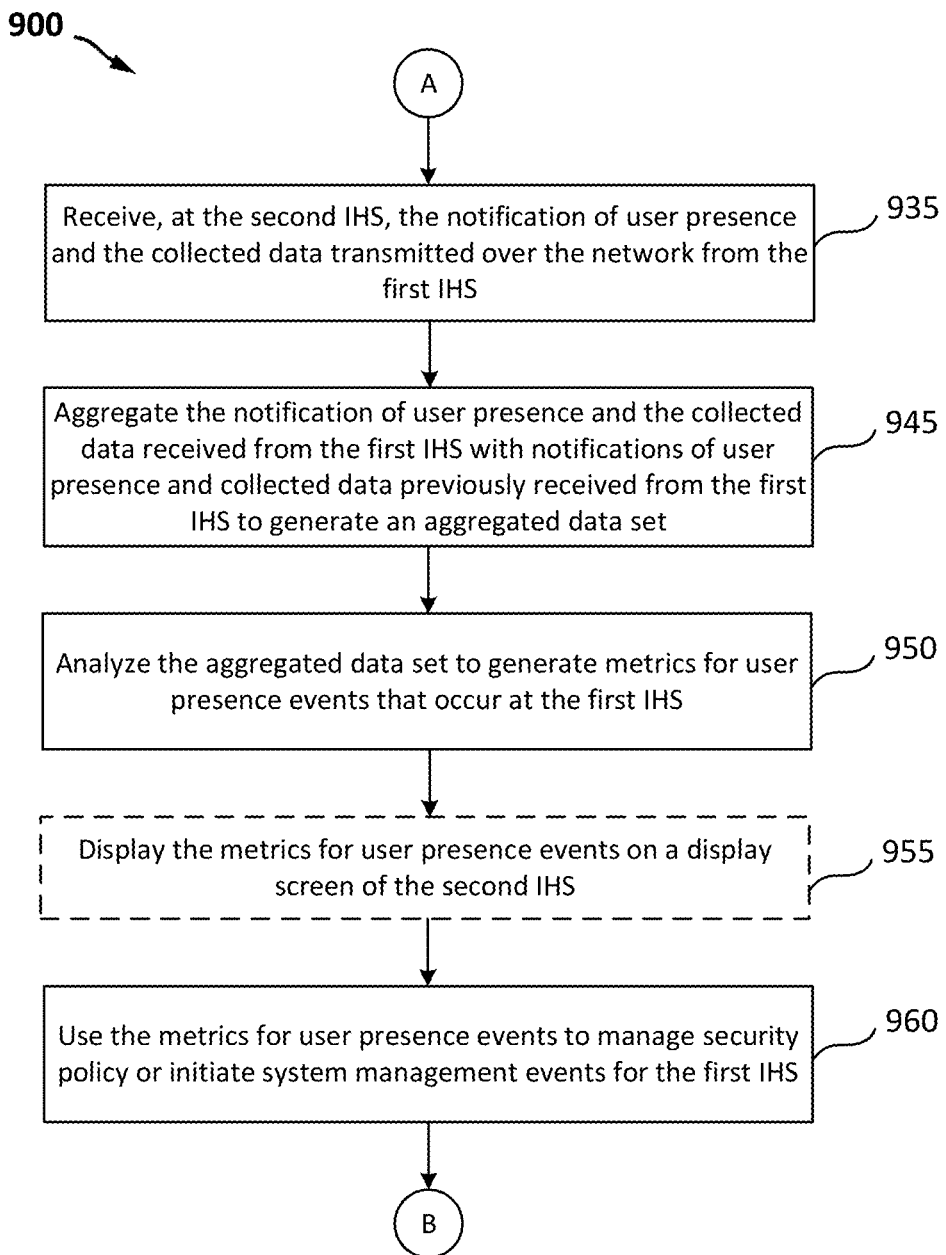

FIGS. 14A-14C illustrate various embodiments of a method 900 that may be used to collect, distribute and manage user presence notifications. As shown in FIG. 14A, method 900 may begin by monitoring user presence within a field of view (FOV) of a first IHS during an active system session for the first IHS (in step 905), and detecting user presence of a first user, which is present within the FOV of the first IHS during the active system session (in step 910). In method 900, the first user is an authenticated user of the active system session, and is enrolled as a trusted user in a trusted multi-user (TMU) database, which stores biometric data corresponding to one or more trusted users. Method 900 continues to monitor user presence within the FOV of the first IHS during the active system session until user presence of a second user is detected within the system FOV of the first IHS, while the first user is present.

Upon detecting the user presence of a second user, which is present within the FOV of the first IHS while the first user is also present (YES branch of step 915), method 900: (a) generates a notification of user presence of the second user (in step 920), (b) collects data associated with the user presence of the second user (in step 925), and (c) transmits the notification of user presence, along with the collected data, over a network to a second IHS for notification, aggregation and/or analysis (in step 930).

A wide variety of data may be collected in step 925. In some embodiments, the data collected in step 925 includes the TMU status of the second user. As noted further herein, the TMU status of the second user may be determined by comparing biometric data obtained from the second user with biometric data stored within the TMU database. In some embodiments, the TMU status may indicate that the second user is: (a) a trusted user included within the TMU database when the biometric data obtained from the second user matches the biometric data stored within the TMU database, or (b) an unknown user not included within the TMU database when the biometric data obtained from the second user does not match the biometric data stored within the TMU database. If the second user is determined to be a trusted user included within the TMU database, the identity of the second user may also be determined and collected in step 925, in some embodiments.

In some embodiments, the notification of user presence and the collected data may be transmitted over the network to the second IHS (in step 930) for notification purposes. As shown in FIG. 14B, for example, method 900 may further include receiving, at the second IHS, the notification of user presence and the collected data transmitted over the network from the first IHS (in step 935), and displaying the notification of user presence on a display screen of the second IHS to notify a user of the second IHS (e.g., an administrator, teacher, IT decision maker, etc.) that the second user was detected within the FOV of the first IHS (in step 940). In some embodiments, the notification of user presence displayed in step 940 may provide further details concerning the second user. For example, the notification of user presence displayed on the display screen of the second IHS may designate the second user as a trusted user or an untrusted user. In some embodiments, the notification of user presence displayed on the display screen of the second IHS may also display the identity of the second user.

In some embodiments, the notification of user presence and the collected data may be transmitted over the network to the second IHS (in step 930) for the purpose of aggregation and/or analysis. As shown in FIG. 14C, for example, method 900 may further include receiving, at the second IHS, the notification of user presence and the collected data transmitted over the network from the first IHS (in step 935), aggregating the notification of user presence and the collected data received from the first IHS with notifications of user presence and collected data previously received from the first IHS to generate an aggregated data set (in step 945), and analyzing the aggregated data set to generate metrics for user presence events that occur at the first IHS (in step 950).

A wide variety of metrics may be generated in step 950. In some embodiments, the aggregated data set may be analyzed in step 950 to determine the number of user presence events that have occurred at the first IHS: (a) during the active system session (or over a number of consecutive sessions), (b) in response to user presence of untrusted users, or (c) in response to user presence of an identified user. Other metrics may also be generated in step 950. For example, the aggregated data set may be analyzed in step 950 to determine an increasing/decreasing trend of user presence events occurring at the first IHS, or a ratio of user presence events that have occurred at the first IHS in response to the presence of untrusted users vs trusted users.

The metrics generated in step 950 may be utilized in various ways. In some embodiments, method 900 may display the metrics for user presence events on a display screen of the second IHS (in step 955) to bring the metrics to the attention of the user of the second IHS (e.g., an administrator, teacher, IT decision maker, etc.). In addition or alternatively, method 900 may use the metrics to manage security policy or initiate system management events for the first IHS (in step 960). For example, method 900 may use the metrics for user presence events (in step 960) to update security policy, initiate system updates or other system management actions. In some embodiments, method 900 may use the metrics for user presence events (in step 960) to modify system configuration settings and/or session revocation requirements for the active system session.

The method 900 shown in FIGS. 14A-14C may be performed by processing devices executing program instructions stored within a non-transitory memory (such as, e.g., a non-volatile memory and/or a non-volatile computer readable storage device). For example, the method steps 905-930 shown in FIG. 14A may be performed by at least one processing device included with a first IHS in response to executing program instructions included, e.g., within the FW Services A, EC Services B and/or OS Services C shown in FIG. 4. On the other hand, the method steps 935-940 and 935-960 may be performed by one or more processing devices included within a second IHS (e.g., an administrator's system or a remote management system), which is communicatively coupled to the first IHS over a network. The network may be a wired or wireless network, and may be implemented as a LAN, a WAN, a PAN or a combination thereof.

In some embodiments, the method steps 905-930 shown in FIG. 14A may be performed by a first processing device and a second processing device included within the first IHS (e.g., IHS 100). As shown in FIGS. 3A and 4, for example, IHS 100 may include a host processor 110 and a TMU management IC chip 184 comprising an on-chip processing device 185 and non-volatile memory 187. The non-volatile memory 187 may store a TMU database containing biometric data for one or more trusted users, and one or more firmware services (included, e.g., within FW Services A). The processing device 185 may execute program instructions included within the firmware service(s) stored within the on-chip non-volatile memory 187 to perform various functions, as described further herein.

During an active system session, for example, processing device 185 may execute the program instructions included within the firmware service(s) stored within the non-volatile memory 187 to detect the user presence of a first user (e.g., an authenticated user) and a second user (e.g., a trusted user or an unknown user) within the field of view (FOV) of a sensor included within the first IHS. If user presence of a second user is detected while the first user is present, processing device 185 may execute the program instructions included within the firmware service(s) to generate a notification of user presence for the second user and collect data associated with the user presence of the second user.

In some embodiments, processing device 185 may execute the program instructions included within the firmware service(s) to determine a TMU status for the second user. For example, the firmware service(s) executed by the processing device 185 may compare biometric data obtained from the second user with the biometric data contained within the TMU database to determine the TMU status of the second user. In some embodiments, the firmware service(s) executed by the processing device 185 may compare biometric data obtained from the second user with the biometric data contained within the TMU database to determine an identity of the second user, if the second user is a trusted user.

In some embodiments, host processor 110 may receive the notification of user presence and the collected data (e.g., the TMU status and/or identity of the second user) from the firmware service(s) and may execute one or more OS services (included, e.g., within OS Services C) to transmit the notification of user presence, along with the collected data, over the network to the second IHS.

In other embodiments, an EC service (included, e.g., within EC Services B) executed by EC 180 may be responsible for collecting the notification of user presence from the firmware service(s) via a hardware segregated communication path through the ISH 152. The EC service may store the notification of user presence locally or distribute the notification of user presence to the second IHS through an out-of-band communication path.

The second IHS may perform a wide variety of actions upon receiving the notification of user presence and the collected data transmitted over the network from the first IHS. In some embodiments, the second IHS may display the notification of user presence on a display screen of the second IHS to notify a user of the second IHS (e.g., an administrator, teacher, IT decision maker, etc.) that the second user was detected within the FOV of the first IHS. In other embodiments, the second IHS may aggregate the notification of user presence and the collected data received from the first IHS with notifications of user presence and collected data previously received from the first IHS to generate an aggregated data set, and analyze the aggregated data set to generate metrics for user presence events that occur at the first IHS. A wide variety of metrics may be generated, as noted above. In some embodiments, the second IHS may display the metrics for user presence events on a display screen of the second IHS. In some embodiments, the second IHS may use the metrics for user presence events to manage security policy or initiate system management events for the first IHS.

Systems and Methods for Enrolling New Users within a Database of Trusted Users

The systems and methods described above utilize a database of trusted users (i.e., a TMU database) to determine if a user present within the system FOV is a trusted user or an unknown user. In the method 400 shown in FIG. 7, a new user (e.g., an additional user) detected within the system FOV during an active system session may be enrolled in the TMU database upon receiving confirmation from an authenticated user that the new user is allowed to view/participate in the active system session. However, the method 400 shown in FIG. 7 does not disclose additional details of the enrollment process.

Figure 15:
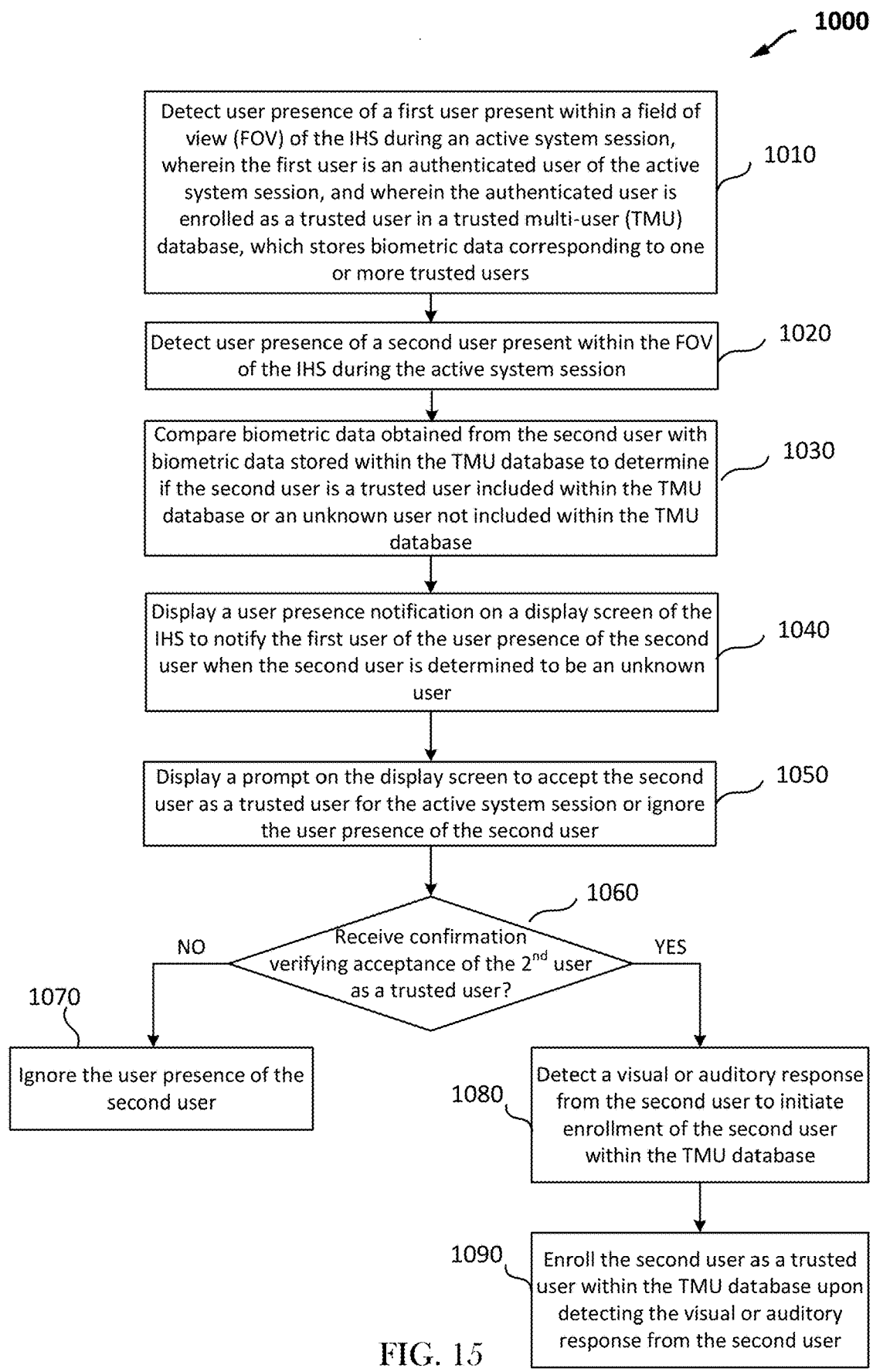
FIG. 15 is a flowchart diagram illustrating one embodiment of a method to enroll new trusted users within a trusted multi-user (TMU) database.

Additional systems and methods are provided in FIGS. 4 and 15 for enrolling new users within a database of trusted users during an active system session. More specifically, FIGS. 4 and 15 provide systems and methods to automate and streamline the process of enrolling new trusted users within a TMU database stored within an IHS. As described in more detail below, the systems and methods disclosed in FIGS. 4 and 15 may initiate enrollment of a new user (e.g., a second user) within a TMU database upon: (a) receiving confirmation from an authenticated user (e.g., a first user) verifying acceptance of the new user as a trusted user, and (b) detecting a passive enrollment response from the new user. In doing so, the systems and methods disclosed herein may securely and efficiently enroll new trusted users within a TMU database, with limited user interaction.

FIG. 15 illustrates one embodiment of a method 1000 that may be used to enroll new users within a database of trusted users during an active system session. As shown in FIG. 15, the method 1000 may begin (in step 1010) by detecting user presence of a first user present within a field of view (FOV) of an information handling system (IHS) during an active system session. In the method 1000, the first user is an authenticated user of the active system session, and is enrolled as a trusted user in a trusted multi-user (TMU) database, which stores biometric data corresponding to one or more trusted users. Method 1000 further includes detecting user presence of a second user present within the FOV of the IHS during the active system session (in step 1020) and comparing biometric data obtained from the second user with the biometric data stored within the TMU database to determine if the second user is a trusted user included within the TMU database or an unknown user not included within the TMU database (in step 1030).

When the comparison performed in step 1030 determines the second user is an unknown user, method 1000 displays a user presence notification on a display screen of the IHS to notify the first user of the user presence of the second user (in step 1040) and displays a prompt on the display screen to accept the second user as a trusted user for the active system session or ignore the user presence of the second user (in step 1050). The method 1000 then waits to receive confirmation from the first user verifying acceptance of the second user as a trusted user.

If confirmation is not received verifying acceptance of the second user as a trusted user (NO branch of step 1060), method 1000 ignores the user presence of the second user (in step 1070). The active system session may continue with or without modification after performing step 1070. In some embodiments, for example, the active system session may be modified after performing step 1070 to increase privacy for the IHS until the second user is no longer detected within the FOV of the IHS, as described above in step 440 of FIG. 7.

If confirmation is received verifying acceptance of the second user as a trusted user (YES branch of step 1060), method 1000 may detect a visual or auditory response from the second user to initiate enrollment of the second user within the TMU database (in step 1080), and enroll the second user as a trusted user within the TMU database upon detecting the visual or auditory response from the second user (in step 1090).

Method 1000 may utilize a wide variety of visual and auditory responses to initiate enrollment of the second user (in step 1080). For example, method 1000 may detect a gesture from the second user, or a word or a phrase spoken by the second user, to initiate enrollment in step 1080. A wide variety of user gestures may be utilized to initiate enrollment in step 1080, such as but not limited to, a head gesture (e.g., head nodding), an arm gesture (e.g., waving) or a hand gesture (e.g., a thumbs up or "ok" hand sign). Substantially any predetermined word or phrase (e.g., "yes," "ok," "enroll me," etc.) may be used to initiate enrollment of the second user in step 1080.

A wide variety of information may be stored within the TMU database when the second user is enrolled as a trusted user (in step 1090). For example, biometric data (e.g., facial landmarks, or a face ID) obtained from the second user may be stored within the TMU database during enrollment. Additional information may also be collected and stored within the TMU database during enrollment such as, but are not limited to, policy managed limitations and TMU configuration settings specified for the second user. The information stored within the TMU database for each trusted user is collectively referred to herein as TMU information.

Policy managed limitations specify limitation(s) restricting a trusted user's access to, or preventing a trusted user's interaction with, the IHS. In one example, a policy managed limitation may prevent the second user from interacting with the IHS for longer than a predetermined amount of time. In another example, a policy managed limitation may prevent the second user from accessing certain applications or data stored within the IHS. Policy managed limitations may or may not be stored for the second user, depending on the identity of the second user, a job title of the second user and/or a level of trust afforded to the second user.

TMU configuration settings specify configuration settings for managing TMU operations and actions. For example, TMU configuration settings may specify location(s) in which the second user is enrolled as a trusted user, whether or not to display notifications (e.g., user presence notifications or onlooker event notifications) on a display screen of the IHS when the second user is present, etc.

The method 1000 shown in FIG. 15 may be performed by at least one processing device executing program instructions stored within a non-transitory memory (such as, e.g., a non-volatile memory or a non-volatile computer readable storage device). In one embodiment, the method 1000 shown in FIG. 15 may be performed by executing program instructions included, e.g., within the FW Services A and OS Services C shown in FIG. 4.

During an active system session, one or more firmware services (included, e.g., within FW Services A) running on the TMU management IC chip 184 may detect the user presence of a first user (e.g., an authenticated user) and a second user (e.g., a trusted user or an unknown user) within the system FOV, and compare biometric data obtained from the second user with the biometric data contained within the TMU database to determine a TMU status of the second user.

One or more OS services (included, e.g., within OS Services C) executed by the host processor 110 may receive the TMU status of the second user and perform various actions in response thereto. For example, the one or more OS services executed by the host processor 110 may display the user presence notification on the display screen of the IHS to notify the first user of the user presence of the second user and prompt the first user to accept the second user as a trusted user for the active system session or ignore the user presence of the second user. The one or more OS services may also receive confirmation from the first user verifying acceptance of the second user as a trusted user or verifying that the user presence of the second user should be ignored.

The OS services execute by the host processor 110 may also collect TMU information (e.g., biometric data, policy managed limitations and TMU configuration settings) for the second user, and initiate enrollment of the second user and associated TMU information within the TMU database upon: (a) receiving confirmation from the first user verifying acceptance of the second user as a trusted user, and (b) detecting a passive enrollment response from the second user. A variety of passive enrollment responses may be used. For example, the OS services may detect a visual or auditory response from the second user (e.g., a user gesture, a word or phrase spoken by the second user, etc.), and may generate an enrollment notification to initiate enrollment of the second user within the TMU database upon detecting the visual or auditory response from the second user.

The firmware services running on the TMU management IC chip 184 may receive the enrollment notification to initiate enrollment from the host processor 110 and may enroll the second user as a trusted user within TMU database in response thereto. The firmware services may also receive the TMU information (e.g., biometric data, policy managed limitations and TMU configuration settings) collected for the second user by the OS services, and may store the TMU information within the TMU database during enrollment.

Systems and Methods for Provisioning a Database of Trusted Users Stored within One or More Information Handling Systems As noted above, a TMU database stored within an IHS may contain one or more trusted users and associated TMU information (e.g., biometric data, policy managed limitations and/or TMU configuration settings) specified for the trusted user(s). In some cases, it may be desirable to back-up and/or restore the TMU database stored within the IHS. Requiring the authenticated user to re-enroll each trusted user into the TMU database individually would be tedious and negatively affect user productivity.

In other cases, it may be desirable to restrict and/or manage enrollment of trusted users within a TMU database stored within one or more information handling systems. For example, an administrator may wish to restrict enrollment of new users when an IHS is located within an unsecure environment (such as, e.g., a cafeteria, a restaurant, an airplane, a home, etc.). Alternatively, an administrator may wish to automatically provision the TMU databases stored within one or more information handling systems with a particular set of trusted users and associated TMU information.

In other cases, it may be desirable to apply TMU configuration settings globally to TMU databases stored locally within one or more information handling systems. For example, a teacher walking around a classroom to observe students working on computers may be detected within the system FOV of a student's computer, causing an onlooker event notification to be displayed on the student's screen. Because these notifications may negatively impact the student's work, the teacher may wish to prevent such notifications from being displayed on his/her student's screens.

Figure 16:
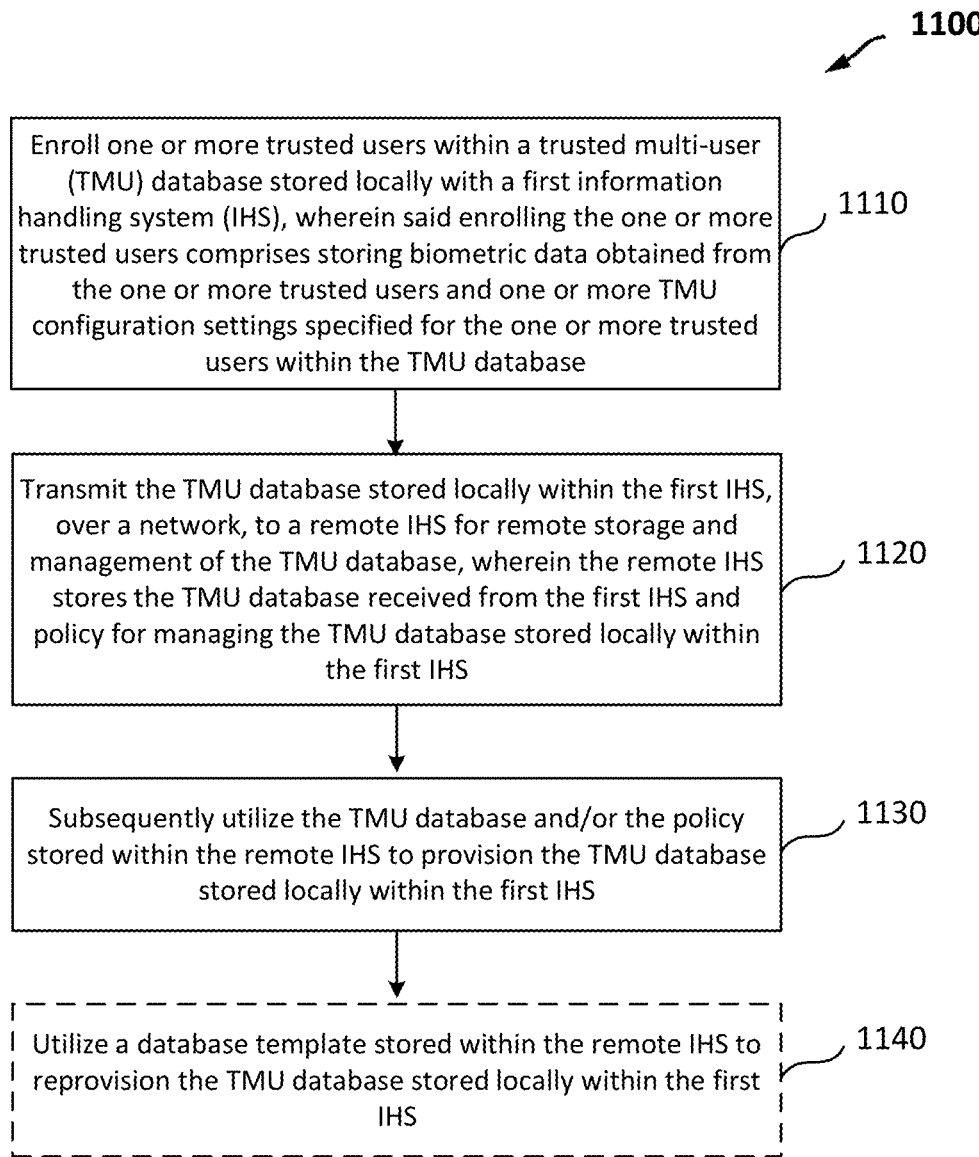
FIG. 16 is a flowchart diagram illustrating one embodiment of a method to provision a database of trusted users stored locally within an IHS.
Figure 17:
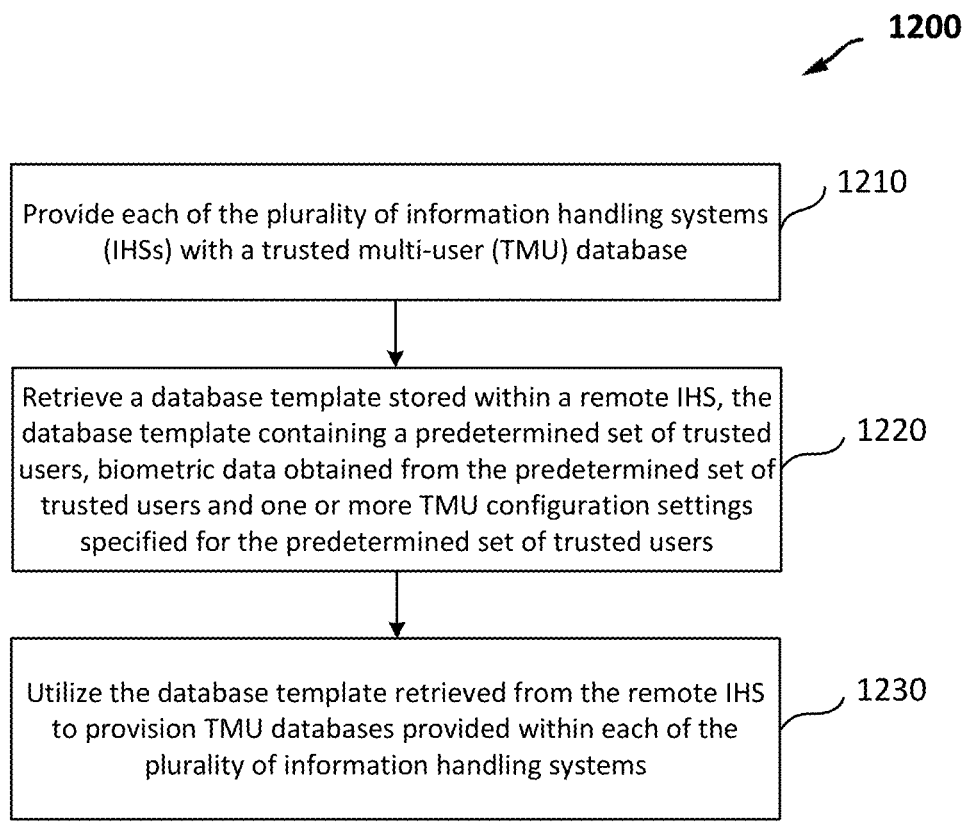
FIG. 17 is a flowchart diagram illustrating one embodiment of a method to provision a database of trusted users stored locally within a plurality of information handling systems.

Additional systems and methods are provided in FIGS. 4 and 16-17 to provision a database of trusted users (e.g., a TMU database) stored locally within one or more information handling systems. As described in more detail below, the systems and methods disclosed in FIGS. 4 and 16-17 may utilize a TMU database, a database template and/or policy stored within a remote IHS (such as, e.g., a cloud or backend server) to remotely manage and provision a TMU database stored locally within one or more information handling systems. In doing so, the systems and methods disclosed in FIGS. 4 and 16-17 may be used to securely back-up and restore a TMU database stored locally within an IHS, remotely manage enrollment and provisioning of a TMU database stored locally within one or more information handling systems based on policy, and apply TMU configuration settings globally to the TMU databases stored locally within a plurality of information handling systems.

FIG. 16 illustrates one embodiment of a method 1100 that can be used to provision a database of trusted users stored within an information handling system (IHS). As shown in FIG. 16, the method 1100 may begin (in step 1110) by enrolling one or more trusted users within a trusted multi-user (TMU) database stored locally with a first IHS. As noted above, trusted users may be enrolled within the TMU database by storing biometric data obtained from the trusted user(s) and TMU configuration settings specified for the trusted user(s) within the TMU database.

In step 1120, method 1100 transmits the TMU database stored locally within the first IHS, over a network, to a remote IHS for remote storage and management of the TMU database. In some embodiments, the TMU database stored within the remote IHS may provide a back-up copy of the TMU database stored locally within the first IHS. In some embodiments, policy may be stored within the remote IHS for managing enrollment and/or provisioning of the TMU database stored locally within the first IHS. In some embodiments, the TMU database and/or the policy stored within the remote IHS may be subsequently used to manage and/or provision the TMU database stored locally within the first IHS (in step 1130).

In some embodiments, a unique identifier may be stored within the remote IHS along with the TMU database received from the first IHS. The unique identifier (or unique ID) is an identifier, which uniquely identifies the first IHS (or an authenticated user of the first IHS) and correlates or links the first IHS (or the authenticated user) to the TMU database stored within the remote IHS. When used to identify the first IHS, the unique identifier may be a numeric or alphanumeric number that uniquely identifies the first IHS, such as a system ID or service tag. When used to identify an authenticated user of the first IHS, the unique identifier may be a username or user ID. In some embodiments, the unique identifier specified for the first IHS (or the authenticated user of the first IHS) may be used to retrieve the TMU database from the remote IHS.

In some embodiments, method 1100 may use the TMU database stored within the remote IHS (in step 1130) to restore a TMU database previously stored within the first IHS. For example, if the TMU database previously stored within the first IHS is deleted or corrupt, the back-up copy of the TMU database stored within the remote IHS may be retrieved from the remote IHS and used to restore the TMU database previously stored within the first IHS (in step 1130). In some embodiments, the TMU database previously stored within the first IHS may be restored by: (a) transmitting a restore request, over the network from the first IHS to the remote IHS, to restore the TMU database previously stored within the first IHS, (b) receiving, over the network from the remote IHS to the first IHS, the TMU database stored within the remote IHS in response to the restore request, and (c) restoring the TMU database previously stored within the first IHS using the TMU database received from the remote IHS. In some embodiments, the restore request may include the unique identifier specified for the first IHS (or the authenticated user).

In some embodiments, method 1100 may use the policy stored within the remote IHS (in step 1130) to manage enrollment of new users within the TMU database stored locally within the first IHS. A wide variety of policies may be used in step 1130 to manage enrollment of new users within the TMU database stored locally within the first IHS. For example, the policy stored within the remote IHS can be used (in step 1130) to restrict enrollment of new users within the TMU database stored locally within the first IHS when the first IHS is located within an unsecure environment. Other policies may also be used to remotely manage enrollment of new users within the TMU database stored locally within the first IHS.

In some embodiments, method 1100 may utilize a database template stored within the remote IHS to reprovision the TMU database stored locally within the first IHS (in step 1140). For example, an administrator may wish to reprovision the local TMU database with a predetermined set of trusted users and associated TMU information (e.g., biometric data obtained from the predetermined set of trusted users and TMU configuration settings specified for the predetermined set of trusted users). In order to do so, a database template containing the predetermined set of trusted users and associated TMU information may be generated and stored within the remote IHS.

In some embodiments, the TMU database stored locally within the first IHS may be reprovisioned (in step 1140) by storing the biometric data and TMU configuration settings contained within the database template within the local TMU database. The newly stored biometric data and TMU configuration settings may be added to (or used to replace) the biometric data and TMU configuration settings previously stored within the local TMU database to reprovision the local TMU database in step 1140.

In other embodiments, the TMU database stored locally within the first IHS may be reprovisioned (in step 1140)

based on the policy stored within the remote IHS. For example, the policy stored within the remote IHS may specify one or more rules for reprovisioning the local TMU database. A wide variety of rules may be used to control reprovisioning of the TMU database stored locally within the first IHS. For example, a database template stored within the remote IHS may be used (in step 1140) to reprovision the TMU database stored locally within the first IHS when the first IHS is located within an unsecure environment. In another example, a database template stored within the remote IHS may be used (in step 1140) to reprovision the TMU database stored locally within the first IHS when the first IHS moves from a first location (e.g., a first office location or campus) to a second location (e.g., a second office location or campus).

The method 1100 shown in FIG. 16 can be used to remotely manage and/or provision a database of trusted users (e.g., a TMU database) stored locally within an IHS. In some embodiments, the method 1100 shown in FIG. 16 can be used to securely back-up and restore a TMU database stored locally with an IHS. In other embodiments, the method 1100 shown in FIG. 16 can be used to remotely manage enrollment and/or reprovisioning of the TMU database stored locally with the IHS, based on policy stored within the remote IHS. Additional method embodiments are discussed below in reference to FIG. 17 to provision TMU databases stored locally within a plurality of information handling systems and/or apply TMU configuration settings globally to the TMU databases stored locally within the plurality of information handling systems.

FIG. 17 illustrates one embodiment of a method 1200 that can be used to provision a database of trusted users stored within a plurality of information handling systems. As shown in FIG. 17, method 1200 includes providing each of the plurality of information handling systems with a trusted multi-user (TMU) database (in step 1210), retrieving a database template stored within a remote IHS (in step 1220), and utilizing the database template retrieved from the remote IHS to provision the TMU databases provided and stored locally within each of the plurality of information handling systems (in step 1230).

The database template retrieved from the remote system (in step 1220) may contain a predetermined set of trusted users, biometric data obtained from the predetermined set of trusted users and TMU configuration setting(s) specified for the predetermined set of trusted users. In some embodiments, the database template may be retrieved from the remote system (in step 1220) by providing a unique identifier (or unique ID) to the remote system. In this case, the unique identifier used to retrieve the database template from the remote IHS may uniquely identify an "owner" of the database template (e.g., an administrator, a teacher or another user who wishes to apply the database template to a plurality of systems).

In some embodiments, the database template retrieved from the remote system (in step 1220) may be used to provision the local TMU databases (in step 1230) by storing the biometric data and TMU configuration setting(s) contained within the database template within the TMU databases stored locally within each of the plurality of information handling systems. The newly stored biometric data and TMU configuration setting(s) may be added to (or used to replace) biometric data and TMU configuration settings previously stored within the local TMU databases.

In other embodiments, the database template retrieved from the remote system (in step 1220) may be used to provision the local TMU databases (in step 1230) by applying the TMU configuration setting(s) contained within the database template to the TMU databases provided within each of the plurality of information handling systems. A wide variety of TMU configuration settings may be applied to the local TMU databases. For example, the TMU configuration setting(s) may specify one or more locations in which the predetermined set of trusted users is/are enrolled as trusted users, enable/disable the display of notifications (e.g., onlooker event notifications) on a display screen of the plurality of information handling systems, etc. Other TMU configuration settings may also be applied to the TMU databases provided within the plurality of information handling systems in step 1230.

The method 1100 shown in FIG. 16 and the method 1200 shown in FIG. 17 may be performed by at least one processing device executing program instructions stored within a non-transitory memory (such as, e.g., a non-volatile memory or a non-volatile computer readable storage device). In one embodiment, the method 1100 shown in FIG. 16 and the method 1200 shown in FIG. 17 may be performed by at least one processing device executing program instructions included, e.g., within the FW Services A and OS Services C shown in FIG. 4.

As shown in FIGS. 3A and 4, IHS 100 may include a host processor 110 and a TMU management IC chip 184 comprising an on-chip processing device 185 and non-volatile memory 187. The non-volatile memory 187 may store a local TMU database 189 containing biometric data for one or more trusted users, and one or more firmware services (included, e.g., within FW Services A). The local TMU database 189 may contain one or more trusted users, biometric data obtained from the one or more trusted users and TMU configuration settings specified for the one or more trusted users. The processing device 185 may execute program instructions included within the firmware service(s) to obtain biometric data from the trusted users and manage the local TMU database 189 stored within the non-volatile memory 187.

Host processor 110 may execute program instructions included within one or more OS services (e.g., OS Services C) to communicate information between the firmware service(s) running on the TMU management IC chip 184 and a remote system 194 (e.g., a cloud or backend server), which is communicatively coupled to the IHS 100 over a network. For example, host processor 110 may execute the program instructions to transmit biometric data (e.g., facial landmarks or a face ID) obtained from the trusted users by the firmware service(s), over the network, to the remote system 194 for backend collection, storage and management.

In some embodiments, host processor 110 may execute the program instructions included within the OS service(s) to transmit a copy of the TMU database 189 stored locally within the IHS 100, over the network, to the remote system 194 for remote storage and back-up. In such embodiments, the host processor 110 may further execute the program instructions to retrieve the back-up copy of the TMU database stored within the remote system 194, and provide the back-up copy of the TMU database 189 to the firmware service(s) running on the TMU management IC chip 184. Upon receiving the back-up copy of the TMU database, processing device 185 may execute the program instructions included within the firmware service(s) to restore the local TMU database 189 stored within the non-volatile memory 187 using the back-up copy of the TMU database received from the remote system 194.

The remote system 194 may also be configured to store database templates for provisioning the local TMU database 189 stored within the non-volatile memory 187 and/or policy for remotely managing enrollment within and/or provisioning of the local TMU database.

In some embodiments, host processor 110 may execute the program instructions included within the OS service(s) to retrieve, over the network, a policy stored within the remote system 194. The policy retrieved from the remote system 194 may be provided to and/or used by the firmware service(s) running on the TMU management IC chip 184. For example, the firmware service(s) executed by processing device 185 may use the policy received from the remote system 194 to manage enrollment of new users within the local TMU database 189 stored within the non-volatile memory 187. In one example implementation, the firmware service(s) executed by processing device 185 may use the policy received from the remote system 194 to restrict enrollment of new users within the local TMU database 189 when the IHS 100 is located within an unsecure environment.

In some embodiments, host processor 110 may execute the program instructions included within the OS service(s) to retrieve, over the network, a database template stored within the remote system 194. In such embodiments, the database template retrieved from the remote system 194 may be provided to and/or used by the firmware service(s) running on the TMU management IC chip 184. For example, the firmware service(s) executed by processing device 185 may utilize the database template received from the remote system 194 to provision the local TMU database 189 stored within the non-volatile memory 187. As noted above, the local TMU database 189 may be provisioned by storing biometric data and/or TMU configuration setting(s) contained within the database template within the local TMU database.

Systems and Methods for Provisioning a Database of Trusted Users Based on Location Some users may utilize their system at different locations, such as an office, home, restaurant, etc. In some cases, the user (or an administrator) may wish to select the trusted users that are enrolled, at each location, within the TMU database stored locally within the user's system. For example, the user may split time working between two different office buildings and home. Although a TMU database of trusted users is maintained on the user's system, the trusted users expected at each location may differ. For example, a first set of trusted users may be expected at a first office location and a second set of trusted users may be expected at a second office location. No trusted users may be expected at the user's home (other than the user). In order to accommodate different sets of trusted users at different locations, the user may need to individually enroll each trusted user expected at a given location, or disable TMU functionality. This manual re-enrollment process would be tedious and would negatively affect user productivity.

Figure 18:
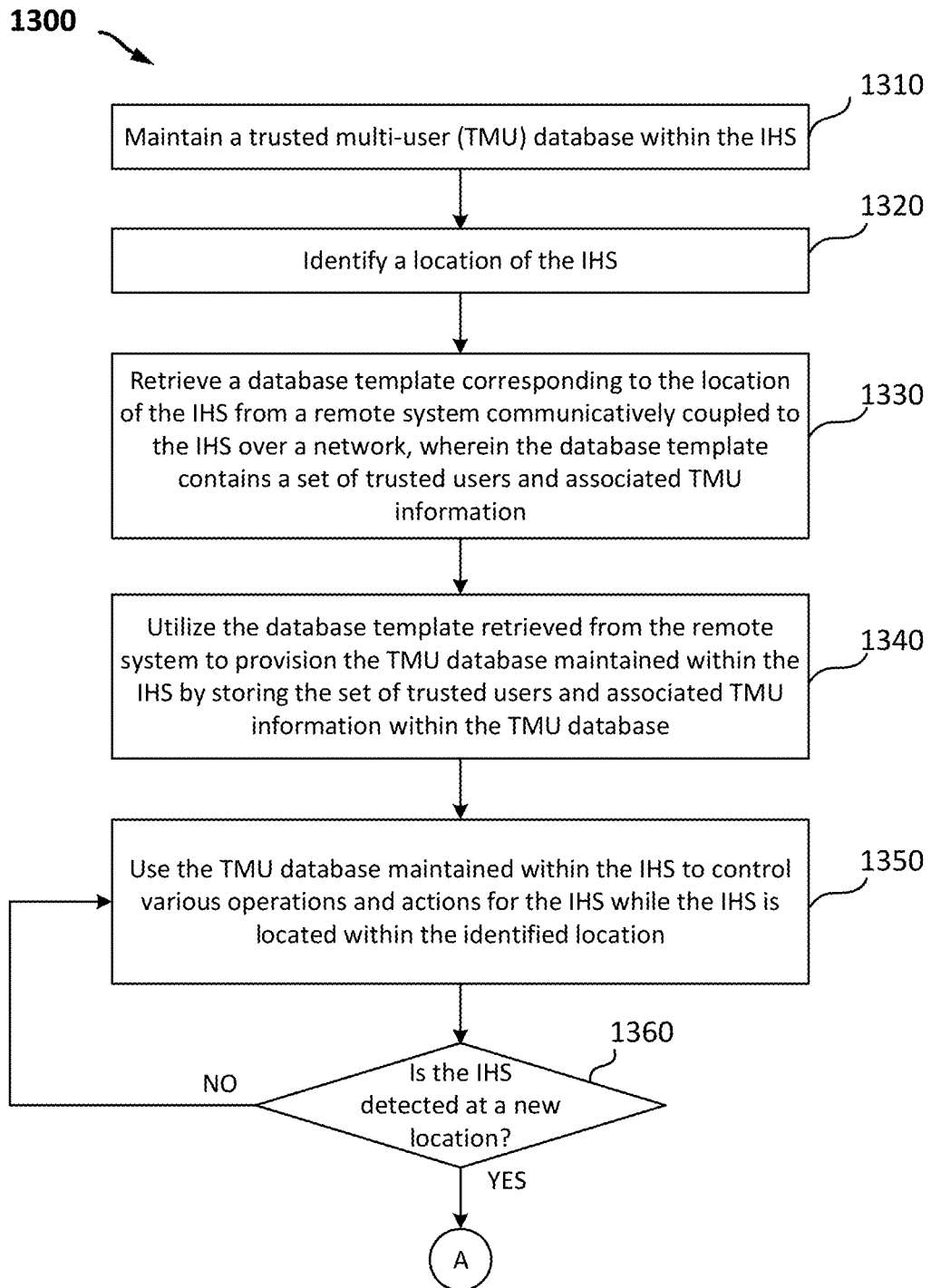
FIG. 18 is a flowchart diagram illustrating one embodiment of a method to provision a database of trusted users stored locally within an IHS based on location.
Figure 18:
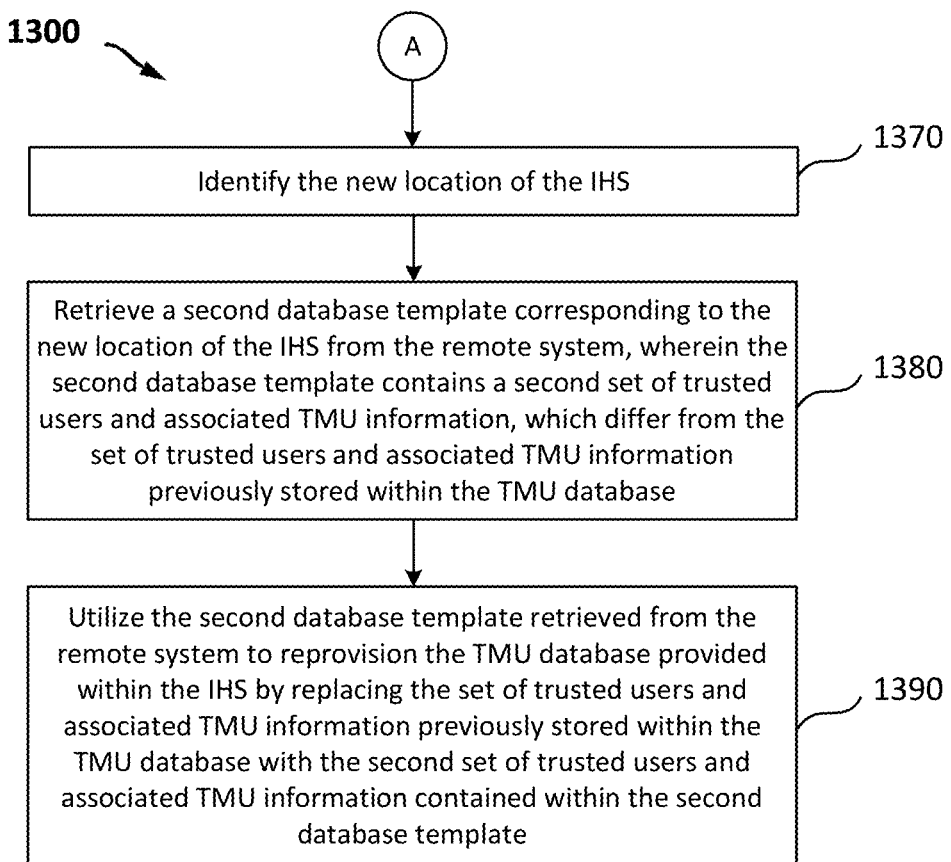

Additional systems and methods are provided in FIGS. 4 and 18 to provision a database of trusted users stored locally within an IHS based on location. As described in more detail below, the systems and methods disclosed in FIGS. 4 and 18 may identify a location of the IHS and provision a database of trusted users (e.g., a TMU database) stored locally with the IHS based on the identified location. If the IHS moves to a different location, the systems and methods disclosed in FIGS. 4 and 18 may automatically reprovision the TMU database with a set of trusted users (and associated TMU information) expected for the new location. This reduces re-enrollment and enables the systems and methods disclosed herein to intelligently manage the TMU database stored locally with the IHS.

FIG. 18 illustrates one embodiment of a method 1300 that can be used to provision a database of trusted users stored locally within an IHS based on location. As shown in FIG. 18, method 1300 maintains a TMU database within the IHS (in step 1310), identify a location of the IHS (in step 1320), retrieves a database template corresponding to the location of the IHS from a remote system communicatively coupled to the IHS over a network (in step 1330), and utilizes the database template retrieved from the remote system to provision the TMU database maintained within the IHS (in step 1340). The database template retrieved from the remote system (in step 1330) may contain a set of trusted users and associated TMU information corresponding to the location identified in step 1320. In some embodiments, the TMU database maintained within the IHS may be provisioned (in step 1340) by storing, within the TMU database, the set of trusted users and associated TMU information contained within the database template.

Once provisioned with the set of trusted users and associated TMU information (in step 1340), the TMU database maintained within the IHS may be used to control various operations and actions for the IHS while the IHS is located within the identified location (in step 1350). For example, the TMU database may be utilized by one or more of the embodiments described herein to manage system wake/lock events, manage system configuration settings and/or manage session retainment based on the user presence detected at the identified location. If the IHS is moved to a new location, method 1300 may reprovision the TMU database maintained within the IHS with a new set of trusted users and associated TMU information corresponding to the new location.

Upon detecting the IHS in a new location (YES branch of step 1360), method 1300 identifies the new location of the IHS (in step 1370), retrieves a second database template corresponding to the new location of the IHS from the remote system (in step 1380), and utilizes the second database template retrieved from the remote system to reprovision the TMU database provided within the IHS (in step 1390). The second database template retrieved from the remote system (in step 1390) may contain a second set of trusted users and associated TMU information, which differ from the set of trusted users and associated TMU information previously stored within the TMU database (in step 1340). In some embodiments, the TMU database maintained within the IHS may be reprovisioned (in step 1390) by replacing the set of trusted users and associated TMU information previously stored within the TMU database (in step 1340) with the second set of trusted users and associated TMU information contained within the second database template.

In some embodiments, the location of the IHS identified, e.g., in steps 1320 and 1370 may be used to retrieve the database template corresponding to the location from the remote system (in steps 1330 and 1380). A wide variety of techniques may be used to identify the location of the IHS and retrieve a corresponding database template from the remote system. In some embodiments, for example, method 1300 may obtain location data from one or more networks communicatively coupled to the IHS, and may use the location data obtained from the network(s) to identify the location of the IHS (in steps 1320 and 1370). In some embodiments, method 1300 may associate the location data obtained from the network(s) with a location identifier (or location ID), which uniquely identifies or corresponds to the location of the IHS, and may provide the location identifier to the remote system to retrieve the database template corresponding to that location. Other techniques may also be used to identify the location of the IHS and retrieve a corresponding database template from the remote system.

In the embodiments described above, at least one database template (e.g., a second database template) is stored within the remote system and used to reprovision the TMU database maintained within the IHS when the IHS moves to the new location. Such embodiments would enable the TMU database stored locally within a user's system to be automatically reprovisioned with a different set of trusted users and associated TMU information when the user's system moves, for example, from a first location (e.g., a first office building) to a second location (e.g., a second office building). This prevents the user from having to manually re-enroll each trusted user expected for a given location when the user moves to that location.

However, the remote system described herein may be used to store a plurality of database templates for the user. In some embodiments, each of the plurality of database templates stored within the remote system may correspond to a different location and contain a predetermined set of trusted users and associated TMU information to be utilized at the different location. In such embodiments, method 1300 may use the location of the IHS to select, from the plurality of database templates stored within the remote system, the database template corresponding to the location of the IHS.

In other embodiments, the remote system may be used to store a plurality of database templates for a plurality of users. In such embodiments, the remote system may store one or more database templates for each user, wherein each database template corresponds to a different location and contains a predetermined set of trusted users and associated TMU information to be utilized at the different location. When database templates are provided for multiple users, method 1300 may perform additional steps to select an appropriate database template for a given user and a given location. For example, method 1300 may determine an identity of a user present within a field of view of the IHS, and may use the identity of the user and the location of the IHS to select, from the plurality of database templates stored within the remote system, the database template corresponding to the location of the IHS.

In some embodiments, the plurality of database templates may be stored within a first IHS (e.g., a cloud or backend server running on one or more remote systems 194), and the method 1300 shown in FIG. 18 may be performed by a second IHS (e.g., IHS 100), which is communicatively coupled to the first IHS over a network. The method 1300 shown in FIG. 18 may be performed by at least one processing device of the second IHS executing program instructions stored within a non-transitory memory (such as, e.g., a non-volatile memory or non-volatile computer readable storage device). In one embodiment, the method 1300 shown in FIG. 18 may be performed by at least one processing device of the second IHS executing program instructions included, e.g., within the FW Services A and OS Services C shown in FIG. 4.

As shown in FIGS. 3A and 4, IHS 100 includes a TMU management IC chip 184 and a host processor 110. The TMU management IC chip 184 includes an on-chip non-volatile memory 187 for storing a TMU database and one or more firmware services (included, e.g., within FW Services A), and a processing device 185 for executing program instructions included within the firmware service(s) stored within the non-volatile memory 187 to manage the TMU database stored within the non-volatile memory 187.

When the second IHS (e.g., IHS 100) is utilized at a particular location, host processor 110 may execute program instructions included within one or more OS services (e.g., OS Services C) to identify the location of the second IHS, select a database template corresponding to the location of the second IHS from the plurality of database templates stored within the first IHS, retrieve the selected database template from the first IHS over the network, and provide the database template retrieved from the first IHS to the firmware service(s) running on the TMU management IC chip 184. Upon receiving the database template, processing device 185 executes program instructions included within the firmware service(s) to provision the TMU database stored within non-volatile memory 187 using the database template retrieved from the first IHS.

In some embodiments, the second IHS may be utilized at a new location. When this occurs, host processor 110 may execute the program instructions within the OS service(s) to identify the new location of the second IHS, select a second database template corresponding to the new location of the second IHS from the plurality of database templates stored within the first IHS, retrieve the second database template from the first IHS over the network, and provide the second database template retrieved from the first IHS to the firmware service(s) running within the TMU management IC chip 184. Upon receiving the second database template, processing device 185 may execute the program instructions included within the firmware service(s) to reprovision the TMU database stored within non-volatile memory 187 using the second database template retrieved from the first IHS.

In some embodiments, the OS service(s) executed by the host processor 110 may use the location of the second IHS to select, from the plurality of database templates stored within the first IHS, the database template corresponding to the location of the second IHS. In one example embodiment, host processor 110 may execute the program instructions within the OS service(s) to: (a) identify the location of the second IHS using location data obtained from one or more networks communicatively coupled to the IHS, (b) associate the location data obtained from the one or more networks with a location identifier corresponding to the location of the second IHS, (c) transmit the location identifier over the network to the first IHS, which uses the location identifier to select the database template corresponding to the location of the second IHS, and (d) receive the selected database template from the first IHS over the network.

A wide variety of networks may be used to identify the location of the IHS. For example, the networks may include a local area network (LAN), a wide area network (WAN), a personal area network (PAN) or a combination thereof. Examples of wireless networks that may be used to identify a location of the IHS include, but are not limited to, a Wi-Fi network, a Bluetooth network, a cellular network, a global positioning system (GPS) network, etc.

In some embodiments, the first IHS may be configured to store a plurality of database templates for a plurality of users, as described above. When database templates are provided for multiple users, processing device 185 may execute the program instructions included within the firmware service(s) to determine an identity of a user present within a field of view of the second IHS. Once an identity of the user is determined, the host processor 110 may execute the program instructions included within the OS service(s) to: (a) use the identity of the user to select, from the plurality of database templates stored within the first IHS, the one or more database templates corresponding to the user, and (b) use the location of the second IHS to select, from the one or more of database templates corresponding to the user, the database template corresponding to the location of the second IHS.

System and Methods for Monitoring User Presence in a System Having Multiple User Presence Detection (UPD) Capable Devices In many of the embodiments described above, user presence of a user is detected when the user is present within a field of view (FOV) of a UPD-capable system or device. As noted above, a UPD-capable system or device may generally include at least one sensor (e.g., a camera, image sensor, microphone and/or other proximity sensor) for obtaining data pertaining to user presence. A UPD-capable system or device may also include, or be coupled to, a processing device that executes program instructions for analyzing the data obtained by the at least one sensor to detect user presence (or absence) within a FOV of the sensor.

However, some user systems may include multiple UPD-capable systems and devices. For example, the user system shown in FIG. 1 includes IHS 10, peripheral display 32 and portable IHS 26. IHS 10 and portable IHS 26 are examples of UPD-capable systems having at least one sensor and processing device, as described above. Peripheral camera 40 and peripheral display 32 are examples of UPD-capable peripheral devices, which include at least one sensor for obtaining data pertaining to user presence, and are coupled to a processor within IHS 10 or portable IHS 26. In the discussion provided below, UPD-capable systems and UPD-capable peripheral devices are referred to herein as UPD-capable devices.

Problems occur when a user system utilizes multiple UPD-capable devices to monitor user presence. For example, switching delays can occur if only one UPD-capable device is active at a time in a system having multiple UPD-capable devices. In addition, since each UPD-capable device has its own FOV, a user may be detected within the FOV of one UPD-capable device (e.g., IHS 10), but not another (e.g., portable IHS 26). This conflict may lead to inadvertent system waking or locking, or may create a potential for onlookers to exploit an active system session or view displayed content. It can also lead to false notifications and an overall bad user experience.

In some cases, a user's gaze or attention may be focused on one UPD-capable device (e.g., peripheral display 32), but not another (e.g., portable IHS 26), during an active system session. This can create conflicts or problems with gaze monitoring software, which tracks the user's gaze or attention and performs various actions (such as, e.g., reducing the screen brightness, texturizing the screen or turning off the screen) when the user's gaze or attention is directed away from a UPD-capable device for a period of time. Additional problems not mentioned herein may also occur when multiple UPD-capable devices are utilized to monitor user presence.

Figure 19:
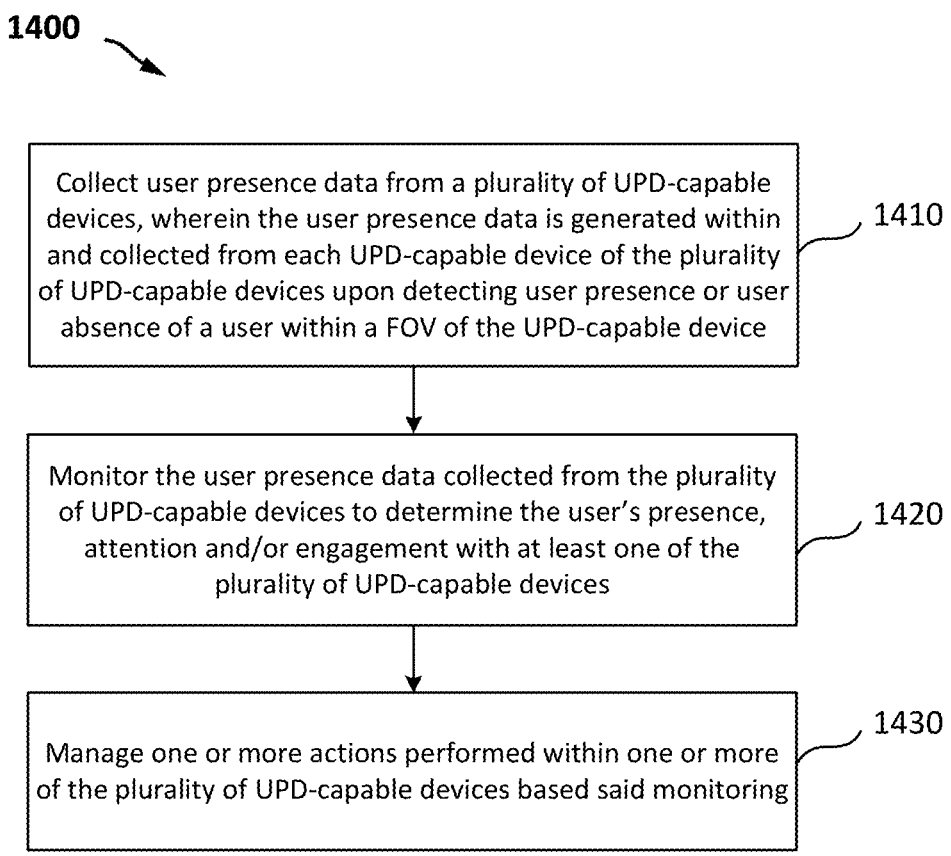
FIG. 19 is a flowchart diagram illustrating one embodiment of a method to monitor user presence, and manage various actions in response to user presence, within a system comprising a plurality of UPD-capable devices.
Figure 20:
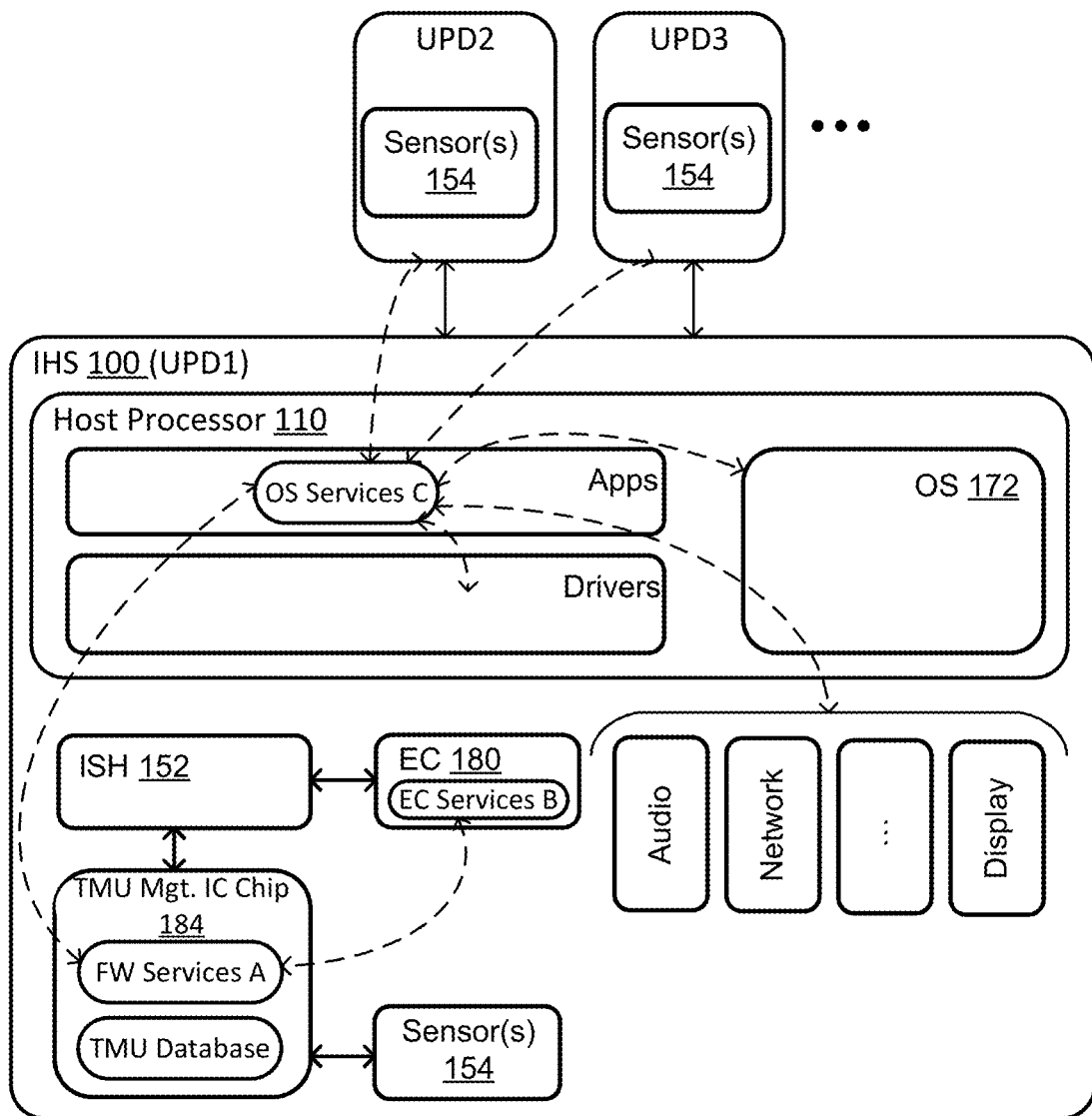
FIG. 20 is a block diagram of a system comprising a plurality of UPD-capable devices.

Additional systems and methods are provided in FIGS. 19 and 20 to monitor user presence, and manage various actions in response to user presence, within a system comprising multiple UPD-capable devices. As described in more detail below, the systems and methods provided in FIGS. 19 and 20 may utilize one or more OS services to collect user presence data from a plurality of UPD-capable devices and monitor the user presence data collected from the plurality of UPD-capable devices to accurately identify a user's presence, attention and/or engagement with a particular UPD-capable device. The monitoring provided by the OS service(s) can be used to manage various actions performed within the particular UPD-capable device (such as, e.g., waking or locking the UPD-capable device, managing system configuration settings or session revocation requirements specified for the particular UPD-capable, displaying notifications on a display screen of the particular UPD-capable, etc.). In doing so, the systems and methods disclosed in FIGS. 19 and 20 may reduce or eliminate the problems that may otherwise occur when multiple UPD-capable devices are used to monitor user presence.

FIG. 19 illustrates one embodiment of a method 1400 that can be used to monitor user presence, and manage various actions in response to user presence, within a system comprising a plurality of UPD-capable devices. As shown in FIG. 19, method 1400 may begin by collecting user presence data from the plurality of UPD-capable devices (in step 1410). The user presence data collected in step 1410 may be generated within, and collected from, each UPD-capable device upon detecting user presence or user absence of a user within a FOV of the UPD-capable device. Method 1400 further includes monitoring the user presence data collected from the plurality of UPD-capable devices to determine the user's presence, attention or engagement with at least one of the plurality of UPD-capable devices (in step 1420), and managing one or more actions performed within one or more of the plurality of UPD-capable devices based said monitoring (in step 1430).

In some embodiments, the user presence data collected in step 1410 may include biometric data obtained from a user. The biometric data may be generated by, and collected from, at least one sensor (e.g., a camera, image sensor or other proximity sensor) included within the plurality of UPD-capable devices. In some embodiments, the biometric data may pertain to: (a) user presence when the user is detected within a field of view (FOV) of the at least one sensor, (b) user absence when the user is not detected within the FOV of the at least one sensor, and (c) user attention when the user's gaze is directed toward or away from the at least one sensor.

A wide variety of biometric data may be obtained from the user and collected in step 1410. In some embodiments, an image of the user may be obtained by a camera or image sensor and collected as biometric data in step 1410. In other embodiments, facial recognition software may analyze the image of the user to detect various landmarks on the user's face. In some embodiments, the facial landmarks obtained from the user's face may be collected as biometric data in step 1410. In other embodiments, the facial landmarks may be combined, aggregated or otherwise analyzed to form a face ID for the user, which may be collected as biometric data in step 1410.

In some embodiments, the user presence data collected in step 1410 may include a TMU status of the user. The TMU status of the user may be generated by, and collected from, at least one of the plurality of UPD-capable devices. For example, at least one of the plurality of UPD-capable devices may compare the biometric data obtained from the user with biometric data stored within a TMU database containing biometric data corresponding to one or more trusted users. The TMU status may identify the user as: (a) a trusted user when the biometric data obtained from the user matches the biometric data contained within the TMU database, or (b) an unknown user when the biometric data obtained from the user does not match the biometric data contained within the TMU database.

In some embodiments, the user presence data collected in step 1410 may further include a speaker identity (or speaker ID) of the user. The speaker identity may be generated by, and collected from, at least one of the plurality of UPD-capable devices. For example, a UPD-capable device may receive audio data detected within the user's environment, and may analyze the audio data to identify vocal characteristics of the user and generate the speaker identity for the user.

In some embodiments, method 1400 may monitor the user presence data collected from the plurality of UPD-capable devices (in step 1420) by aggregating the user presence data collected from each of the plurality of UPD-capable devices and analyzing the aggregated user presence data. In some embodiments, method 1400 may aggregate the user presence data collected from each of the plurality of UPD-capable devices by combining the biometric data collected from each UPD-capable device with the TMU status. In other embodiments, method 1400 may aggregate the user presence data collected from each of the plurality of UPD-capable devices by combining the biometric data collected from each UPD-capable device with the TMU status and the speaker ID.

In some embodiments, method 1400 may analyze the aggregated user presence data to: (a) determine if the user is a trusted user or an unknown user based on the TMU status, and (b) identify the user's presence, attention or engagement with a particular UPD-capable device of the plurality of UPD-capable devices. In such embodiments, method 1400 may manage one or more actions performed within the particular UPD-capable device (in step 1430) based on the user's presence, attention or engagement with the particular UPD-capable device and the determination that the user is a trusted user or an unknown user.

A wide variety of actions may be managed (in step 1430) based on the user's presence, attention or engagement with the particular UPD-capable device and the determination that the user is a trusted user or an unknown user. In some embodiments, for example, method 1400 may manage waking or locking the particular UPD-capable device (in step 1430). In other embodiments, method 1400 may manage system configuration settings or session revocation requirements specified for the particular UPD-capable device (in step 1430). In other embodiments, method 1400 may manage a display screen of the particular UPD-capable device, or content displayed on the display screen (in step 1430). For example, method 1400 may manage the display of notifications (such as, e.g., user presence notifications or onlooker event notifications) on a display screen of the particular UPD-capable device, or may control display screen settings for the display screen of the particular UPD-capable device, in step 1430.

FIG. 20 illustrates one embodiment of a system that includes a plurality of UPD-capable devices, including but not limited to, UPD1, UPD2 and UPD3. In the embodiment shown in FIG. 20, UPD1 is a UPD-capable information handling (e.g., IHS 100) having at least sensor (e.g., a camera, image sensor, microphone and/or other proximity sensor) for obtaining user presence data, and at least processing device and executable program instructions for analyzing the user presence data obtained by the at least one sensor to detect user presence (or absence) within a FOV of the sensor.

UPD2 and UPD3 are communicatively coupled to UPD1 via a wired or wireless connection. In some embodiments, UPD2 and/or UPD3 may be a UPD-capable IHS having at least one sensor (e.g., one or more proximity sensor(s) 154) and at least one processing device, as described above. In other embodiments, UPD2 and/or UPD3 may be a UPD-capable peripheral device, which includes at least sensor for obtaining user presence data and is coupled to at least one processing device configured to analyze the user presence data.

UPD1, UPD2 and UPD3 are each configured to generate user presence data upon detecting user presence (or user absence) of a user within a field of view (FOV) of the UPD-capable device. The user presence data may include biometric data pertaining to user presence (or user absence) of the user, a TMU status of the user and/or a speaker ID generated for the user. For example, UPD1, UPD2 and UPD3 may each include at least one sensor configured to obtain biometric data from the user (e.g., an image, a plurality of facial landmarks or a face ID). The biometric data obtained from the user may pertain to: (a) user presence when the user is detected within a field of view (FOV) of the at least one sensor, (b) user absence when the user is not detected within the FOV of the at least one sensor, and (c) user attention when the user's gaze is directed toward or away from the at least one sensor.

At least one of the UPD-capable devices (e.g., UPD 1) may generate a TMU status of the user by executing a firmware service included, for example, within Firmware services A. The TMU status may be generated by comparing the biometric data obtained from the user with biometric data stored within a TMU database (e.g., TMU database 189) stored within the UPD-capable device.

At least one of the UPD-capable devices (e.g., UPD 1) may generate a speaker ID for the user. For example, the UPD-capable device may include a microphone for receiving audio data from the user's environment and a processor (e.g., an audio digital signal processor, DSP) for analyzing the audio data to identify vocal characteristics of the user and generate a speaker ID for the user.

The method 1400 shown in FIG. 19 may be performed by at least one processing device executing program instructions stored within a non-transitory memory (such as, e.g., a non-volatile memory or non-volatile computer readable storage device). In one embodiment, method 1400 may be performed by host processor 110 executing program instructions included, e.g., within the OS Services C shown in FIG. 20. For example, host processor 110 may execute program instructions contained within one or more OS services to: (a) collect the user presence data generated by the plurality of UPD-capable devices, (b) monitor the user presence data collected from the plurality of UPD-capable devices to determine the user's presence, attention or engagement with at least one of the plurality of UPD-capable devices, and (c) manage one or more actions performed within the first UPD-capable device based said monitoring, as noted above with reference to FIG. 19.

The systems and methods shown in FIGS. 19 and 20 utilize a variety of inputs (e.g., biometric data, TMU status, speaker ID) received from a plurality of UPD-capable devices to accurately identify the user's presence, attention or engagement with a particular UPD-capable device. Aggregating the inputs received from multiple UPD-capable devices provides a more detailed analysis of the user and the user's environment, and prevents the problems and conflicts that typically occur in systems comprising multiple UPD-capable devices.

Although the present invention has been described in detail, it should be understood that various changes, substitutions and alterations can be made hereto without departing from the spirit and scope of the invention as defined by the appended claims.

What is claimed is:

1. A system, comprising:
a first information handling system (IHS), comprising:
a sensor configured to obtain biometric data from at least one user present within a field of view (FOV) of the sensor;
a non-transitory memory configured to store a trusted multi-user (TMU) database containing biometric data corresponding to one or more trusted users; and
at least one processing device configured to execute program instructions during an active system session to:
detect user presence of a first user present within the FOV of the sensor, wherein the first user is an authenticated user of the active system session and enrolled as a trusted user in the TMU database;
detect user presence of a second user, which is present within the FOV of the sensor while the first user remains present;
generate a notification of user presence of the second user;
collect data associated with the user presence of the second user; and
transmit the notification of user presence, along with the collected data, over a network to a second IHS for notification, aggregation or analysis; and
a second IHS comprising:
an interface with the network;
at least one processing device configured to execute program instructions to:
receive the notification of user presence and the collected data transmitted over the network from the first IHS;
aggregate the notification of user presence and the collected data received from the first IHS with notifications of user presence and collected data previously received from the first IHS to generate an aggregated data set; and
analyze the aggregated data set to generate metrics for user presence events that occur at the first IHS.

2. The system of claim 1, wherein the at least one processing device comprises a first processing device, which is configured to execute a first set of program instructions stored within the non-transitory memory during the active system session to detect the user presence of the first user, detect the user presence of the second user, generate the notification of user presence of the second user and collect data associated with the user presence of the second user.

3. The system of claim 2, wherein the first IHS further comprises a non-transitory computer readable storage device configured to store a second set of program instructions, and wherein the at least one processing device comprises a second processing device configured to execute the second set of program instructions during the active system session to:
receive the notification of user presence and the collected data from the first processing device; and
transmit the notification of user presence, along with the collected data, over the network to the second IHS.

4. The system of claim 2, wherein the collected data includes a TMU status of the second user, and wherein the first processing device is configured to execute the first set of program instructions during the active system session to:
compare biometric data obtained from the second user with biometric data stored within the TMU database to determine the TMU status of the second user.

5. The system of claim 4, wherein the TMU status of the second user designates the second user as:
a trusted user included within the TMU database, if the biometric data obtained from the second user matches the biometric data stored within the TMU database; or
an unknown user not included within the TMU database, if the biometric data obtained from the second user does not match the biometric data stored within the TMU database.

6. The system of claim 5, wherein if the second user is determined to be a trusted user included within the TMU database, the collected data further includes an identity of the second user.

7. The system of claim 1, wherein the second IHS is configured to display the notification of user presence on a display screen of the second IHS to notify a user of the second IHS that the second user was detected within the FOV of sensor of the first IHS.

8. The system of claim 1, wherein the second IHS is further configured to:
display the metrics for user presence events on a display screen of the second IHS.

9. The system of claim 1, wherein the second IHS is further configured to:
use the metrics for user presence events to manage security policy or initiate system management events for the first IHS.

10. A method for collecting, distributing and managing notifications of user presence, the method comprising:
monitoring user presence within a field of view (FOV) of a first information handling system (IHS) during an active system session for the first IHS;
detecting user presence of a first user, which is present within the FOV of the first IHS during the active system session, wherein the first user is an authenticated user of the active system session, and wherein the authenticated user is enrolled as a trusted user in a trusted multi-user (TMU) database, which stores biometric data corresponding to one or more trusted users;
detecting user presence of a second user, which is present within the FOV of the first IHS while the first user remains present;
wherein upon detecting the user presence of the second user, the method further comprises:
generating a notification of user presence of the second user;
collecting data associated with the user presence of the second user;
transmitting the notification of user presence, along with the collected data, over a network to a second IHS for notification, aggregation or analysis;
receiving, at the second IHS, the notification of user presence and the collected data transmitted over the network from the first IHS;
aggregating the notification of user presence and the collected data received from the first IHS with notifications of user presence and collected data previously received from the first IHS to generate an aggregated data set; and
analyzing the aggregated data set to generate metrics for user presence events that occur at the first IHS.

11. The method of claim 10, wherein said collecting data associated with the user presence of the second user comprises:
determining a TMU status of the second user by comparing biometric data obtained from the second user with biometric data stored within the TMU database; and
collecting the TMU status of the second user.

12. The method of claim 11, wherein said determining the TMU status of the second user comprises determining that the second user is:
- a trusted user included within the TMU database when the biometric data obtained from the second user matches the biometric data stored within the TMU database; or
- an unknown user not included within the TMU database when the biometric data obtained from the second user does not match the biometric data stored within the TMU database.

13. The method of claim 12, wherein if the second user is determined to be a trusted user included within the TMU database, said collecting data associated with the user presence of the second user further comprises determining and collecting an identity of the second user.

14. The method of claim 10, further comprising displaying the notification of user presence on a display screen of the second IHS to notify a user of the second IHS that the second user was detected within the FOV of the first IHS.

15. The method of claim 10, further comprising displaying the metrics for user presence events on a display screen of the second IHS.

16. The method of claim 10, further comprising using the metrics for user presence events to manage security policy or initiate system management events for the first IHS.

* * * * *